(12) United States Patent
Matsukawa

(10) Patent No.: US 9,520,959 B2
(45) Date of Patent: Dec. 13, 2016

(54) OPTICAL DROP APPARATUS, OPTICAL ADD APPARATUS, AND OPTICAL ADD/DROP APPARATUS

(71) Applicant: FUJITSU LIMITED, Kawasaki-shi, Kanagawa (JP)

(72) Inventor: Yoshinobu Matsukawa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 257 days.

(21) Appl. No.: 14/033,894

(22) Filed: Sep. 23, 2013

(65) Prior Publication Data
US 2014/0147121 A1    May 29, 2014

(30) Foreign Application Priority Data
Nov. 28, 2012  (JP) ................. 2012-259434

(51) Int. Cl.
*H04J 14/02*  (2006.01)

(52) U.S. Cl.
CPC ........ *H04J 14/0204* (2013.01); *H04J 14/0206* (2013.01); *H04J 14/0209* (2013.01); *H04J 14/0212* (2013.01); *H04J 14/0213* (2013.01); *H04J 14/0217* (2013.01); *H04J 14/021* (2013.01)

(58) Field of Classification Search
CPC .......................... H04J 14/0213; H04J 14/0209
See application file for complete search history.

(56) References Cited

U.S. PATENT DOCUMENTS

| 2001/0026384 A1 | 10/2001 | Sakano et al. |
| 2004/0179472 A1* | 9/2004 | Khalilzadeh et al. ........ 370/227 |
| 2004/0213564 A1 | 10/2004 | Sakano et al. |

(Continued)

FOREIGN PATENT DOCUMENTS

| JP | 2001-285323 | 10/2001 |
| JP | 2012-015726 | 1/2012 |

(Continued)

OTHER PUBLICATIONS

JPOA—Japanese Office Action mailed on May 24, 2016 for corresponding Japanese Application No. 2012-259434, with English translation of the relevant part, p. 3, line 24 to p. 8, line 9, of the Office Action.

(Continued)

*Primary Examiner* — Shi K Li
(74) *Attorney, Agent, or Firm* — Fujitsu Patent Center

(57) ABSTRACT

Provided is an optical apparatus including: wavelength separation units corresponding to the respective routes, each of which divides a wavelength multiplexed optical signal of one route into M wavelength groups (M is an integer satisfying N×M=the number of multiplexed wavelengths of the wavelength multiplexed optical signal of one route), each of which includes N wavelengths (N is an integer of 2 or more); and M wavelength separation blocks, each of which is input with a plurality of the wavelength groups divided by the different wavelength separation units and outputs optical signals with any one or a plurality of wavelengths included in the input wavelength groups to N coherent transponders. Accordingly, it is possible to flexibly adapt to extension in wavelength or extension in route in units of a wavelength separation block and/or wavelength multiplexing block.

15 Claims, 42 Drawing Sheets

(56) References Cited

U.S. PATENT DOCUMENTS

| | | | |
|---|---|---|---|
| 2008/0260383 A1* | 10/2008 | Zhong et al. | 398/50 |
| 2010/0202778 A1* | 8/2010 | Wisseman | G02B 6/2931 398/83 |
| 2011/0085801 A1* | 4/2011 | Palacharla | 398/48 |
| 2011/0188853 A1* | 8/2011 | Schimpe | H04J 14/0208 398/38 |
| 2012/0002964 A1 | 1/2012 | Takatsu et al. | |
| 2012/0128347 A1 | 5/2012 | Sakamoto et al. | |
| 2012/0183294 A1* | 7/2012 | Boertjes et al. | 398/49 |
| 2012/0224170 A1 | 9/2012 | Hisamoto | |
| 2015/0135319 A1* | 5/2015 | Costantini et al. | 726/23 |

FOREIGN PATENT DOCUMENTS

| | | |
|---|---|---|
| JP | 2012-39659 | 2/2012 |
| JP | 2012-114640 | 6/2012 |
| JP | 2012-182665 | 9/2012 |

OTHER PUBLICATIONS

Way, Winston I, "Optimum Architecture for MxN Multicast Switch-Based Colorless, Directionless, Contentionless, and Flexible-Grid ROADM," OFC/NFOEC 2012 Technical Digest, Mar. 2012, OSA.
Steven Gringeri et al., "Flexible Architectures for Optical Transport Nodes and Networks," IEEE Communications Magazine, Jul. 2010, vol. 48, Issue 7, pp. 40-50.

* cited by examiner

OPTICAL DROP APPARATUS, OPTICAL ADD APPARATUS, AND OPTICAL ADD/DROP APPARATUS

CROSS-REFERENCE TO RELATED APPLICATION

This application is based upon and claims the benefit of priority of the prior Japanese Patent Application No. 2012-259434, filed on Nov. 28, 2012, the entire contents of which are incorporated herein by reference.

FIELD

The embodiments discussed herein are directed to an optical drop apparatus, an optical add apparatus, and an optical add/drop apparatus.

BACKGROUND

With an increase in amount of information over a network, a wavelength division multiplexing (WDM) system has been widely used. In the WDM, a plurality of optical signals are multiplexed using a plurality of wavelengths to be transmitted. Therefore, in the WDM system, the number of wavelengths to be multiplexed is increased, so that an amount of transmission is increased.

In the WDM system, all or a part of optical nodes is configured to include an optical add-drop multiplexer (OADM). The OADM can insert an optical signal into an optical transmission line in units of wavelength and can extract the optical signal from the optical transmission line in units of wavelength.

A function or apparatus which inserts an optical signal having a desired wavelength to a WDM optical signal is referred to as an optical add function (or optical add apparatus). A function or apparatus which branches an optical signal having a desired wavelength from a WDM optical signal is referred to as an optical drop function (or optical drop apparatus). Note that, an OADM which inserts and/or branches an optical signal having a desired wavelength is sometimes referred to as a reconfigurable optical ADM (ROADM).

In a network with an ROADM, three functions of color-less (no wavelength dependency), direction-less (no direction dependency), and contention-less (no contention in the same wavelength) are considered to be important.

Herein, the "color-less" denotes a configuration or function where an arbitrary wavelength is input to an arbitrary port of an OADM to be inserted into a WDM signal of an optical transmission line and an arbitrary wavelength from an arbitrary port is branched from a WDM signal of an optical transmission line to be input. Further, the "direction-less" denotes a configuration or function where an OADM is configured to include a plurality of optical transmission routes (Degree) to insert an optical signal input from an arbitrary port to an arbitrary route and to branches an optical signal from an arbitrary route to input the optical signal to the arbitrary port. Furthermore, the "contention-less" denotes a configuration or function which avoids contention between optical signals with the same wavelength in an inserting function unit and a branching function unit of the OADM.

An OADM having the above-described three configurations or functions is sometimes referred to as a CDC OADM, and an OADM having the two functions of color-less and direction-less functions is sometimes referred to as a CD OADM.

[Patent Document 1] Japanese Laid-open Patent Publication No. 2012-015726
[Patent Document 2] Japanese Laid-open Patent Publication No. 2012-114640
[Patent Document 3] Japanese Laid-open Patent Publication No. 2012-182665

By solving wavelength dependency and route dependency of a connection port of a block which adds/drops optical wavelength, the CD function can change a wavelength route in remote control without a task of changing fiber connection. Therefore, there is an advantage of reducing operating costs.

However, in the case where there are a large number of route (Degrees) of the ROADM, since contention (contention in the same wavelength) may easily occur, the contention-less function becomes important. For example, in the case where a ring network is to be configured by using the ROADM, the number of routes (Degrees) to be used is about two, and thus, contention does not become a major problem.

However, in the case where a mesh network or multi-ring is to be configured, since the number of route included in one ROADM becomes a plural number (three or four or more), the case where the same wavelength is connected to a plurality of routes is increased.

Herein, with only the CD function, since contention (contention in the same wavelength) easily occurs, a maintenance person needs to check whether or not there is contention at a site (block) to which an optical fiber is to be connected in order to connect the optical fiber. According to the contention-less function, since an optical fiber can be freely connected to an arbitrary block, it is possible to suppress maintenance and operating costs.

In addition, sometimes, a coherent transceiver is used for a transponder (TP or TRPN) which inputs and outputs a wavelength. In the case of using the coherent transceiver, in order to densely accommodate wavelength arrangement for large-capacity transmission (for example, 400 G/1 T), a technique called "grid-less" for flexibly configuring wavelength arrangement positions may be introduced.

According to the above technique, unlike a fixed bandwidth (50 GHz or 100 GHz) in the related art, the bandwidth can be configured to be variable. Therefore, the number of wavelengths which can be included in one WDM optical signal can be greatly increased. Accordingly, frequency of use of the same wavelength is also increased.

However, in order to implement a contention-less function, a circuit configuration is increased in size and is expensive in comparison with a CD function. For example, an ROADM having a CDC function needs to include a non-blocking switch block in order to implement contention-less.

Therefore, a large-scale N×M wavelength selection switch (WSS: Wavelength Selective Switch), an N×M optical cross connect switch (OXC), or the like needs to be used, or a large number of optical devices need to be combined. As a result, costs of the ROADM are high, and the size of ROADM is increased. This causes too high costs of equipment investment in the initial introduction stage of the ROADM.

Therefore, in many cases, in the initial introduction stage, a CD function which can be implemented by using a small number of inexpensive optical devices is introduced into the ROADM. However, when a large number of wavelengths are extended and routes are also extended after the operation, the case of extending the same wavelength is increased. At this time, it is very inconvenience to determine whether the wavelength can be connected by an optical fiber every time, and the operating costs are increased.

Namely, according to the extension of the number of routes or the extension of the number of added/dropped wavelengths, necessity of a CDC function as well as a contention-less function is increased.

Therefore, although a CD function is introduced initially, according to the extension of the routes or an increase in the number of extended wavelengths, a function capable of adding a CDC function is needed.

However, with respect to the CD function configuration in the current state, configuration blocks of the apparatus may be greatly changed in order to incorporate the CDC function into the OADM in the middle of the operation. Therefore, CDC function may not be extended in the OADM without influence on the optical signal during operation (in-service).

SUMMARY

According to an aspect of the present invention, there is provided an optical drop apparatus including a plurality of routes and including coherent transponders capable of simultaneously receiving optical signals with N wavelengths (N is an integer of 2 or more), including: wavelength separation units corresponding to the respective routes, each of which divides a wavelength multiplexed optical signal of one route into M wavelength groups, each of which includes N wavelengths (M is an integer satisfying N×M=the number of multiplexed wavelengths of the wavelength multiplexed optical signal of one route); and M wavelength separation blocks, each of which is input with a plurality of the wavelength groups divided by the different wavelength separation units and outputs optical signals with any one or a plurality of wavelengths included in the input wavelength groups to N coherent transponders.

Further, according to another aspect of the present invention, there is provided an optical drop apparatus including a plurality of routes and including coherent transponders capable of simultaneously receiving optical signals with N wavelengths (N is an integer of 2 or more), including: wavelength separation units corresponding to the respective routes, each of which M-branches wavelength multiplexed optical signals of one route (M is an integer satisfying N×M=the number of multiplexed wavelengths of the wavelength multiplexed optical signal of one route); and M wavelength separation blocks, each of which is input with optical signals branched by the different wavelength separation units and selectively outputs the input optical signals to N coherent transponders in units of M wavelength groups, each of which includes N wavelengths.

Furthermore, according to still another aspect of the present invention, there is provided an optical add apparatus including a plurality of routes, including: M wavelength multiplexing blocks (M is an integer satisfying N×M=the number of multiplexed wavelengths of the wavelength multiplexed optical signal of one route), each of which wavelength-multiplexes optical signals transmitted from N coherent transponders (M is an integer of 2 or more); and wavelength selection switches, each of which is installed corresponding to each route to selectively output wavelength multiplexed optical signals transmitted from different wavelength multiplexing blocks to the respective route in units of wavelength.

In addition, according to further still another aspect of the present invention, there is provided an optical add apparatus including a plurality of routes, including: wavelength multiplexing units, each of which is installed corresponding to each route to multiplex input optical signals and to output the multiplexed optical signal to the respective route; and M wavelength multiplexing blocks, each of which selectively outputs optical signals transmitted from N coherent transponders (M is an integer of 2 or more) to the wavelength multiplexing units of different routes in units of M wavelength groups, each of which includes N wavelengths, (M is an integer satisfying N×M=the number of multiplexed wavelengths of the wavelength multiplexed optical signal of one route).

Further, according to yet further still another aspect of the present invention, there is provided an optical add/drop apparatus including a plurality of routes and including coherent transponders capable of simultaneously receiving optical signals with N wavelengths (N is an integer of 2 or more), including: wavelength separation units coherent transponders the respective routes, each of which divides a wavelength multiplexed optical signal of one route into M wavelength groups, each of which includes N wavelengths, (M is an integer satisfying N×M=the number of multiplexed wavelengths of the wavelength multiplexed optical signal of one route); M wavelength separation blocks, each of which is input with a plurality of the wavelength groups divided by the different wavelength separation units and outputs optical signals with any one or a plurality of wavelengths included in the input wavelength groups to N coherent transponders; M wavelength multiplexing blocks, each of which wavelength-multiplexes optical signals transmitted from different N coherent transponders; and wavelength selection switches, each of which is installed corresponding to each route to selectively output wavelength multiplexed optical signals transmitted from different wavelength multiplexing blocks to the respective route in units of wavelength.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
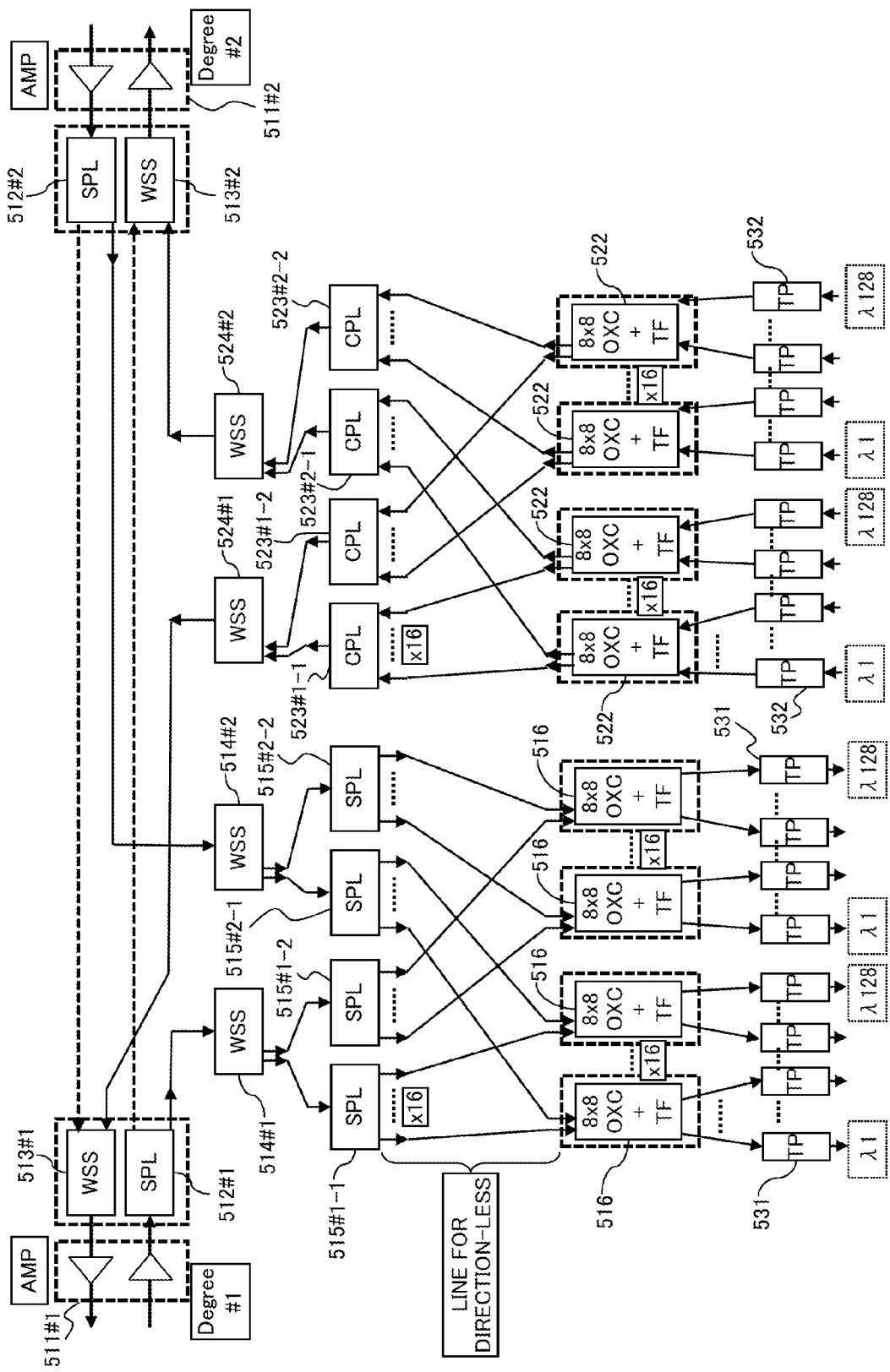
FIG. 1 is a diagram illustrating an example of a configuration of a CDC ROADM as an example of a related technique.

Hereinafter, embodiments of the present invention will be described with reference to the attached drawings. The embodiments described below are exemplary ones, and the various modifications or technical applications do not intend to be excluded. Note that, in the drawings used for the embodiments, the same reference numerals denote the same or similar components.

(Related Technique 1)

FIG. 1 is a diagram illustrating an example of a configuration of a CDC ROADM as an example of a related technique. In the example illustrated in FIG. 1, the CDC OADM is configured to include two routes (for example, Degree #1 and Degree #2). The Degree #1 includes a pair of an input route and an output route. Similarly, the Degree #2 also includes a pair of an input route and an output route.

An optical amplifier 511#1 amplifies a WDM optical signal input from the Degree #1 and amplifies a WDM optical signal output to the Degree #2. Similarly, an optical amplifier 511#2 amplifies a WDM optical signal input from the Degree #2 and amplifies a WDM optical signal to be output to Degree #1. Note that, the maximum number of multiplexed wavelengths L of the WDM optical signals of each of the Degree #1 and the Degree #2 is arbitrary and, thus, is exemplary assumed to be 128.

(Drop Function)

An optical splitter (SPL) 512#1 branches a WDM optical signal input from the Degree #1 and guides the WDM optical signal to a wavelength selection switch (WSS) 513#2 and a drop WSS 514#1. Similarly, an optical splitter (SPL) 512#2 branches a WDM optical signal input from the Degree #2 and guides the WDM optical signal to a WSS 513#1 and a drop WSS 514#2.

The drop WSS 514#1 selects optical signals with one or a plurality of wavelengths designated by a wavelength path control unit (not illustrated) among the WDM optical signals guided from the optical splitter 512#1. Similarly, the drop WSS 514#2 selects optical signals with one or a plurality of wavelengths designated by the wavelength path control unit among the WDM optical signals guided from the optical splitter 512#2. The wavelengths selected by the drop WSS 514#1 and the wavelengths selected by the drop WSS 514#2 may be different from each other, may be the same as each other, and may partially overlap each other.

Each of the optical splitters (SPL) 515#1-1 and 515#1-2 M-branches (for example, 16-branches) the optical signals selected by the drop WSS 514#1. Similarly, each of the optical splitters (SPL) 515#2-1 and 515#2-2 M-branches the optical signals selected by the drop WSS 514#2.

Each of the M-branched optical signals is input to M different N×N (for example, 8×8) optical cross connects (OXC) 516. In other words, optical signals included in the WDM optical signals of different Degree #1 and #2 are input to each of the optical cross connects 516.

Therefore, in the OADM, when the route (Degree) outputting an optical signal including a specific wavelength is to be switched, there is no need to change optical fiber connection between optical devices. Accordingly, it is possible to implement direction-less. The optical fiber connection between the SPLs 515#1-1, 515#1-1, 515#2-1, and 515#2-2 and each optical cross connect 516 which implements direction-less is sometimes referred to a "line for direction-less".

In addition, the output port of the SPLs 515#1-1 and 515#1-2 and the output port of the SPLs 515#2-1 and 515#2-2 have no wavelength dependency. Namely, the SPLs 515#1-1 and 515#1-2 and the SPLs 515#2-1 and 515#2-2 do not have the configuration, "an optical signal with a specific wavelength which is determined in advance needs to be output from each output port".

Therefore, in the case where a plurality of the optical signals with different wavelengths are guided from the SPLs 515#1-1 and 515#1-2, and the SPLs 515#2-1 and 515#2-2 to the cross connects 516, each optical signal can be input to the input port of an arbitrary cross connect 516. Namely, according to this configuration, it is possible to implement color-less.

Figure 2:
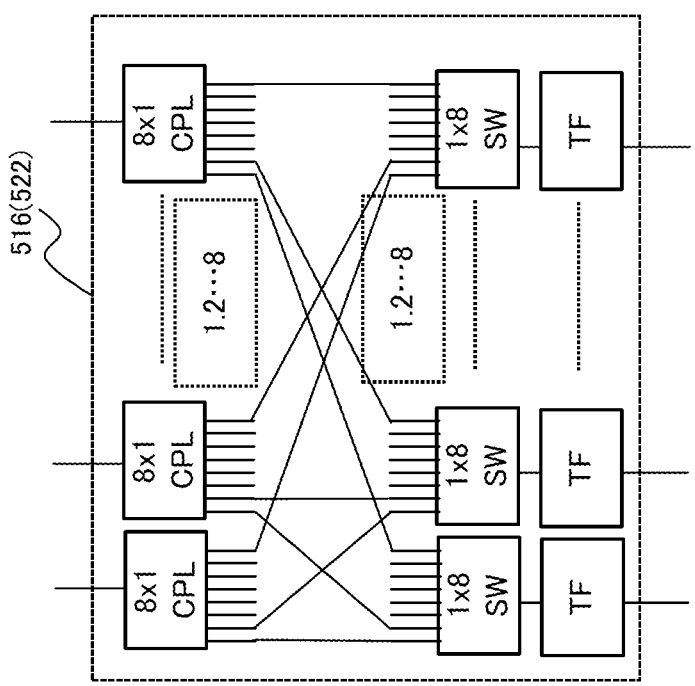
FIG. 2 is a diagram illustrating an example of a configuration of optical cross connect in the ROADM illustrated in FIG. 1.

Each optical cross connect 516 guides each input optical signal to the output port designated by the wavelength path control unit. For example, as illustrated in FIG. 2, each optical cross connect 516 may be configured by combining N N×1 couplers (CPL), N 1×N switches (SW), and N tunable filters. Note that, an optical cross connect 22 of the add function may have the same configuration as that of the optical cross connect 516.

By using the 1×N switch, a plurality of the optical signals with the same wavelength can be input and output in different paths. Therefore, in addition to the above-described color-less and direction-less, it is also possible to implement contention-less. Namely, it is possible to implement a CDC configuration. Note that, since the below-described add function reversibly optically operates with the drop function, in the add function, it is also possible to implement the CDC configuration.

Each of N×M TFs filters the optical signal output from the output port corresponding to the optical cross connect 516. Herein, each TF removes wavelength components other than the designated wavelength. Although the pass wavelengths of the TFs are not particularly limited, the pass wavelengths may be configured to be different from each other. The TFs may include the pass wavelengths which overlap each other. In addition, the pass wavelength of the TF 17 may be designated by the wavelength path control unit.

Each of the N×M transponders (TPs) 531 transmits the optical signal output from the respective TF to the respective terminal node. At this time, the TP 531 transforms the wavelength of the optical signal if necessary. Note that, the wavelengths of the optical signals output from the TP 531 may be the same as each other or may be different from each other.

(Add Function)

Each of the N×M TPs 532 transmits the optical signal transmitted from the respective terminal node to the N×M TFs (refer to FIG. 2) of the respective optical cross connect 522. At this time, the TP 532 transforms the wavelength of the optical signal if necessary. Note that, the wavelengths of the optical signals transmitted from terminal nodes may be the same as each other or may be different from each other. In addition, although the wavelength of the optical signal output from the TP 532 are not particularly limited, the wavelengths may be configured to be different from each other.

Each of the TFs filters the optical signal output from the transponder 532 corresponding to the optical cross connect 522. Herein, each TF removes wavelength components other than the designated wavelength. For example, the pass wavelengths of the TFs may be configured to be different from each other. The TFs may include the pass wavelengths which overlap each other. In addition, the pass wavelength of the TF may be designated by the wavelength path control unit.

The optical cross connect 522 guides each input optical signal to the output port designated by the wavelength path control unit.

Each of the optical couplers (CPLs) 523#1-1 and 523#1-2 multiplexes optical signals output from output ports of different optical cross connects 22. In addition, each of the optical couplers (CPLs) 523#2-1 and 523#2-2 multiplexes optical signals output from different output ports of different optical cross connects 522.

The add WSS 524#1 selects optical signals with one or a plurality of wavelengths designated by the wavelength path control unit among the optical signals guided from the optical couplers 523#1-1 and 523#1-2. Similarly, the add WSS 524#2 selects optical signals with one or a plurality of wavelengths designated by the wavelength path control unit among the optical signals guided from the optical couplers 523#2-1 and 523#2-2. The wavelengths selected by the add WSS 524#1 and the wavelengths selected by the add WSS 524#2 may be different from each other, may be the same as each other, and may partially overlap each other.

The WSS 513#1 generates the WDM optical signal to be output to the Degree #1 from the optical signals guided through the optical splitter 512#2 from the Degree #2 and the optical signals guided from the add WSS 524#1 under the control of the wavelength path control unit.

At this time, the WSS 513#1 selects one or a plurality of arbitrary wavelengths which "pass (through-pass)" through the OADM among the optical signals guided through the optical splitter 512#2 from the Degree #2. In addition, the WSS 513#1 selects one or a plurality of arbitrary wavelengths which are "inserted" into the WDM optical signal among the optical signals guided from the add WSS 524#1.

Similarly, the WSS 513#2 generates the WDM optical signal to be output to the Degree#2 from the optical signals guided through the optical splitter 512#1 from the Degree #1 and the optical signals from the add WSS 524#2 under the control of the wavelength path control unit.

At this time, the WSS 513#2 selects one or a plurality of arbitrary wavelengths which "pass" through the OADM among the optical signals guided through the optical splitter 512#1 from the Degree #1. In addition, the WSS 513#2 selects one or a plurality of arbitrary wavelengths which are "inserted" into the WDM optical signal among the optical signals guided from the add WSS 524#2.

(Related Technique 2)

Figure 3:
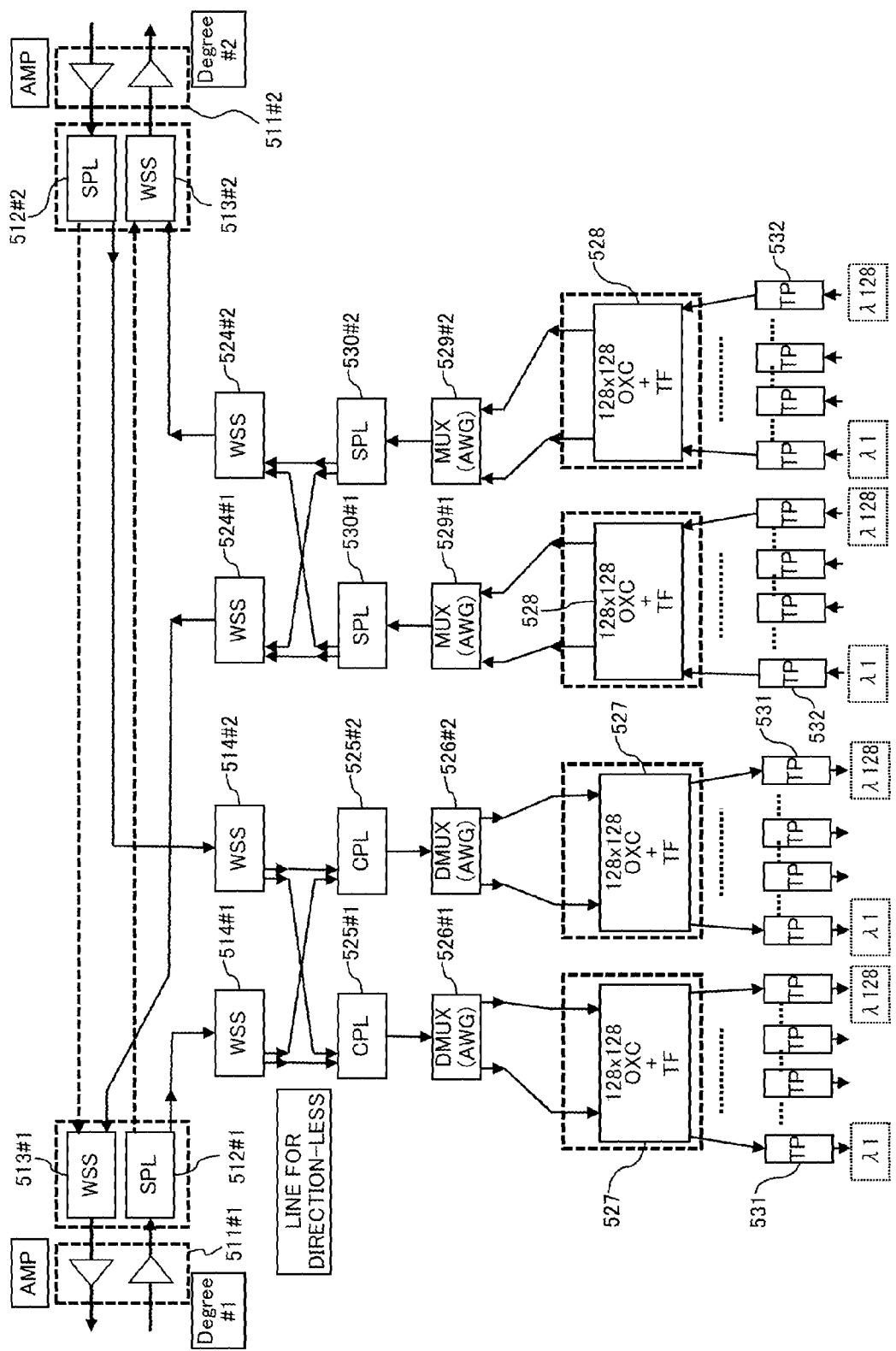
FIG. 3 is a diagram illustrating an example of a configuration of a CD ROADM as another example of the related technique.

FIG. 3 is a diagram illustrating an example of a configuration of a CD ROADM as another example of the related technique. The CD ROADM illustrated in FIG. 3 is different from the configuration illustrated in FIG. 1 in that, in the drop function, optical couplers (CPLs) 525#1 and 525#2, DMUXs (AWG: Arrayed Waveguide Grating) 526#1 and 526#2, and L×L (for example, 128×128) optical cross connect 527 attached to the TF are included instead of the SPLs 515#1-1, 515#1-2, 515#2-1, and 515#2-2 and the optical cross connect 516. In addition, the CD ROADM illustrated in FIG. 3 is different from the configuration illustrated in FIG. 1 in that, in the add function, optical splitters (SPL) 530#1 and 530#2, MUXs (AWG) 529#1 and 529#2, and L×L (for example, 128×128) optical cross connect 528 are included instead of the CPLS 523#1-1, 523#1-2, 523#2-1, and 523#2-2 and the optical cross connect 522.

In the drop function, the optical signals including the wavelengths which are input from the different Degrees #1 and #2 to the WSSs 514#1 and 514#2 and selected by the WSSs 514#1 and 514#2 are input to the respective CPLs 525#1 and 525#2. In other words, lines for direction-less are installed between the WSSs 514#1 and 514#2 and the CPLs 525#1 and 525#2. Each of the CPLs 525#1 and 525#2 multiplexes input optical signals.

The optical signals multiplexed by the CPLs 525#1 and 525#2 are input to the respective AWGs 526#1 and 526#2. Each of the AWGs 526#1 and 526#2 separates the input optical signal for each wavelength and outputs the separated optical signal from the output port which is determined in advance. In other words, in the AWGs 526#1 and 526#2, the output wavelength for each output port is fixed. Therefore, the optical signals with a plurality of the same wavelengths are not output from the same AWG. Accordingly, if the AWG is used for the drop path, the contention-less function is not implemented. In addition, since the AWG is used, the AWG is not adapted to grid-less (wavelength band width is variable) and there is a limitation.

Figure 4:
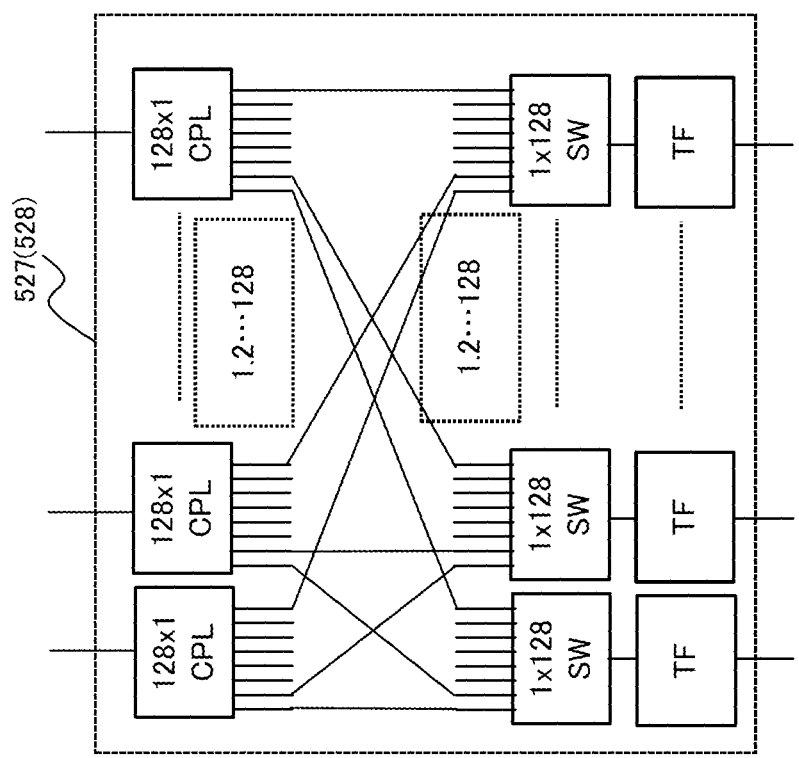
FIG. 4 is a diagram illustrating an example of a configuration of optical cross connect in the ROADM illustrated in FIG. 3.

For example, as illustrated in FIG. 4, each of two 128×128 optical cross connects 527 is configured by combining 128 128×1 optical couplers (CPLs), 128 1×128 switches (SWs), and 128 TFs. The optical cross connect 527 selectively outputs the optical signals, which are input from the respective AWGs 526#1 and 526#2 to any one of the input ports, to any one of the output ports (TP 531).

At this time, since the optical signal with an arbitrary wavelength input to the 128×1 optical coupler (CPL) is input to each 1×128 switch and is selected by each 1×128 switch to be output, the optical signal including an arbitrary wavelength can be output to an arbitrary output port (TP 531). In other words, therefore, it is possible to implement color-less. Note that, the optical cross connect 528 of the add function may have the same configuration as that of the optical cross connect of the drop function.

In the add function, each of the two optical cross connects 528 selectively outputs the optical signal input from any one of the TPs 532 to any one of the output ports. At this time, the optical cross connect 532 has a configuration where outputs of different 1×128 switches are multiplexed by the 128×1 CPL, the optical signal with an arbitrary wavelength can be output to an arbitrary output port. In other words, therefore, it is possible to implement color-less.

Each of the AWGs 529#1 and 529#2 multiplexes the output signals output from the respective optical cross connect 528. In the AWGs 529#1 and 529#2, the wavelength for each input port is fixed. Therefore, the optical signals with a plurality of the same wavelengths are not input to the same input port. Accordingly, if the AWG is used for the add path, the contention-less function is not implemented. In addition, since the AWG is used, the AWG is not adapted to grid-less, and there is a limitation.

The SPLs 530#1 and 530#2 branch the optical signals input from the respective AWGs 529#1 and 529#2 to the WSSs 524#1 and 524#2 of each route. In other words, lines for direction-less are installed between the WSSs 524#1 and 524#2 and the SPLs 530#1 and 530#2.

(Related Technique 3)

Figure 5:
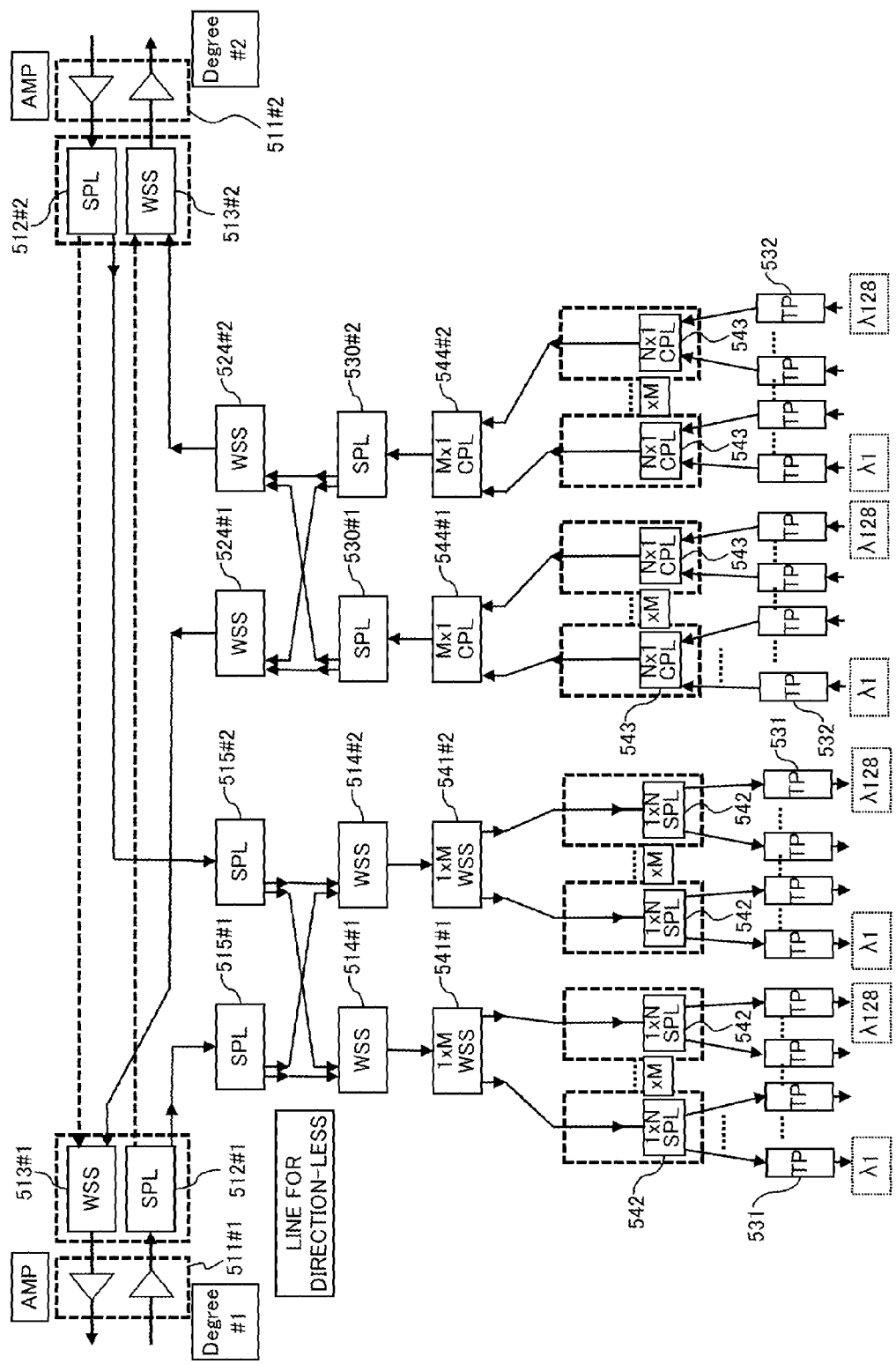
FIG. 5 is a diagram illustrating an example of a configuration of a CD ROADM as still another example of the related technique.

FIG. 5 is a diagram illustrating an example of a configuration of a CD ROADM as still another example of the related technique. The CD ROADM illustrated in FIG. 5 has a configuration where the functions of blocks constructed with AWG 526#1 (526#2) and the optical cross connect 527 in the drop function are implemented by using the 1×M WSS 541#1 (541#2) and the M 1×N optical splitters (SPL) 542 in the configuration illustrated in FIG. 3. In addition, the CD ROADM illustrated in illustrated in FIG. 5 has a configuration where the functions of the block constructed with an optical cross connect 528 and AWG 529#1 (529#2) in the add function are implemented by using M N×1 optical couplers (CPLs) 543 and M×1 optical couplers (CPLs) 544#1 (544#2) in the configuration illustrated in FIG. 3.

In the CD configuration illustrated in FIG. 5, in the drop side, the WDM optical signal from each route (Degree) is 2-branched by SPLs 515#1 and 515#2, and the branched signals are input to the WSSs 514#1 and 514#2 corresponding to the routes #1 and #2.

Each of the WSSs 514#1 and 514#2 selectively multiplexes the optical signals guided from the SPLs 515#1 and 515#2 of different routes in units of wavelength.

The wavelength group multiplexed by each of the WSSs 514#1 and 514#2 is limited (is M-divided) to the number of wavelengths N which can be simultaneously received by a TP 531 (coherent receiver) in the respective 1×M WSSs 541#1 and 541#2. Note that, "M" and "N" has a relationship where M×N=the maximum number of wavelengths (for example, 128) on 1 Degree.

The optical signals which are M-divided and of which the number of wavelengths is limited to N are N-branched by the 1×N optical splitter 542 to be distributed to the respective TP 531 (coherent receiver). Reception of a coherent receiver which simultaneously receives a plurality of wavelengths is referred to as multichannel reception. Due to this function, it is possible to remove the TFs which are used in the related techniques 1 and 2.

On the other hand, in the add side, the optical signals with wavelengths output from the coherent transmitter of the TP 532 are multiplexed by the N×1 optical coupler 543, and the wavelength group corresponding to 1 Degree is multiplexed by the M×1 optical couplers 544#1 and 544#2.

The wavelength group corresponding to 1 Degree multiplexed by each of the M×1 optical couplers 544#1 and 544#2 is branched by the respective optical splitters 530#1 and 530#2 to be input to the WSSs 524#1 and 524#2 of different routes. In other words, the optical splitters 530#1 and 530#2 are connected to the WSSs 524#1 and 524#2 by fiber lines for direction-less.

The WSS 524#1 the wavelength which is to be output to the Degree #1 and outputs the wavelength to the WSS 513#1. The WSS 524#2 selects the wavelength which is to be output to the Degree #2 and outputs the wavelength to the WSS 513#2.

The configuration illustrated in FIG. 5 is a representative example of an inexpensive CD function using multichannel reception of a coherent TP. The reason why the CD function is inexpensive is that the optical coupler and the optical splitter providing a multiplexing function and a demultiplexing function are inexpensive, so that the optical cross connect (OXC) function exemplified in the related techniques 1 and 2 can be removed.

However, in order to add a CDC function (particularly, contention-less function), in the current technique, a function corresponding to the optical cross connect (OXC) is necessary. In order to add the contention-less function to the configuration illustrated in FIG. 5, the configuration exemplified in the related technique 1 (FIGS. 1 and 2) needs to be changed.

In order to implement the change, all of the lower blocks lower than the upper blocks which add/drop the WDM signal need to be replaced. For this reason, the wavelength in-serviced already needs to be stopped once, and the CDC function is not extended during operation.

Figure 6:
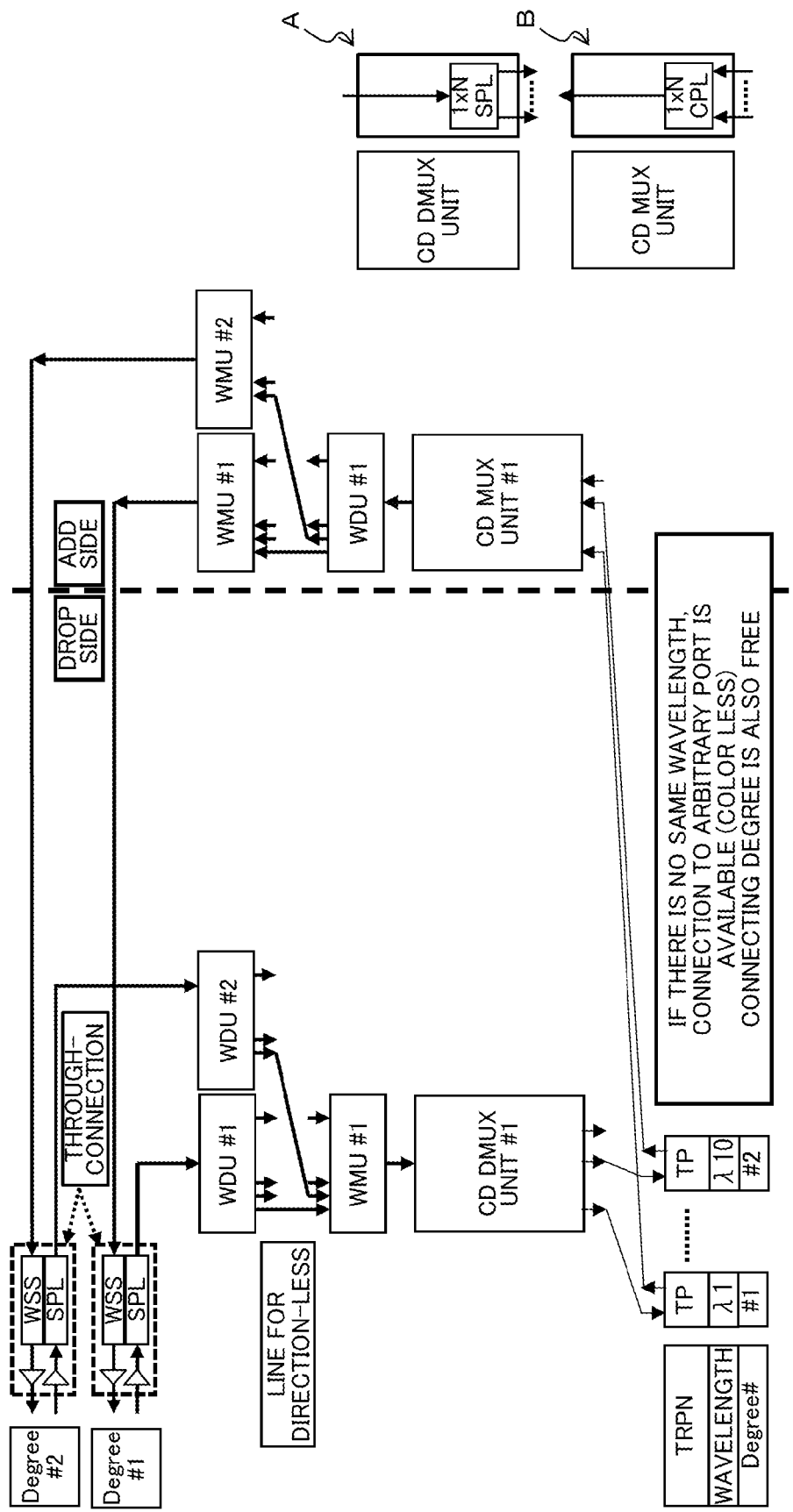
FIG. 6 is a diagram illustrating an example of a configuration (2 Degree configuration) where the configuration of the related technique illustrated in FIG. 5 is simply expressed in a configuration of function blocks.

FIG. 6 illustrates an example of a configuration (2 Degree configuration) where the configuration of the related technique 3 illustrated in FIG. 5 is simply expressed in a configuration of function blocks.

(Drop Side)

The wavelength distribution units (WDUs) #1 and #2 in the drop side are blocks connected to the respective Degrees #1 and #2 and correspond to the SPLs 515#1 and 515#2 illustrated in FIG. 5. In addition, the wavelength multiplexing unit (WMU) #1 in the drop side corresponds to the WSSs 514#1 and 514#2 illustrated in FIG. 5.

The wavelength distribution units #1 and #2 are connected to the wavelength multiplexing unit #1 by fiber lines for direction-less. The CD DMUX unit #1 corresponds to a block matching the 1×M WSSs 541#1 and 541#2 and the M 1×N optical splitters 542 illustrated in FIG. 5. As illustrated by the arrow A of FIG. 6, the CD DMUX unit #1 can be simply (functionally) expressed as a 1×N optical splitter (SPL).

Unless the same wavelength is exist, the TP (coherent transponder) connected to the CD DMUX unit #1 can be connected to an arbitrary port (color-less), and fiber lines are inserted between the wavelength distribution units #1 and #2 and the wavelength multiplexing unit #1, so that any one of the Degrees #1 and #2 can be dropped (direction-less).

(Add Side)

The wavelength multiplexing units (WMUs) #1 and #2 in the add side are blocks connected to the respective Degrees #1 and #2 and correspond to the WSSs 524#1 and 524#2 illustrated in FIG. 5. In addition, the wavelength distribution unit (WDU) #1 in the add side corresponds to the SPLs 530#1 and 530#2 illustrated in FIG. 5.

The wavelength multiplexing units #1 and #2 are connected to the wavelength distribution unit #1 by fiber lines for direction-less. The CD MUX unit #1 corresponds to a block matching the M×1 optical couplers 544#1 and 544#2 and the M N×1 optical couplers 543 illustrated in FIG. 5. As illustrated by the arrow B of FIG. 6, the CD MUX unit #1 can be simply (functionally) expressed as a 1×N optical coupler (CPL).

Unless the same wavelength is exist, the TP (coherent transponder) connected to the CD MUX unit #1 can be connected to an arbitrary port (color-less), and fiber lines are inserted between the wavelength multiplexing units #1 and #2 and the wavelength distribution unit #1, so that any one of the Degrees #1 and #2 can be added (direction-less).

Figure 7:
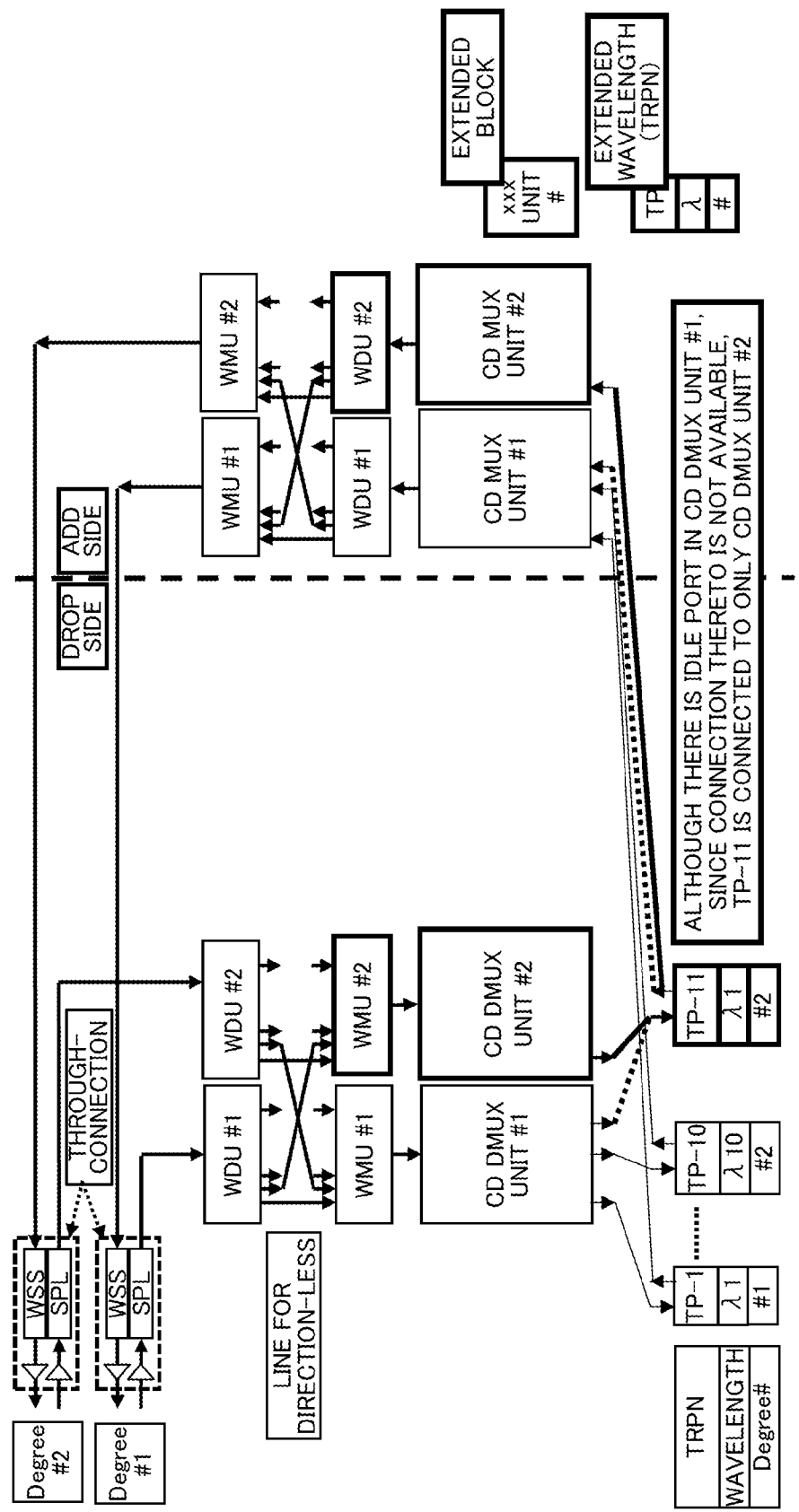
FIG. 7 is a diagram illustrating for explaining a case where the same wavelength is extended from the configuration illustrated in FIG. 6.

Next, FIG. 7 illustrates a case where the same wavelength is extended in the configuration illustrated in FIG. 6.

FIG. 7 illustrates the state where the wavelength $\lambda 1$ of the Degree #1 is connected to the CD DMUX unit #1 and the CD MUX unit #1 by the TP-1. The case where the wavelength $\lambda 1$ of the Degree#2 is to be connected by an extended TP-11 in this state is considered.

Herein, each of the CD DMUX unit #1 and the CD MUX unit #1 includes a CD function but not a contention-less function. Namely, as illustrated in FIG. 5, since the CD DMUX unit #1 and the CD MUX unit #1 are configured by using optical devices corresponding to optical couplers and optical splitters, the same wavelengths $\lambda 1$ are in contention.

Therefore, the extended TP-11 is not connected to the CD DMUX unit #1 and the CD MUX unit #1. In addition, inside the CD DMUX unit #1 and the CD MUX unit #1, in any block different from the block (optical coupler and optical splitter) connected to the TP-1, the extended TP-11 is not connected to the CD DMUX unit #1 and the CD MUX unit #1.

In order to connect the $\lambda 1$ of the TP-11, the wavelength multiplexing unit (WMU) #2 and the CD DMUX unit #2 need to be newly added in the drop side, and the wavelength distribution unit (WDU) #2 and the CD MUX unit #2 need to be newly added in the add side.

Figure 8:
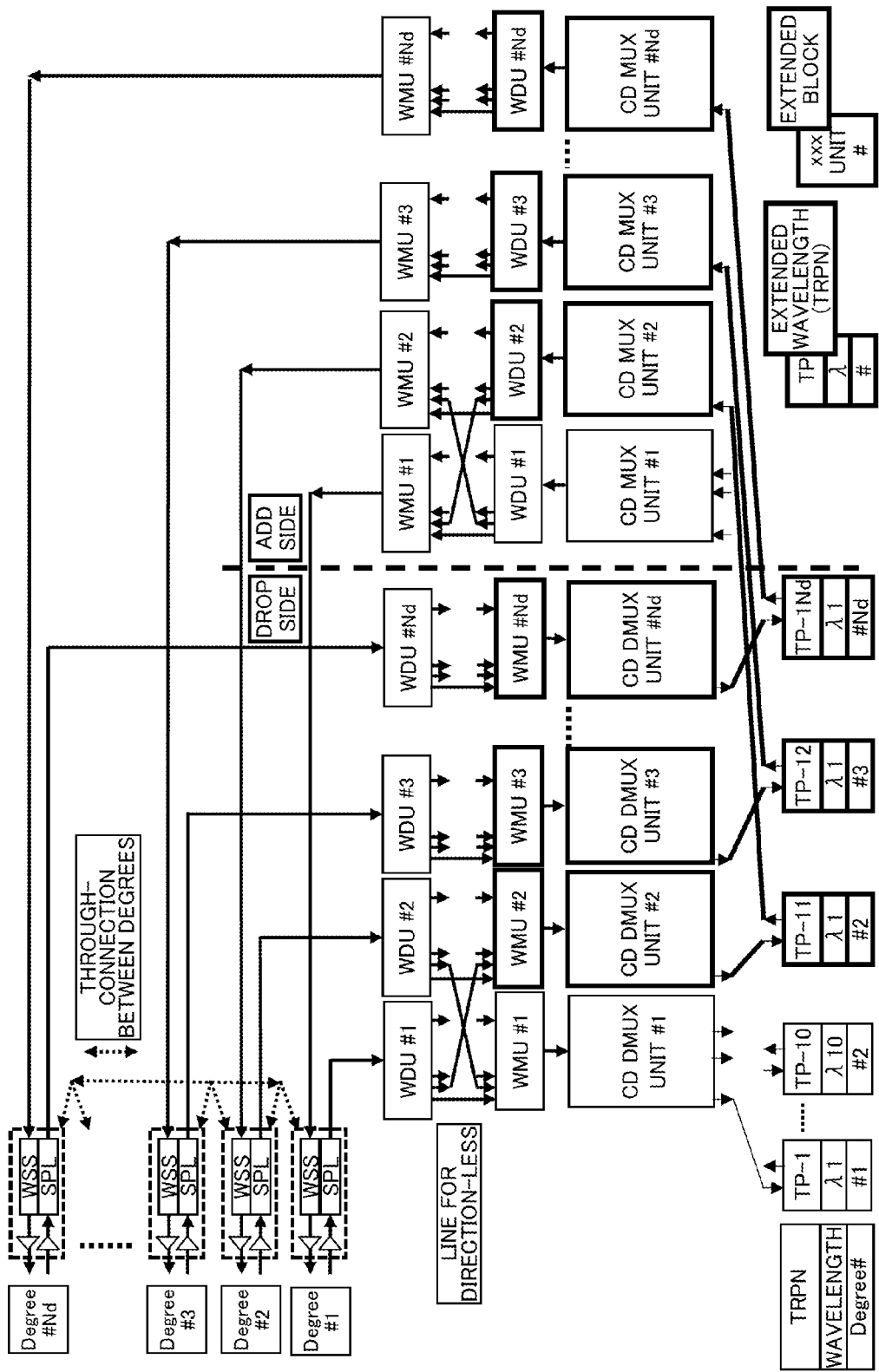
FIG. 8 is a diagram illustrating an example of a configuration of a case where Nd Degrees are extended in the configuration illustrated in FIG. 7.

Next, FIG. 8 illustrates an example of a configuration of a case where Nd Degrees (Nd is an integer of 3 or more) are extended in the configuration illustrated in FIG. 7. In this example, the $\lambda 1$ of the Degree #2 is extended in the TP-11, the $\lambda 1$ of the Degree #3 is extended in the TP-12, and $\lambda 1$ of the Degree #Nd is extended in the TP-1Nd.

In this case, similarly to the example illustrated in FIG. 7, the wavelength multiplexing units (WMUs) #3 . . . #Nd and the CD DMUX units #3 . . . #Nd need to be extended in the drop side, and the wavelength distribution units (WDUs) #3 . . . #Nd and the CD MUX units #3 . . . #Nd need to be extended in the add side.

In this manner, in the above-described CD configuration, when the same wavelength is to be extended, if a large block necessary in units of Degree is not extended, the contention (contention in the same wavelength) could not be avoided. In addition, in order to add the contention-less function to the CD configuration, since a large block including the wavelength multiplexing unit and the wavelength distribution unit need to be replaced, the CDC function can not be added in an in-service manner.

Therefore, in the embodiment, it is possible to suppress the extended blocks for avoiding contention in the CD configuration to minimum blocks, and it is possible to extend the minimum blocks as a CDC function unit providing perfect contention-less through in-service.

(Embodiment)

Figure 9:
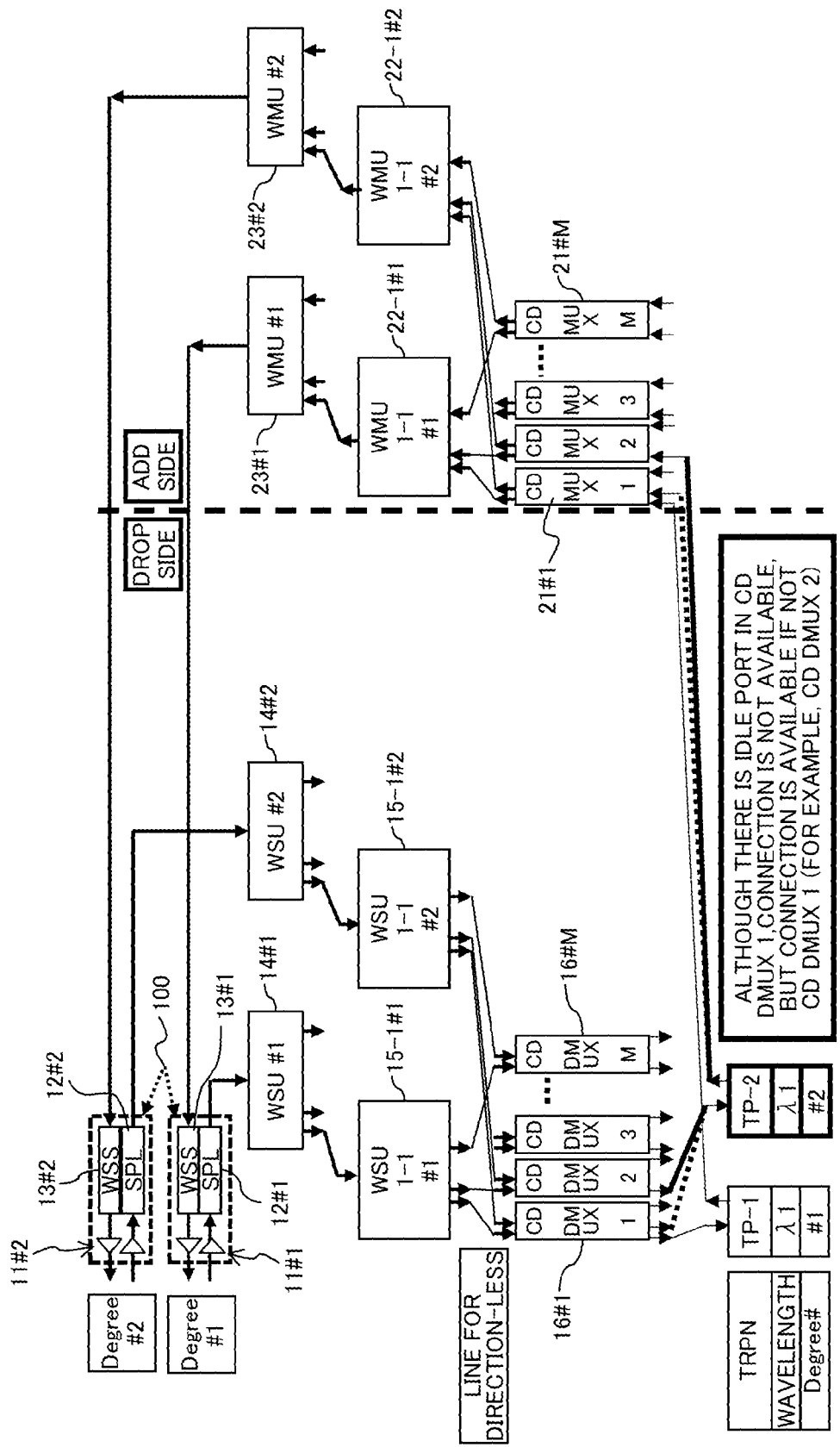
FIG. 9 is a diagram illustrating an example of an ROADM including a CD configuration (2 Degree case) according to an embodiment.

FIG. 9 illustrates an example of an ROADM including a CD configuration (2-Degree case) according to an embodiment.

The CD ROADM illustrated in FIG. 9 is configured to include two routes (for example, Degrees #1 and #2). The Degree #1 includes a pair of an input route and an output route. Similarly, the Degree #2 also includes a pair of an input route and an output route.

The optical amplifier 11#1 amplifies a WDM optical signal input from the Degree #1 and amplifies a WDM optical signal to be output to the Degree #2. Similarly, the optical amplifier 11#2 amplifies a WDM optical signal input from the Degree #2 and amplifies a WDM optical signal to be output to the Degree #1. Note that, the maximum number of multiplexed wavelengths L of the WDM optical signals of each of the Degrees #1 and #2 is arbitrary and, thus, is exemplary assumed to be 128.

The optical splitter (SPL) 12#1 branches the WDM optical signal input from the Degree #1 and guides the WDM optical signal to the wavelength selection switch (WSS) 13#2 (through-connection) and the wavelength separation unit #1. Similarly, the optical splitter (SPL) 12#2 branches the WDM optical signal input from the Degree #2 and guides the WDM optical signal to the WSS 13#1 (through-connection) a and the drop WSS 514#2. Note that, in FIG. 9, dotted lines indicated by reference numeral 100 denote that through-connection exists between the Degrees #1 and #2.

The wavelength separation units (WSUs) 14#1 and 14#2 branch the WDM optical signals guided from the respective optical splitters 12#1 and 12#2. A WSS or a 1×N optical splitter (SPL) with a wavelength branching function can be used as the wavelength separation units 14#1 and #2.

As subordinates of the wavelength separation units 14#1 and 14#2, wavelength separation units (WSUs) 15-1#1 and 15-1#2 are installed. Each of the wavelength separation units 15-1#1 and 15-1#2 has a function of reducing the maximum number of wavelengths included in one WDM optical signal dropped from one Degree to the maximum number of multi-channel reception. The maximum number of multi-channel reception denotes the maximum number of wavelengths which are simultaneously received by the receiver of the TP (coherent transponder).

Therefore, each of the wavelength separation units 15-1#1 and 15-1#2 can reduce the number of wavelengths of the dropped WDM optical signal to the maximum number of multi-channel reception until the WDM optical signal reaches the CD DMUX units 16#1 to 16#M as an example of the wavelength separation block. A wavelength selection switch such as WSS capable of limiting the number of wavelengths can be used for each of the wavelength separation units 15-1#1 and 15-1#2.

Herein, the number of multichannel reception of the coherent transponders is determined by a factor of which the limitation of total maximum reception power is dominant. As the number of wavelengths is large, the total power is increased. Therefore, the maximum number of wavelengths which is not received is determined. In the current state, although a maximum of about 16 wavelengths may be used as a reference value, the maximum number of wavelength is set to N.

The number of wavelengths dropped into each of the wavelength separation units 15-1#1 and 15-1#2 is the number of wavelengths included in one WDM optical signal of one Degree. When the number of wavelengths included in one WDM optical signal is set to L (for example, 128), each of the wavelength separation units 15-1#1 and 15-1#2 has outputs of which the number is M obtained by dividing L (=128) wavelengths in units of N wavelengths.

Herein, the relationship among N, M, and L is as follows.

$$N \times M = L \text{(the maximum number of wavelengths of a WDM optical signal of one Degree)}$$

Figure 10:
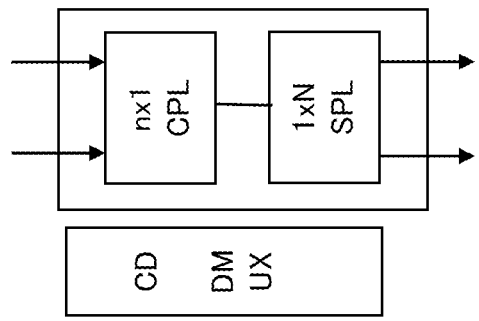
FIG. 10 is a diagram illustrating an example of a configuration of a CD DMUX unit of the ROADM illustrated in FIG. 9.

To subordinates of the wavelength separation units 15-1#1 and 15-1#2, M CD DMUX units 16#1 to 16#M (hereinafter, when they are not distinguished, sometimes referred to as a "CD DMUX unit 16") may be connected. For example, as illustrated in FIG. 10, each of the CD DMUX units 16#1 to 16#M may be configured by using an n×1 optical coupler (CPL) and a 1×N optical splitter (SPL). Note that, n denotes the number of Degrees to be supported, and N is the maximum number of multi-channel reception.

Each of the CD DMUX units 16#1 to 16#M is a minimum block which can be connected to the receivers of the N (maximum) coherent transponders. The number of wavelengths (number of TPs) which can be connected to and included in the minimum block is determined by the number of multi-channel wavelengths N which can be simultaneously received by the coherent receiver of the TP. Due to the division into minimum blocks, the configuration can be partially replaced with a CDC function as described later, so that a degree of maintenance of apparatus can be improved.

In addition, the fiber lines for direction-less are installed between the wavelength separation units 15-1#1 and 15-1#2 and the CD DMUX units 16#1 to 16#M, so that it is possible to implement a drop-side function corresponding to the CD function. Namely, outputs of different wavelength separation units 15-1#1 and 15-1#2 are input to each of the M CD DMUX units 16#1 to 16#M through the fiber lines for direction-less.

Figure 12:
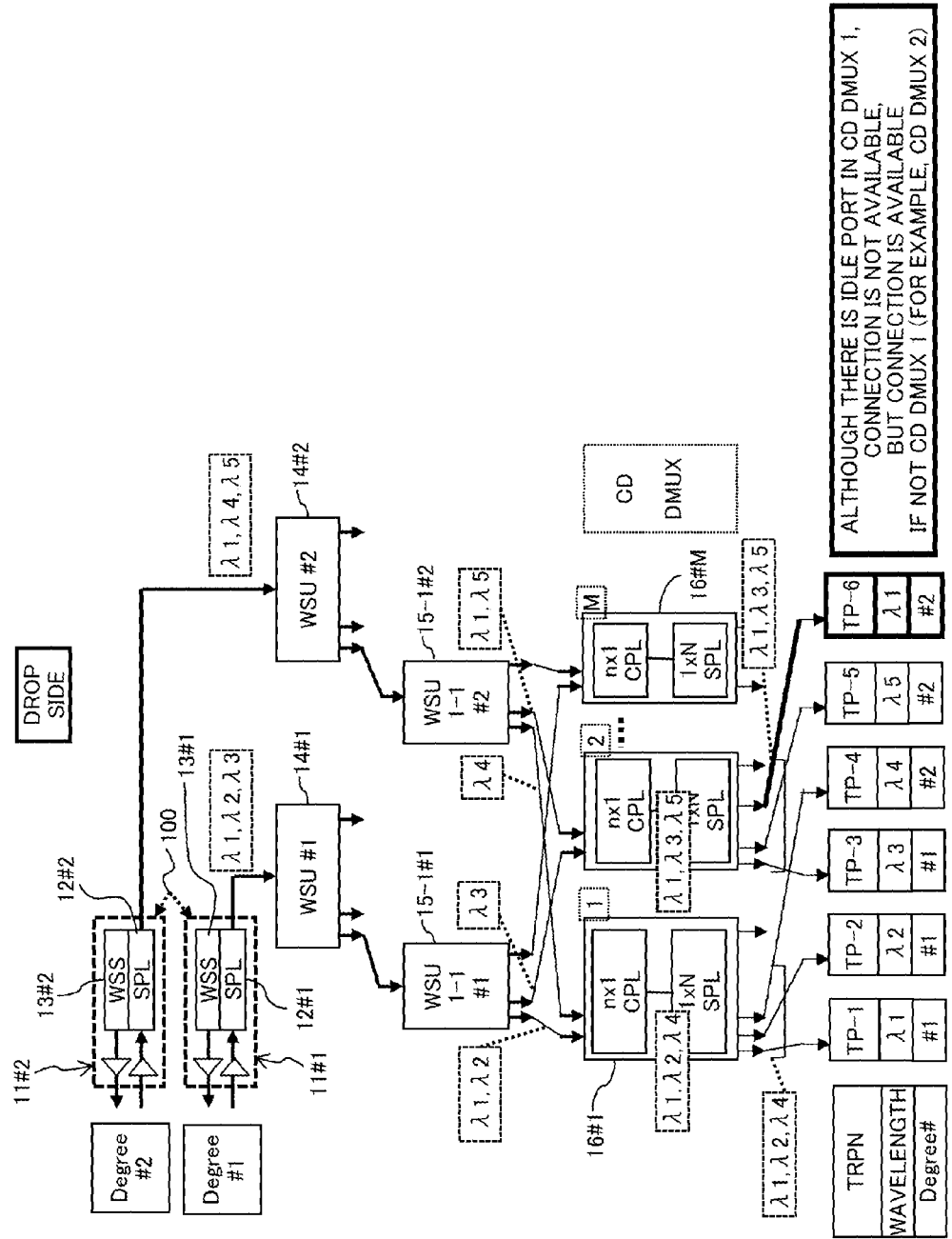
FIG. 12 is a diagram illustrating an example of routes to which wavelengths of each Degree of a drop side are distributed in the ROADM illustrated in FIG. 9.

FIG. 12 illustrates an example of routes to which wavelengths of each Degree of the drop side are distributed.

FIG. 12 exemplifies a state where three wavelengths of λ1, λ2, and λ3 are dropped from the Degree #1 and three wavelengths of λ1, λ4, and λ5 are dropped from the Degree#2.

Each of the wavelength separation units 14#1 and 14#2 branches input wavelengths as they are. Next, in the wavelength separation unit 15-1#1, it is determined that the coherent transponders TP-1 and TP-2 are connected to the CD DMUX 16#1, and the coherent transponder TP-3 is connected to the CD DMUX unit 16#2.

Therefore, for example, λ1 and λ2 are distributed to (dropped into) the CD DMUX unit 16#1, and λ3 is distributed to (dropped into) the CD DMUX unit 16#2.

Similarly, in the wavelength separation unit 15-1#2, it is determined that the coherent transponders TP-4, TP-5, and TP-6 are connected to the CD DMUX units 16#1 and 16#2. Therefore, for example, λ4 is dropped into the CD DMUX unit 16#1, and λ1 and λ5 are dropped into the CD DMUX unit 16#2.

In the CD DMUX 16#1, λ1 and λ2 of the Degree #1 and λ4 of the Degree#2 are dropped, λ1, λ2, and λ4 are multiplexed and branched by the n×1 optical coupler and the 1×N optical splitter. Therefore, λ1 and λ2 of the Degree #1 and λ4 of the Degree #2 are received as multi-channel wavelengths by the coherent transponders TP-1, TP-2, and TP-4. Each of the coherent transponders TP-1, TP-2, and TP-4 can selectively receive a desired wavelength by the coherent receiver.

Similarly, in the CD DMUX unit 16#2, λ3 of the Degree #1 and λ1 and λ5 of the Degree #2 can be received by the coherent transponders TP-3, TP-5 and TP-6. At this time, although the coherent transponders TP-1 and TP-6 receive the same wavelength λ1, since the coherent transponders TP-1 and TP-6 are connected to different CD DMUX units 16#1 and 16#2, it is possible to avoid contention.

Next, in the add side of FIG. 9, M CD MUX units 21#1 to 21#M (hereinafter, when they are not distinguished, sometimes referred to as a "CD MUX unit 21") which are connected to transmitters of the coherent transponders are included. With respect to M, due to symmetry with the drop side, since the same number of maintenance blocks are configured in transmission and reception (add side and drop side are set to have the same number of blocks), M is set to the same number in transmission and reception, and however, M may not be necessarily the same.

Figure 11:
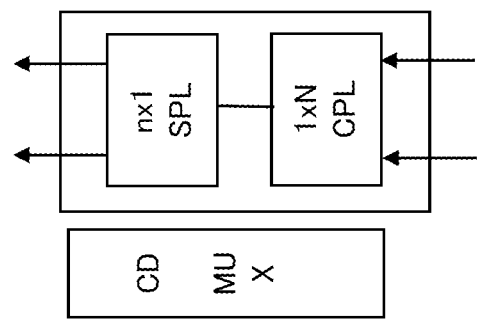
FIG. 11 is a diagram illustrating an example of a configuration of a CD MUX unit of the ROADM illustrated in FIG. 9.

Each of the M CD MUX units 21#1 to 21#M is an example of the wavelength multiplexing block and has ports which can be connected to the N coherent transponders. For example, as illustrated in FIG. 11, each of the CD MUX units 21#1 to 21#M can be configured by using the 1×N optical coupler (CPL) and the n×1 optical splitter (SPL).

The output destinations of the CD MUX units 21#1 to 21#M include the wavelength multiplexing units (WMUs) 22-1#1 and 22-1#2. A wavelength selection switch such as WSS can be used for the wavelength multiplexing units 22-1#1 and 22-1#2. The fiber lines for direction-less are installed between the wavelength multiplexing units 22-1#1 and 22-1#2 and the CD MUX units 21#1 to 21#M, so that it is possible to implement an add-side function corresponding to the CD function. Namely, the optical signals guided from different CD MUX units 21#1 to 21#M are input to each of the wavelength multiplexing units 22-1#1 and 22-1#2 through the fiber lines for direction-less.

The output of the wavelength multiplexing unit 22-1#1 is input to the wavelength multiplexing unit (WMU) 23#1 of the Degree #1. The output of the wavelength multiplexing unit 22-1#2 is input to the wavelength multiplexing unit (WMU) 23#2 of the Degree#2. The wavelength multiplexing unit 23#1 multiplexes the output of the wavelength multiplexing unit 22#1 to output the multiplexed output signal to the WSS 13#1 of the Degree #1. The wavelength multiplexing unit 23#2 multiplexes the output of the wavelength multiplexing unit 22#2 to output the multiplexed output signal to the WSS 13#2 of the Degree#2.

A WSS which can selectively output an input optical signal in units of wavelength may be used for the wavelength multiplexing units 22-1#1 and 22-1#2 of the add side. Since the WSS is used, although wavelengths are simply distributed from the M CD MUXs 21#1 to 21#M and the same wavelength exists between the outputs, it is possible to avoid contention (contention in the same wavelength). Namely, contention-less can be implemented between the CD MUXs 21#1 to 21#M.

The wavelength multiplexing units 23#1 and 23#2 multiplexes the wavelength group of which contention is already avoided in the wavelength multiplexing units 22-1#1 and 22-1#2. Therefore, a WSS or a CPL may be used for the wavelength multiplexing units 23#1 and 23#2.

Figure 13:
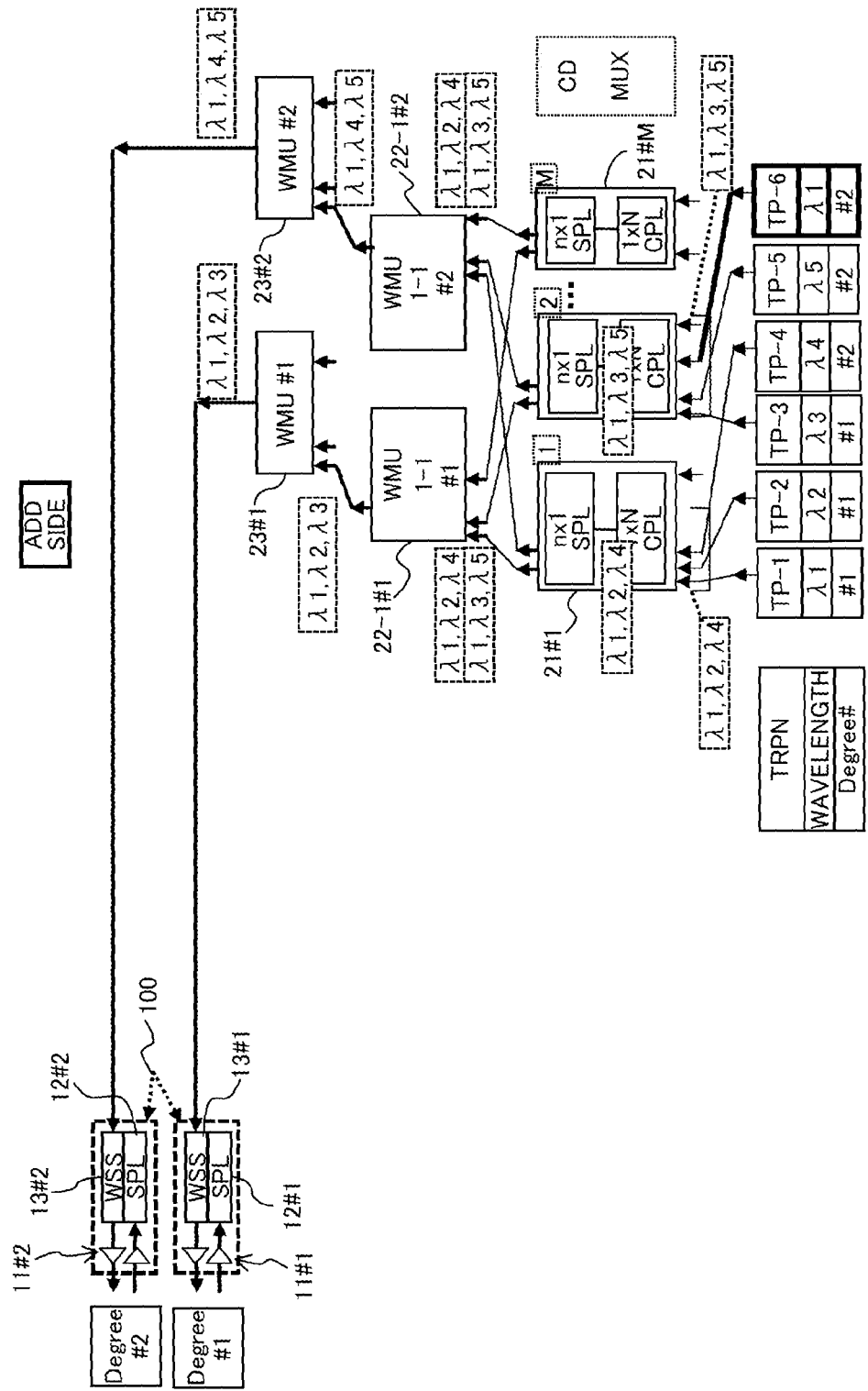
FIG. 13 is a diagram illustrating an example of routes into which wavelengths of each Degree of an add side are inserted in the ROADM illustrated in FIG. 9.

FIG. 13 illustrates an example of routes into which wavelengths of each of the Degrees #1 and #2 of the add side are inserted. FIG. 13 exemplifies a state where three wavelengths of λ1, λ2, and λ3 are added to the Degree #1, and three wavelengths of λ1, λ4, and λ5 are added to the Degree #2.

As illustrated in FIG. 13, among the coherent transponders TP-1, TP-2, . . . , TP-16, the coherent transponders TP-1, TP-2, and TP-4 are connected to the CD MUX unit 21#1, and the coherent transponders TP-3, TP-5, and TP-6 are connected to the CD MUX unit 21#2.

In the CD MUX unit 21#1, three wavelengths of λ1, λ2, and λ4 are multiplexed and branched by the 1×N optical coupler and the n×1 optical splitter. Therefore, λ1 and λ2 of the Degree #1 and λ4 of the Degree #2 are branched and output from the CD MUX unit 21#1.

In the CD MUX unit 21#2, three wavelengths of λ1, λ3, and λ5 are multiplexed and branched by the 1×N optical coupler and the n×1 optical splitter. Therefore, λ3 of the Degree #1 and λ1 and λ5 of the Degree #2 are branched and output from the CD MUX unit 21#2.

A wavelength group of λ1 and λ2 of the Degree #1 and λ4 of the Degree #2 and a wavelength group of λ3 of the Degree #1 and λ1 and λ5 of the Degree #2 are input to the wavelength multiplexing unit 22-1#1 through the fiber lines for direction-less.

The wavelength multiplexing unit 22-1#1 selectively outputs λ1, λ2, and λ3 of the Degree #1 which are to be added to the Degree #1 by using the wavelength selection switch function corresponding to the WSS, so that it is possible to add λ1, λ2, and λ3 to the Degree #1. Similarly, the wavelength multiplexing unit 22-1#2 selectively outputs λ1, λ4, and λ5 of the Degree #2, so that it is possible to add λ1, λ4, and λ5 to the Degree #2. At this time, although the same wavelength λ1 of the Degree #1 and the Degree #2 is input to each of the wavelength multiplexing units 22-1#1 and 22-1#2, it is possible to avoid contention by using the wavelength selection switch function corresponding to the WSS.

In a CD ROADM including the configuration illustrated in FIG. 9, λ1 (for the Degree #1) of the coherent transponder TP-1 is connected to the CD DMUX unit 16#1 and the CD MUX unit 21#1. The case where λ1 (for the Degree #2) of the coherent transponder TP-2 is extended in this state is considered.

Since the same wavelength λ1 is in contention between ports of the CD DMUX unit 16#1 and the CD MUX unit 21#1, λ1 (for the Degree #2) of the coherent transponder TP-2 can not be connected. However, λ1 (for the Degree #2) of the coherent transponder TP-2 can be connected to any one of different CD DMUXs 16#2 to 16#M and any one of different CD MUX units 21#2 to 21#M.

In other words, since only the minimum blocks, that is, the CD DMUX units 16#1 to 16#M and the CD MUX units 21#1 to 21#M can be configured to have a CD function, it possible to implement contention-less between the CD DMUX units 16#1 to 16#M and between the CD MUX units 21#1 to 21#M.

Figure 14:
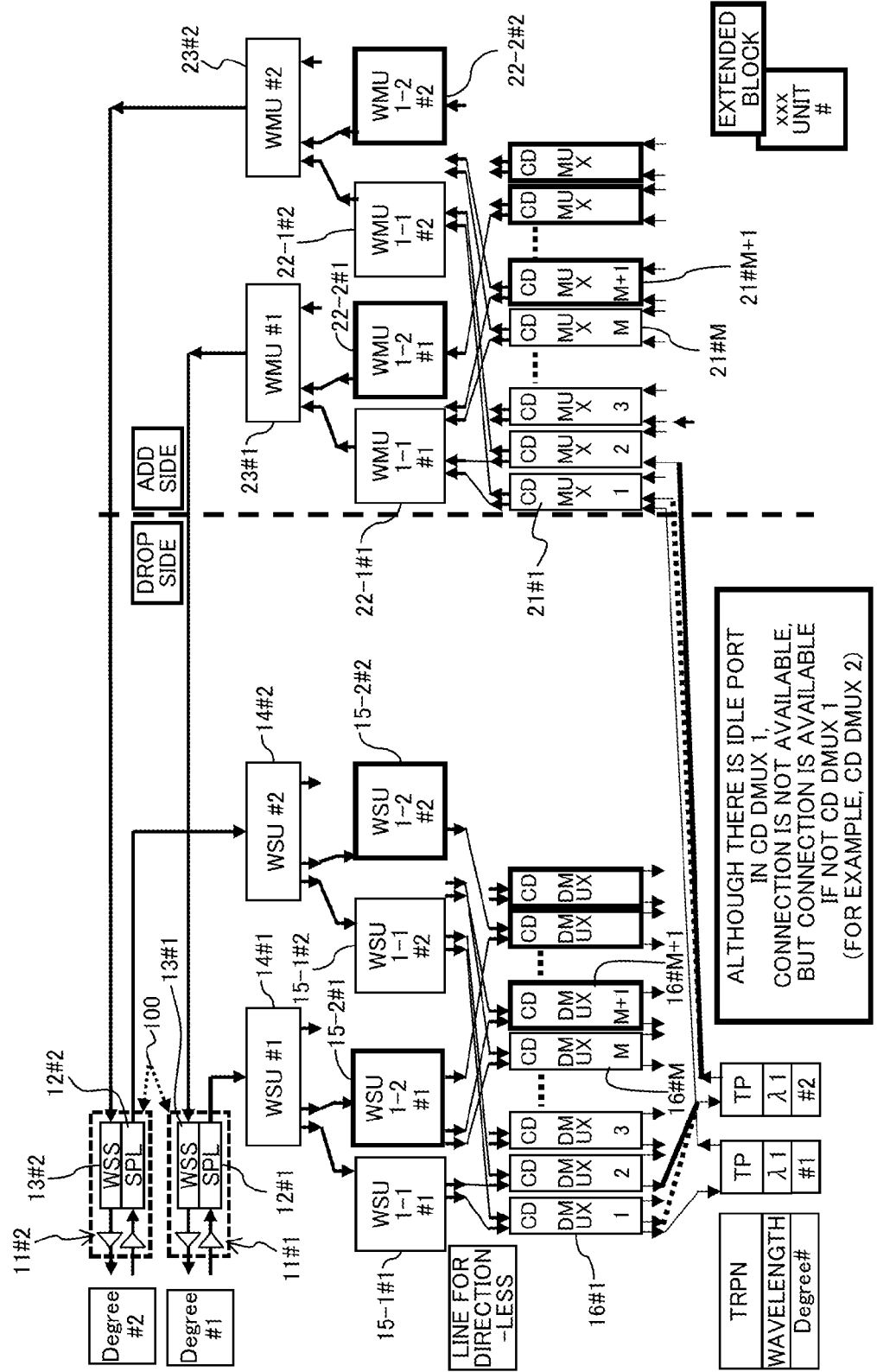
FIG. 14 is a diagram illustrating an example of block extension in the case where the number of added/dropped wavelengths is larger than the maximum number of wavelengths of one WDM optical signal in the ROADM illustrated in FIG. 9.

Next, FIG. 14 illustrates an example of block extension in the case where the number of added/dropped wavelengths is larger than the maximum number of wavelengths of one WDM optical signal. In the case where the number of extended wavelengths is larger than the number corresponding to one Degree, the case can be treated by adding blocks according to the number of extended wavelengths.

In the example of FIG. 14, the drop side is in the state where the wavelength separation units (WSUs) 15-2#1 and 15-2#2 are extended and the CD DMUX unit 16# (M+1) . . . are extended. In addition, the add side is in the state where the wavelength multiplexing units (WMUs) 22-2#1 and 22-2#2 are extended and the CD MUX units 21#(M+1) . . . are extended.

Figure 15:
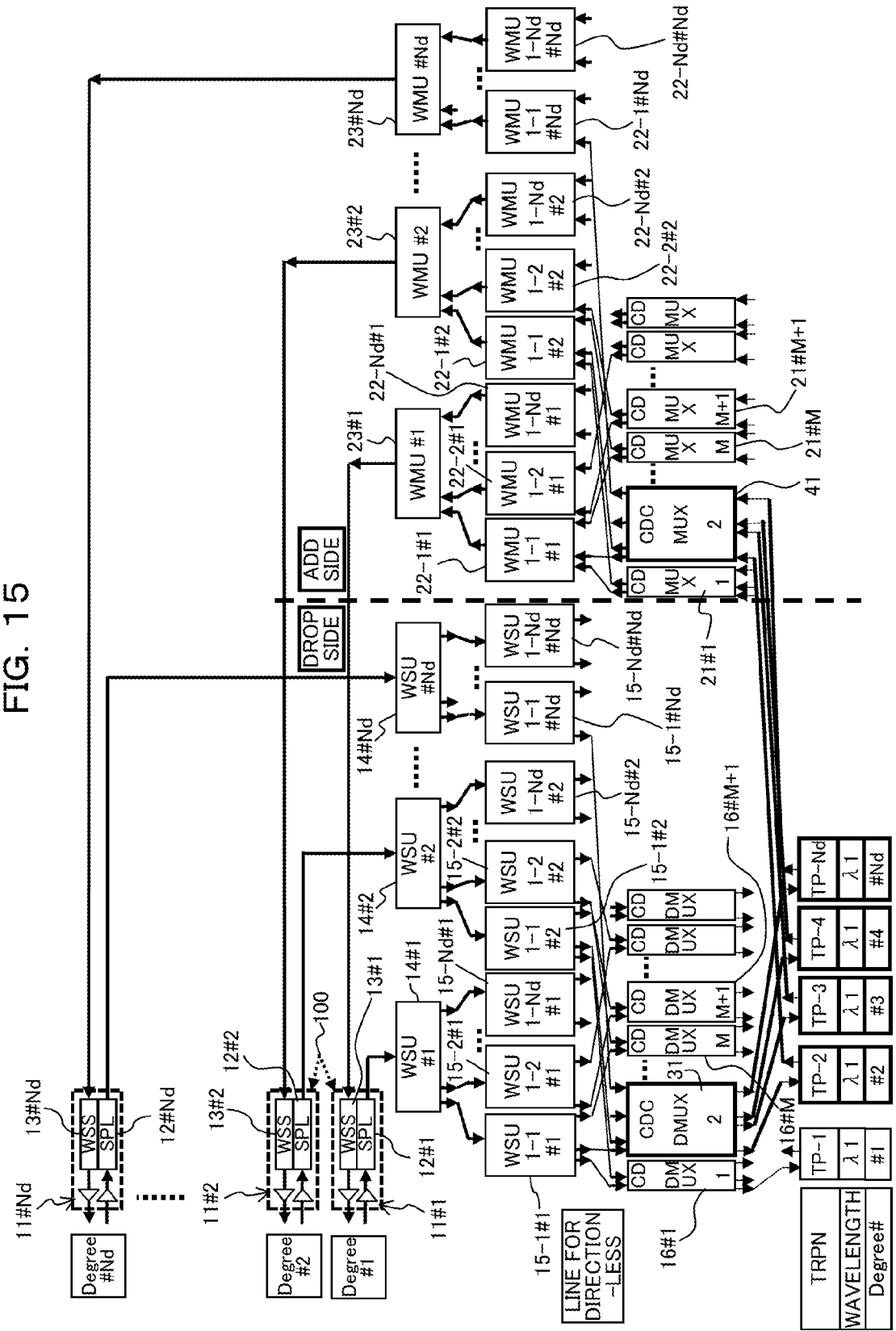
FIG. 15 is a diagram illustrating an example of a configuration of an ROADM in a case where the number of Degrees is Nd.

Next, FIG. 15 illustrates a case of Nd Degrees. In the ROADM illustrated in FIG. 15, in the drop side, wavelength separation units (WSUs) 14#1 to 14#Nd of which number corresponds to the number of Degrees Nd are installed, and as subordinates of each of the wavelength separation units 14#1 to 14#Nd, wavelength separation units (WSUs) 15-1#1 to 15-Nd#1, 15-1#2 to 15-Nd#2, . . . , 15-1#Nd to 15-Nd#Nd are installed.

The wavelength separation units 15-1#1 to 15-Nd#1, 15-1#2 to 15-Nd#2, . . . , 15-1#Nd to 15-Nd#Nd are connected to the CD DMUX units 16#1 to 16#M, 16#(M+1), . . . (hereinafter, when they are not distinguished, sometimes referred to as a "CD DMUX unit 16") or the CDC DMUX unit 31 by lines for direction-less.

Namely, the outputs of the wavelength separation units 15-1#1 to 15-Nd#1, 15-1#2 to 15-Nd, . . . , 15-1#Nd to 15-Nd#Nd of Nd different routes are input to the CD DMUX unit 16 or the CDC DMUX unit 31. For example, upon focusing on the CD DMUX unit 16#1, output ports of the Nd wavelength separation units 15-1#1, 15-1#2, . . . , 15-1#Nd are connected one by one to Nd input ports of the DMUX unit 16.

On the other hand, in the add side, the wavelength multiplexing units (WMUs) 23#1 to 23#Nd of which number corresponds to the number of Degrees Nd are installed, and as subordinates of each of the wavelength multiplexing units 23#1 to 23#Nd, wavelength multiplexing units (WMUs) 22-1#1 to 22-Nd#1, 22-1#2 to 22-Nd, . . . , 22-1#Nd to 22-Nd#Nd are installed.

The wavelength multiplexing units 22-1#1 to 22-Nd#1, 22-1#2 to 22-Nd#2, . . . , 22-1#Nd to 22-Nd#Nd are connected to CD MUX units 21#1 to 21#M, 21#(M+1), . . . (hereinafter, when they are not distinguished, sometimes referred to as a "CD MUX unit 21") or to CDC MUX unit 41 by lines for direction-less.

Each of the CD MUX unit 21 and the CDC MUX unit 41 branches and outputs the optical signal to the wavelength multiplexing units 22-1#1 to 22-Nd#1, 22-1#2 to 22-Nd#2, . . . , 22-1#Nd to 22-Nd#Nd of Nd different route. For example, upon focusing on the CD MUX unit 21#1, the Nd output ports of the MUX unit 21 are connected to the input ports of the Nd wavelength multiplexing units 22-1#1, 22-1#2, . . . , 22-1#Nd one by one.

In addition, FIG. 15 illustrates an example where any one of the CD DMUX units 16#1 to 16#M of the drop side is replaced with a CDC DMUX unit 31 and any one of the CD MUX units 21#1 to 21#M1 of the add side is replaced with a CDC MUX unit 41.

Figure 16:
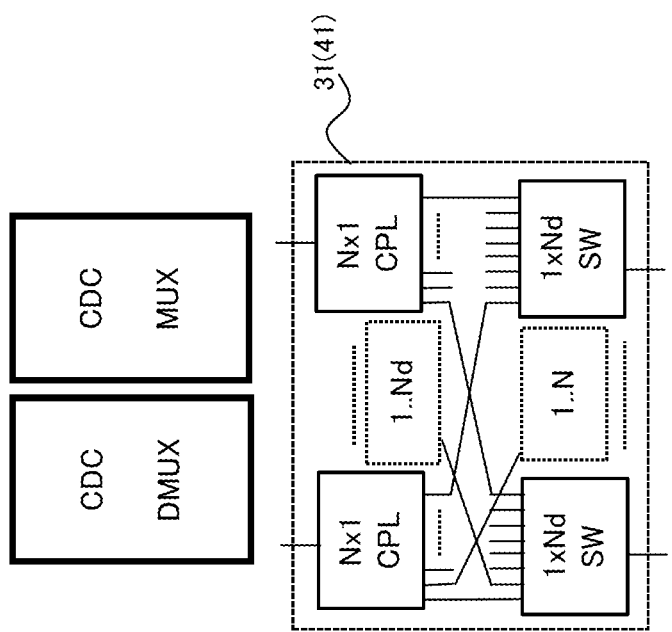
FIG. 16 is a diagram illustrating an example of a configuration of a CDC DMUX/MUX unit of the ROADM illustrated in FIG. 15.

For example, as illustrated in FIG. 16, each of the CDC DMUX unit 31 and the CDC MUX unit 41 may configured by combining N 1×N optical switches (SW) and Nd N×1 optical couplers (CPL). The above-described configuration is the same as that of the N×M optical cross connect (OXC), and the CDC function is implemented by the configuration.

Figure 17:
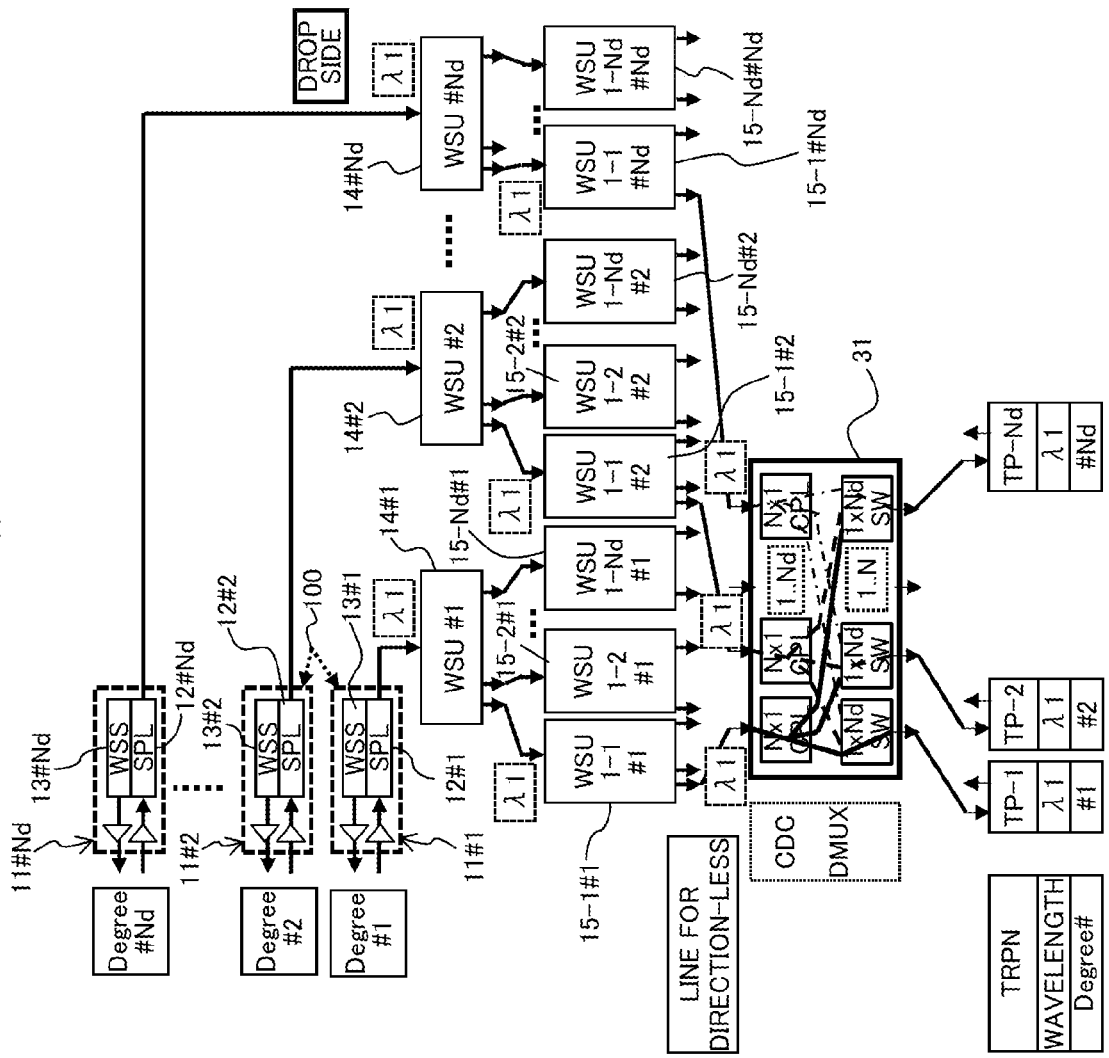
FIG. 17 is a diagram illustrating an example of operations of the CDC DMUX unit illustrated in FIGS. 15 and 16.

FIG. 17 illustrates an example of operations of the CDC DMUX unit 31.

In the case where the same wavelength λ1 is dropped from the Degrees #1, #2, . . . , #Nd in the drop side, the wavelength λ1 of each of the Degrees #1 to #Nd is selected by the wavelength separation units 14#1 to 14#Nd and is connected to the CDC DMUX unit 31.

As illustrated in FIG. 16, the CDC DMUX unit 31 is configured by combining an N×1 optical coupler and a 1×Nd optical switch. The optical signal of λ1 is branched into the N 1×Nd optical switches by the N×1 optical coupler. The 1×Nd optical switch determines received wavelengths of the connected coherent transponders and selects desired λ1 of the Degrees #1 to #Nd, contention-less can be implemented.

Figure 18:
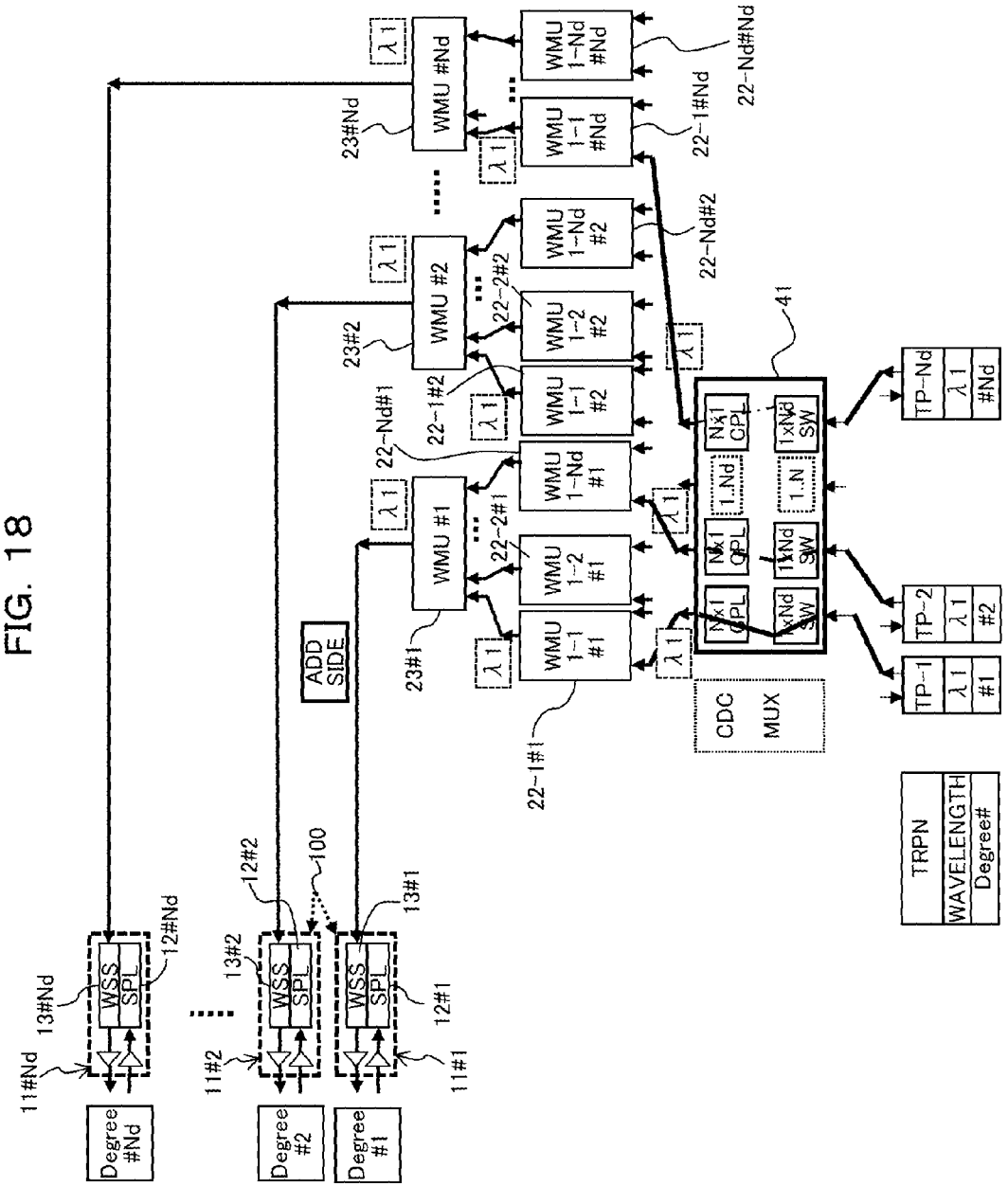
FIG. 18 is a diagram illustrating an example of operations of the CDC MUX unit illustrated in FIGS. 15 and 16.

On the other hand, FIG. 18 illustrates an example of operations of the CDC MUX unit 41.

The case where the same wavelength λ1 from each of the coherent transponders TP1, TP-2, . . . , TP-Nd is added to the Degrees #1, #2, . . . , #Nd in the add side is considered.

The CDC MUX unit 41 is configured by combining a 1×Nd optical switch and an N×1 optical coupler (refer to FIG. 16) and determines the Degrees #1 to #Nd of the output destinations of the connected coherent transponders TP-1 to TP-Nd by the 1×Nd optical switch and selects output sides of the wavelength multiplexing units 22-1#1, 22-1#2, . . . , 22-1#Nd of the Degrees #1 to #Nd. Therefore, λ1 of each of the Degrees #1 to #Nd can be add-connected without contention.

In this manner, the CDC DMUX unit 31 and/or CDC MUX unit 41 can be extended instead of the CDC DMUX unit 16 and/or CDC MUX unit 21. Therefore, when λ1 of the coherent transponders TP-2, TP-3, TP-4, . . . , TP-Nd illustrated in FIG. 15 is to be extended, the same wavelength λ1 can be connected to one set of the CDC DMUX unit 31 and/or CDC MUX unit 41 without extension of new different CD DMUX unit 16 and/or CDC MUX unit 21.

In addition, all the DMUX unit and/or MUX unit connected to the coherent transponders of the drop and/or add side are configured by using the CDC DMUX unit 31 and/or the CD MUX unit 41, so that it is possible to configure a CD ROADM where contention occurs only between the ports of the CD DMUX unit 16 and/or the CD MUX unit 21 which become minimum blocks.

During the wavelength extension or the route extension, the CDC DMUX unit 31 and/or CDC MUX unit 41 is added if necessary, so that it is possible to implement contention-less (CDC function) in the block. At this time, the block can be replaced or extended in units of CD DMUX unit 16 and/or CD MUX unit 21 or in units of CDC DMUX unit 31 and/or CDC DMUX unit 41. Namely, since the other blocks (wavelength separation unit or wavelength multiplexing unit) are not required to be replaced, a CDC function can be added during operation.

In addition, all the CD DMUX unit 16 and/or CD MUX unit 21 is configured by using the CDC DMUX unit 31 and/or the CDC MUX unit 41, it is also possible to implement a CDC ROADM (Full CDC ROADM) with fully selectable ports.

In this manner, according to the above-described embodiment, a CDC function can be added from a CD function requiring large-scaled block replacement during operation, so that it is possible to reduce operating costs. Therefore, an inexpensive CD function is introduced in the initial stage, so that it is possible to suppress costs of equipment investment.

In addition, when wavelength extension, route extension, or the like is to be performed, it is possible to implement contention-less flexibly by extending a CDC function block if needed, so that it is possible to suppress operating costs.

In addition, since the minimum blocks are compatible in terms of the CD/CDC function, upgrading from the CD configuration to the CDC configuration can also be implemented by minimum block replacement.

(Detailed Blocks of CD Configuration: 2 Degrees)

Figure 19:
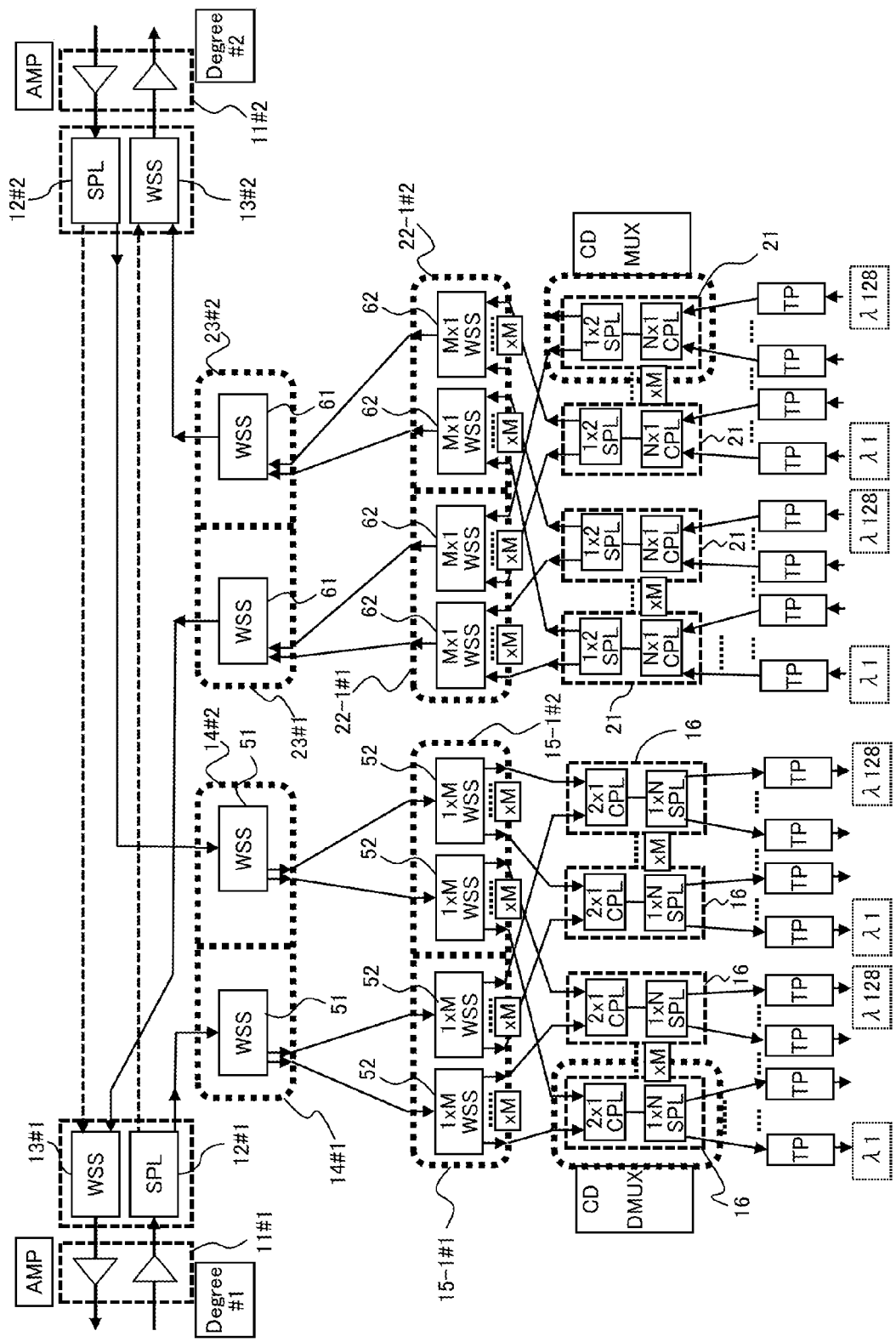
FIG. 19 is a diagram illustrating an example of a detailed configuration of the CD ROADM (2 Degrees) illustrated in FIG. 9.

Next, FIG. 19 is a diagram illustrating an example of a detailed configuration of the CD ROADM (2 Degrees) illustrated in FIG. 9. In the configuration illustrated in FIG. 19, WSS 51 is used for each of the wavelength separation units 14#1 and 14#2 of the drop side. In addition, two 1×M WSSs 52 are used for each of the wavelength separation units 15-1#1 and 15-1#2 of the drop side.

The WSS 51 selectively outputs the WDM optical signal guided from each of the SPL 12#1 or 12#2 in units of wavelength, and herein, the WSS 51 2-branches the input WDM optical signal and inputs the branched WDM optical signals to the two 1×M WSSs 52.

Each of the 1×M WSSs 52 has outputs of which the number M is obtained by dividing the number of the input WDM optical signals (for example, L=128 wavelengths) by N (wavelengths). Each of the M output ports is connected to the input port of each of M different CD DMUX units 16.

The CD DMUX unit 16 may be configured, for example, by combining a 2×1 optical coupler (CPL) and a 1×N optical splitter (SPL). The CD DMUX unit 16 multiplexes the optical signals guided from different routes by using the 2×1 optical coupler and N-branches the optical signal using by the 1×N optical splitter. The N-branched optical signals are input to the respective N coherent transponders TP.

On the other hand, the CD MUX unit 21 of the add side may be configured, for example, by combining an N×1 optical coupler (CPL) and a 1×2 optical splitter (SPL). The CD MUX unit 21 multiplexes the optical signals transmitted from the N coherent transponders TP by using the N×1 optical coupler and 2-branches the optical signal by using the 1×2 optical splitter. The 2-branched optical signals are input to the respective wavelength multiplexing units 22-1#1 and 22-1#2 of different routes.

Each of the wavelength multiplexing units 22-1#1 and 22-1#2 may be configured, for example, by using two M×1 WSSs 62. Each of the M×1 WSSs 62 has M input ports and selectively outputs the optical signals output from the M different CD MUX units 21 to the wavelength multiplexing unit 23#1 or 23#2 of the route #1 or #2 in units of wavelength.

Each of the wavelength multiplexing units 23#1 and 23#2 may be configured by using a WSS 61. The WSS 61 selectively outputs the optical signals guided from the two M×1 WSSs 62 to the WSS 13#1 or 13#2 in units of wavelength.

(Detailed Blocks of CD/CDC Mixed Configuration: 2 Degrees)

Figure 20:
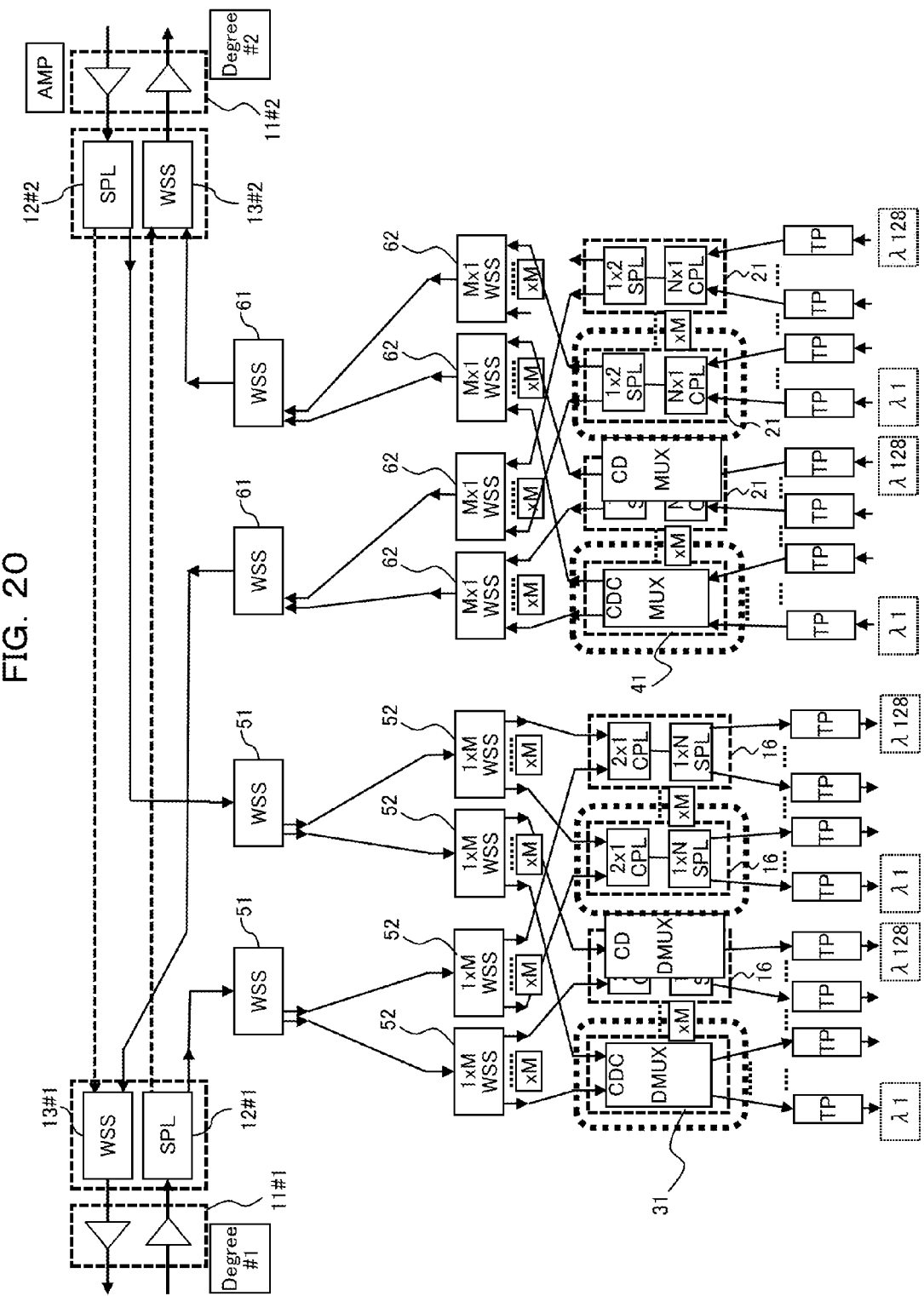
FIG. 20 is a diagram illustrating an example of a detailed configuration of a CD/CDC mixed configuration (2 Degrees) illustrated in FIG. 15.
Figure 21:
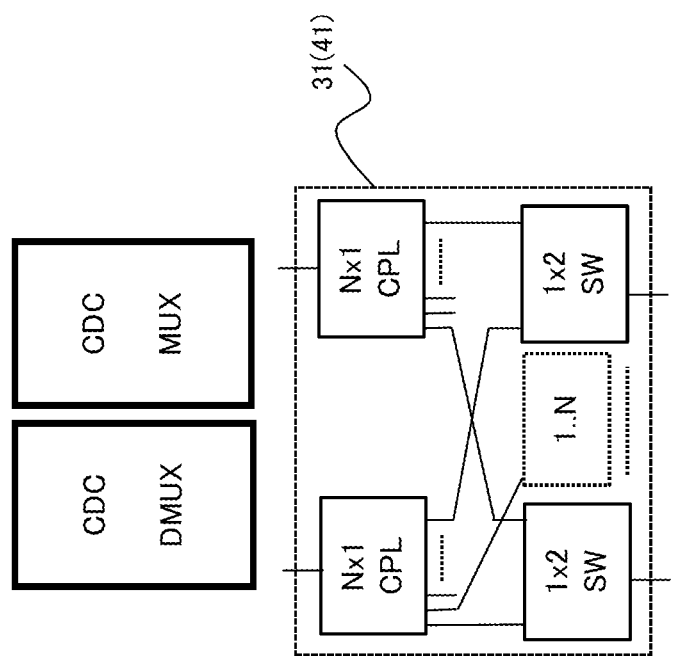
FIG. 21 is a diagram illustrating an example of a configuration of a CDC DMUX/MUX unit illustrated in FIG. 20.

Next, FIG. 20 is a diagram illustrating an example of a detailed configuration of the CD/CDC mixed configuration (2 Degrees) illustrated in FIG. 15. In FIG. 20, the components denoted by the same reference numerals in FIG. 19 are the same as or similar to the above-described components in FIG. 19. This example is the case where the number of Degrees Nd=2, and each of the CD DMUX unit 31 and the CD MUX unit 41 may be configured, for example, by combining two N×1 optical couplers (CPL) and N 1×2 optical switches (SW) as illustrated in FIG. 21.

(Detailed Blocks of CD Configuration: Nd Degrees)

Figure 22:
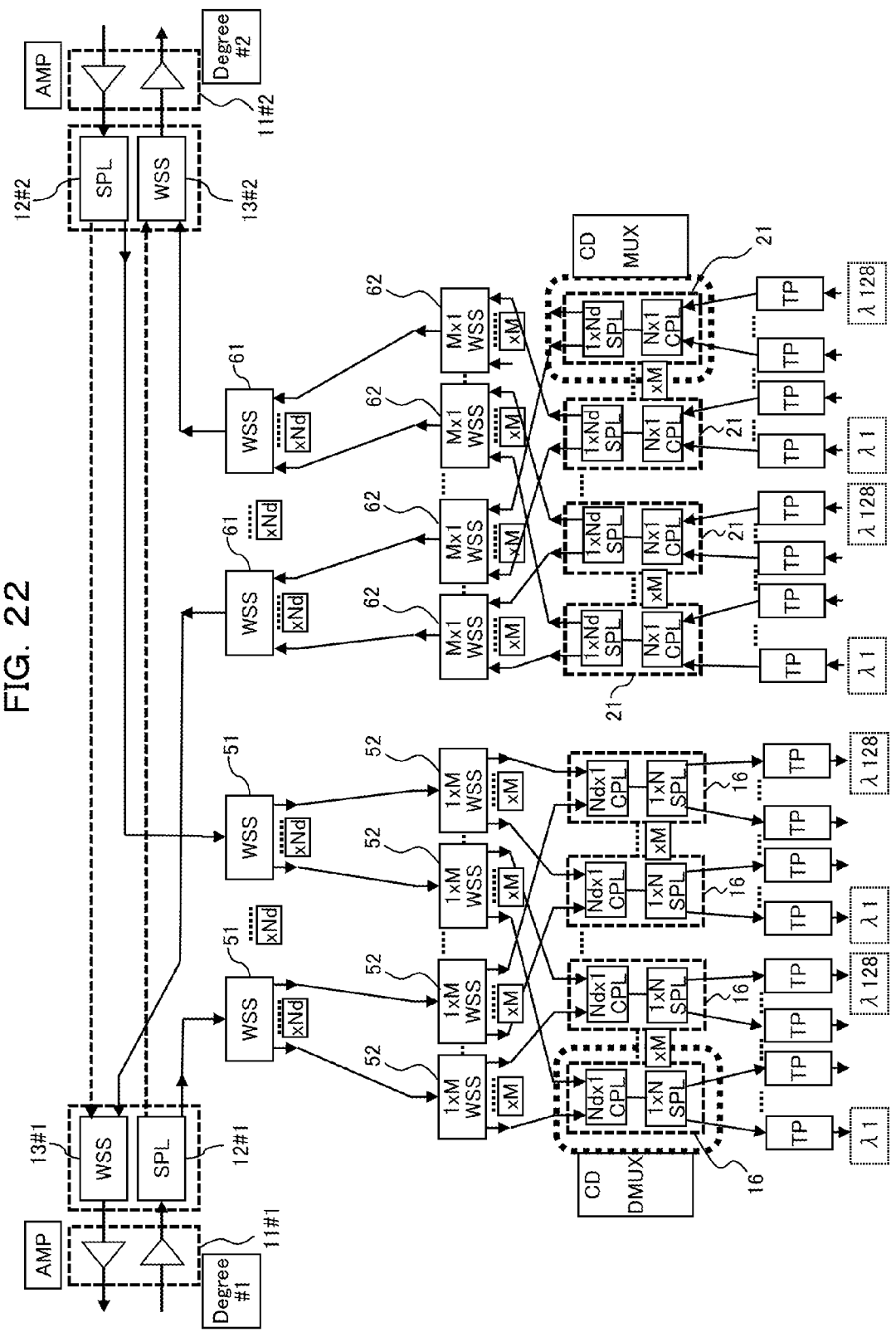
FIG. 22 is a diagram illustrating an example of a detailed configuration of the case where the configuration illustrated in FIG. 19 is generalized to a configuration including the number of Degrees Nd.

FIG. 22 is a diagram illustrating an example of a detailed configuration of the case where the configuration illustrated in FIG. 19 is generalized to a configuration including the number of Degrees Nd.

In the case of this example, Nd WSSs 51 of the drop side corresponding to the number of Degrees Nd are installed. In addition, M 1×M WSSs 52 are installed with respect to each of the Nd WSSs 51.

Nd WSSs 61 of the add side corresponding to the number of Degrees Nd are also installed. In addition, M M×1 WSSs 62 are installed with respect to each of the Nd WSSs 61.

In addition, each of the CD DMUX units 16 may be configured by combining an Nd×1 optical coupler (CPL) and a 1×N optical splitter (SPL). Each of the CD DMUX units 16 multiplexes the optical signals dropped from Nd different routes by using the Nd×1 optical coupler and N-branches the multiplexed optical signals by using the 1×N optical splitter. Each of the N-branched optical signals is input to the N coherent transponders.

On the other hand, each of the CD MUX units 21 of the add side may be configured by combining an N×1 optical coupler (CPL) and a 1×Nd optical splitter (SPL). Each of the CD MUX units 21 multiplexes the optical signals transmitted from the N coherent transponders TP by using the N×1 optical coupler and Nd-branches the multiplexed optical signals by using the 1×Nd optical splitter. Each of the Nd-branched optical signals is input to the M×1 WSSs 62 of different routes #1 to #Nd.

The M×1 WSS 62 has M input ports and selectively outputs the optical signals output from the M different CD MUX units 21 to the WSS 61 of the corresponding route #1 or #2 in units of wavelength.

Each of the Nd WSSs 61 selectively outputs the optical signals guided from the Nd M×1 WSSs 62 to the WSS 13#1 or 13#2 in units of wavelength.

(Detailed Blocks of CD/CDC Mixed Configuration: Nd Degrees)

Figure 23:
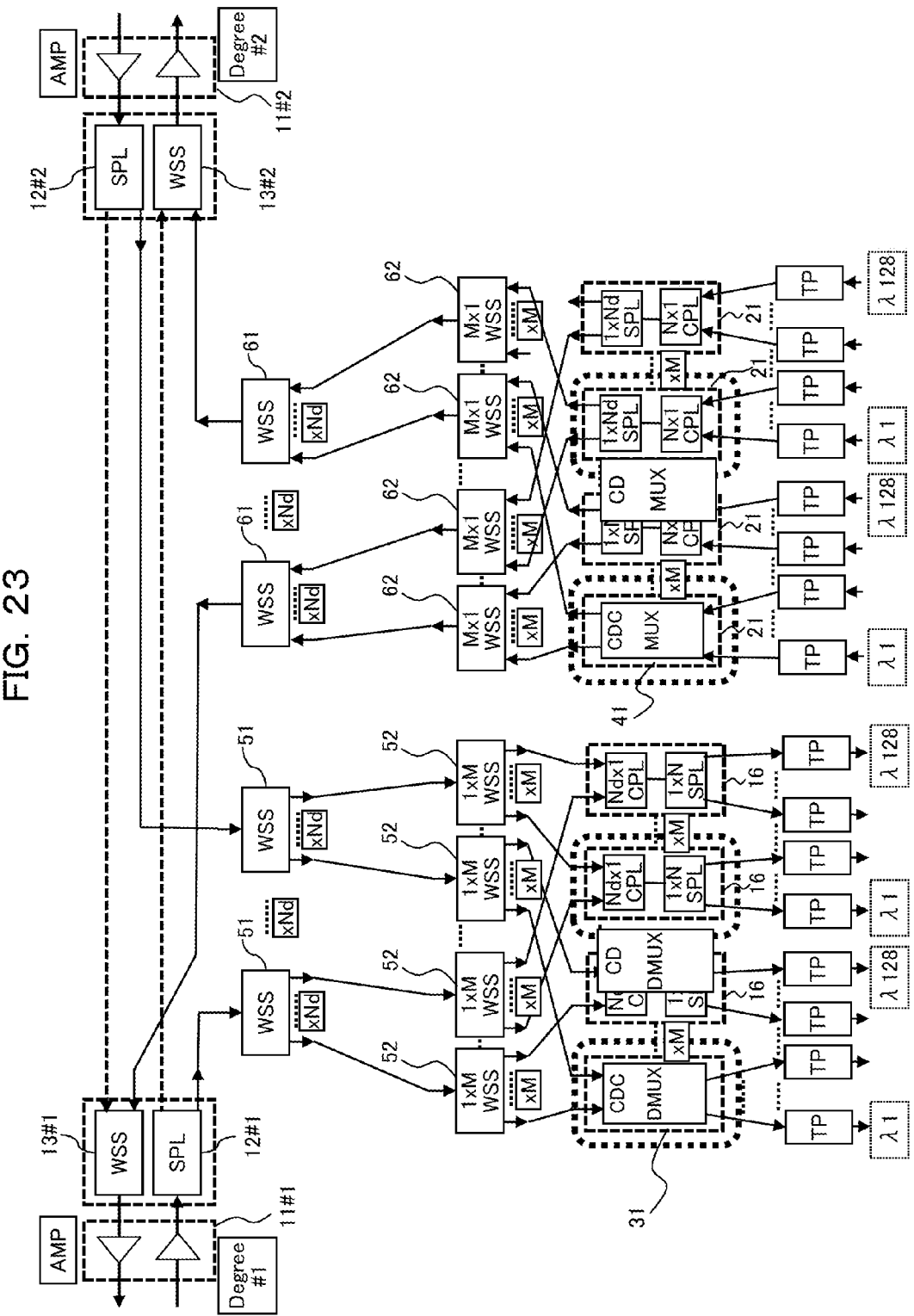
FIG. 23 is a diagram illustrating an example where a CD function and a CDC function are mixed in the example of the detailed configuration illustrated in FIG. 21.
Figure 24:
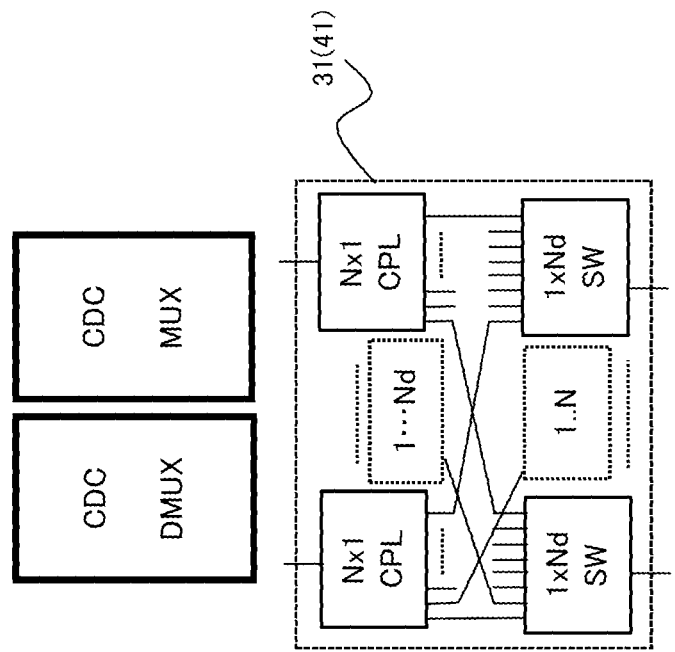
FIG. 24 is a diagram illustrating an example of a configuration of a CDC DMUX/MUX unit illustrated in FIG. 23.

Next, FIG. 23 illustrates an example where the CD function and the CDC function in the example of detailed configuration illustrated in FIG. 21 are mixed. In the case of this example, for example, as illustrated in FIG. 24, each of the CDC DMUX unit 31 and the CDC MUX unit 41 may be configured by combining Nd N×1 optical couplers (CPL) and N 1×Nd optical splitters (SPL).

The CDC DMUX unit 31 multiplexes the optical signals guided from the 1×M WSS 52 of the Nd different routes to the Nd input ports and selects the dropped wavelength by using the 1×Nd optical switch to output the dropped wavelength through the N output ports.

The CDC MUX unit 41 selects the output destination route (switches the route) of the optical signals transmitted from the N coherent transponders TP by using the 1×Nd optical switch and multiplexes the optical signals by using the Nd N×1 optical couplers. The multiplexed Nd optical signals are input to the M×1 WSS 62 of each of the different routes #1 to #Nd.

(8-Degree Full CD)

Figure 25:
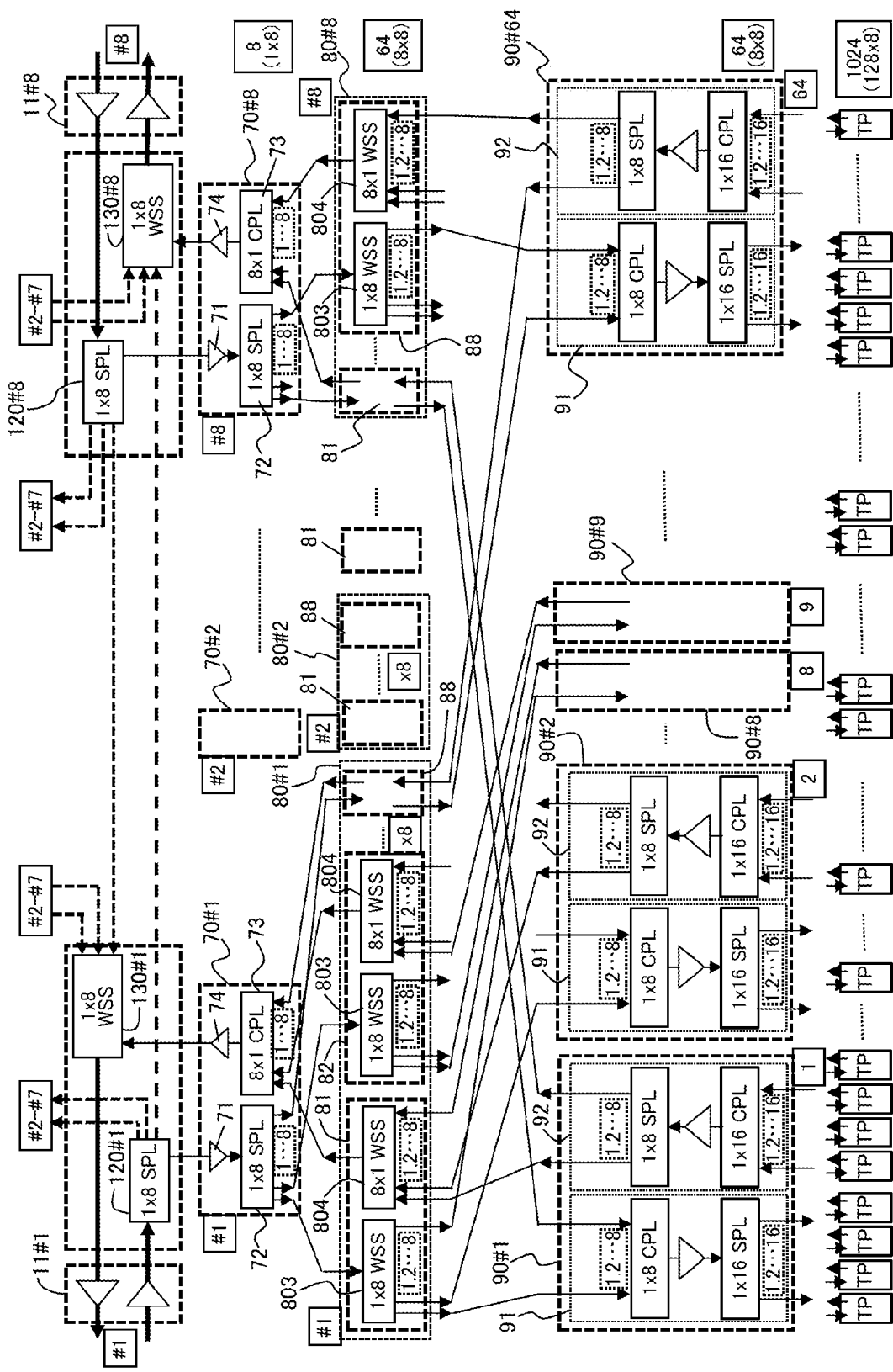
FIG. 25 is a diagram illustrating an example of a detailed configuration of an ROADM with an 8-Degree full CD configuration.

Next, FIG. 25 illustrates an example of a detailed configuration of an ROADM including an 8-Degree full CD configuration. FIG. 25 illustrates an example of the case where the maximum number of multi-channel reception of each of the coherent transponders TP is set to N=16 and the maximum number of wavelengths of one WDM optical signal is set to L=128.

In the ROADM illustrated in FIG. 25, with respect to each of the Degrees #1 to #8, optical amplifiers 11#1 to 11#8, 1×8 optical splitters (SPLs) 120#1 to 120#8, and 1×8 wavelength selection switches (WSSs) 130#1 to 130#8 are installed. In FIG. 25, the optical amplifiers 11#2 to 11#7, the 1×8 SPLs 120#2 to 120#7, and the 1×8 WSSs 130#2 to 130#7 are omitted in illustration.

The 1×8 optical splitter (SPL) 120#j (j=any one of 1 to Nd (=8)) 8-branches the WDM optical signal amplified and input by the optical amplifier 11#1 of the Degree #j. One of the 8-branched WDM optical signals is input to the add/drop block 70#j of the corresponding Degree #j.

Each of the rest of seven WDM optical signals among the 8-branched WDM optical signals is input (through-connected) to the 1×8 WSS 130#k of a different Degree #k (k=any one of 1 to 8, k≠j). For example, the WDM optical signal with respect to the Degree #8 is input to the 1×8 WSS 130#8 of the Degree #8. The WDM optical signal with respect to the Degree #1 is input to the 1×8 WSS 130#1 of the Degree #1.

The 1×8 WSS 130#j selectively outputs the optical signal including the add wavelength from the corresponding add/ drop block 70#j and the WDM optical signal through-input from a different Degree #k to the optical amplifier 11#j in units of wavelength.

The add/drop block 70#j is configured to include, for example, an optical amplifier 71 and a 1×8 optical splitter (SPL) 72 as an example of drop functions and an 8×1 optical coupler 73 and an optical amplifier 74 as an example of add functions. Note that, one or both of the optical amplifiers 71 and 74 may be deleted when a sufficient signal level and signal quality of the input optical signal can be secured.

The 1×8 SPL 72 of the drop side fulfills the function equal to that of the WSS 51 illustrated in FIG. 22. The 1×8 SPL 72 8-branches the optical signal dropped from the Degree #j and inputs each of the branched optical signals to different eight add/drop blocks 81 to 88 constituting the add/drop block 80#j of the Degree #j.

The 8×1 CPL 73 of the add side fulfills a function equivalent to the WSS 61 illustrated in FIG. 22. The 8×1 CPL 73 multiplexes the optical signals guided from the different eight add/drop blocks 81 to 88 constituting the add/drop block 80#j of the Degree #j.

Each of the add/drop blocks 81 to 88 is configured to include a 1×8 WSS 803 as an example of the wavelength separation unit of the drop side and an 8×1 WSS 804 as an example of the wavelength multiplexing unit of the add side.

The 1×8 WSS 803 of the drop side corresponds to the WSS 52 of the drop side illustrated in FIG. 22 and limits the input optical signals to the number of wavelengths N (for example, 16) which can be simultaneously received by the TP (coherent receiver) (for example, 8-division).

The 8-divided optical signals are input to eight different DMUX/MUX blocks among the DMUX/MUX blocks 90#1 to 90#64 (hereinafter, when they are not distinguished, sometimes referred to as a "DMUX/MUX block 90"). A total number of 64 DMUX/MUX blocks 90 are installed by providing 8 blocks to each of 8 Degrees #1 to #8.

The 8×1 WSS 804 of the add side corresponds to the WSS 62 of the add side illustrated in FIG. 22 and selectively outputs the optical signals guided from the different eight DMUX/MUX blocks among DMUX/MUX blocks 90#1 to 90#64 in units of wavelength.

Each of the DMUX/MUX block 90 is configured to include a CD DMUX unit 91 and a CD MUX unit 92. The CD DMUX unit 91 corresponds to the CD DMUX unit 16 illustrated in FIG. 22, and the CD MUX unit 92 corresponds to the CD MUX unit 21 illustrated in FIG. 22.

Note that, although each of the CD DMUX unit 91 and the CD MUX unit 92 is configured to include an optical amplifier in FIG. 25, one or both of the optical amplifiers may be deleted when a sufficient signal level and signal quality of the input optical signal can be secured (hereinafter, the same as the above description).

According to the above-described configuration, it is possible to implement an ROADM with an 8-Degree full CD configuration.

(8-Degree Full CDC)

Figure 26:
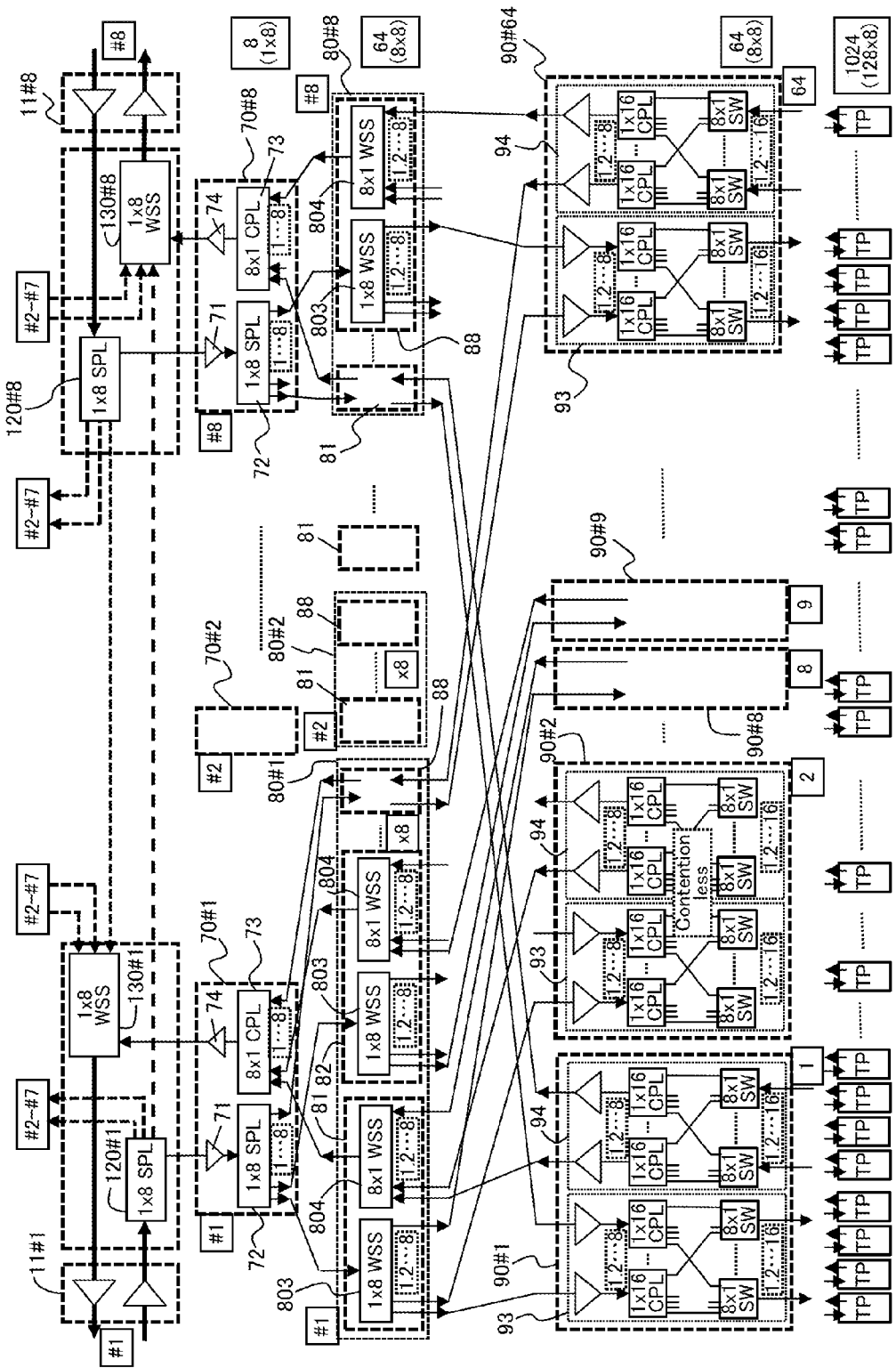
FIG. 26 is a diagram illustrating an example of a detailed configuration of an ROADM with an 8-Degree full CDC configuration.

FIG. 26 is a diagram illustrating an example of a detailed configuration of an ROADM with an 8-Degree full CDC configuration. The configuration illustrated in FIG. 26 corresponds to a configuration where the CD DMUX unit 91 in the configuration illustrated in FIG. 25 is replaced with a CDC DMUX unit 93 and the CD MUX unit 92 is replaced with a CDC MUX unit 94.

The CDC DMUX unit 93 corresponds to the CDC DMUX unit 31 illustrated in FIGS. 23 and 24, and the CDC MUX unit 94 corresponds to the CDC MUX unit 41 illustrated in FIGS. 23 and 24.

Although each of the CDC DMUX unit 93 and the CDC MUX unit 94 is configured to include an optical amplifier in FIG. 26, one or both of the optical amplifiers may be deleted when a sufficient signal level and signal quality of the input optical signal can be secured (hereinafter, the same as the above description).

According to the above-described configuration, it is possible to implement an ROADM including an 8-Degree full CDC configuration.

(8-Degree Full CD/CDC Mixed ROADM)

Figure 27:
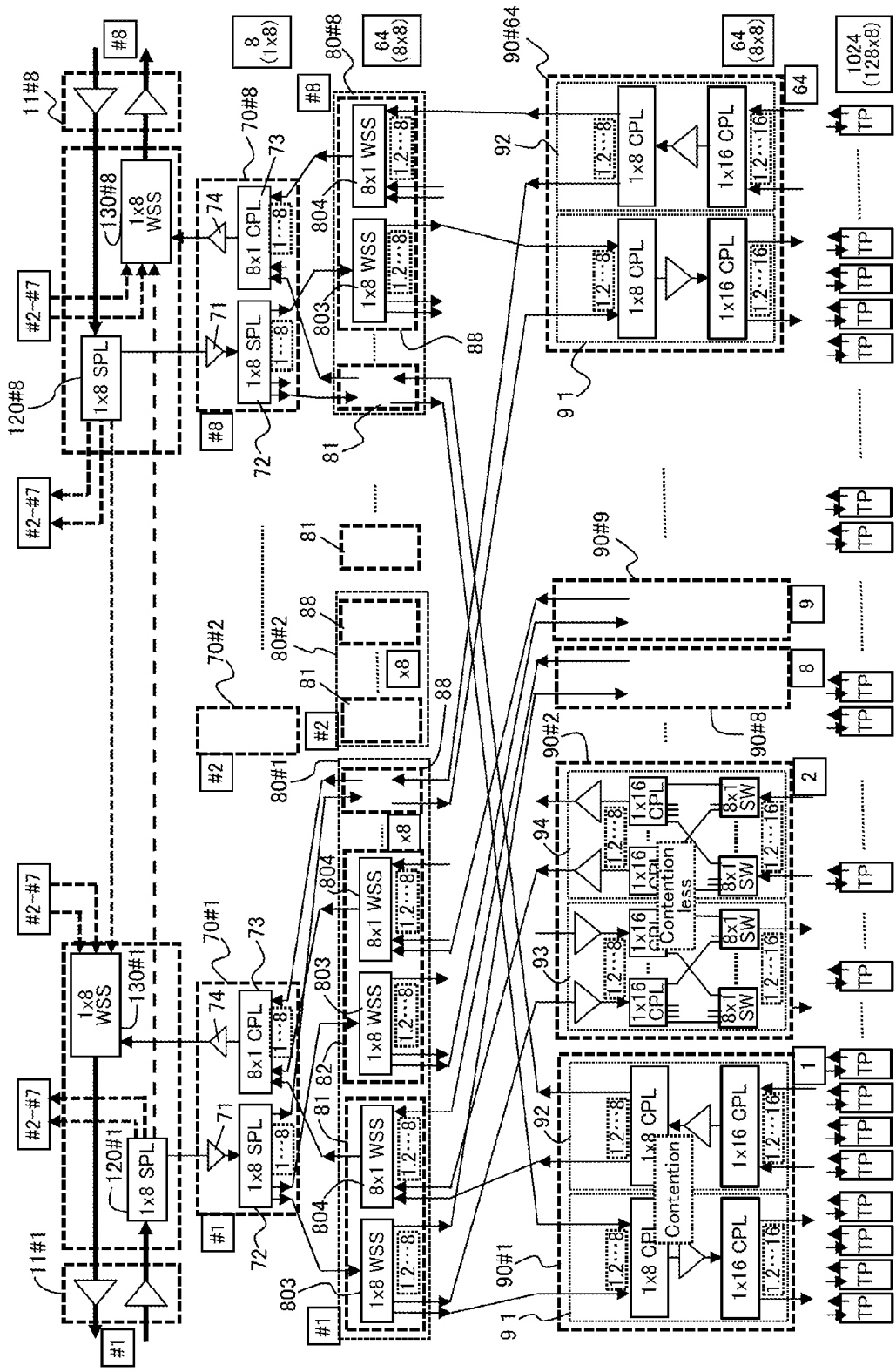
FIG. 27 is a diagram illustrating an example of a detailed configuration of an ROADM with an 8-Degree full CD/CDC mixed configuration.

FIG. 27 is a diagram illustrating an example of a detailed configuration of an ROADM with an 8-Degree full CD/CDC mixed configuration. The configuration illustrated in FIG. 27 corresponds to a configuration where a part of the CD DMUX units 91 (for example, block 90#2) of the DMUX/MUX blocks 90 in the configuration illustrated in FIG. 25 is replaced with a CDC DMUX unit 93 and the CD MUX unit 92 is replaced with a CDC MUX unit 94.

According to the configuration illustrated in FIG. 27, an 8-Degree full ROADM where a CD function and a CDC function are mixed is implemented.

(8-Degree Full CD Configuration)

Figure 28:
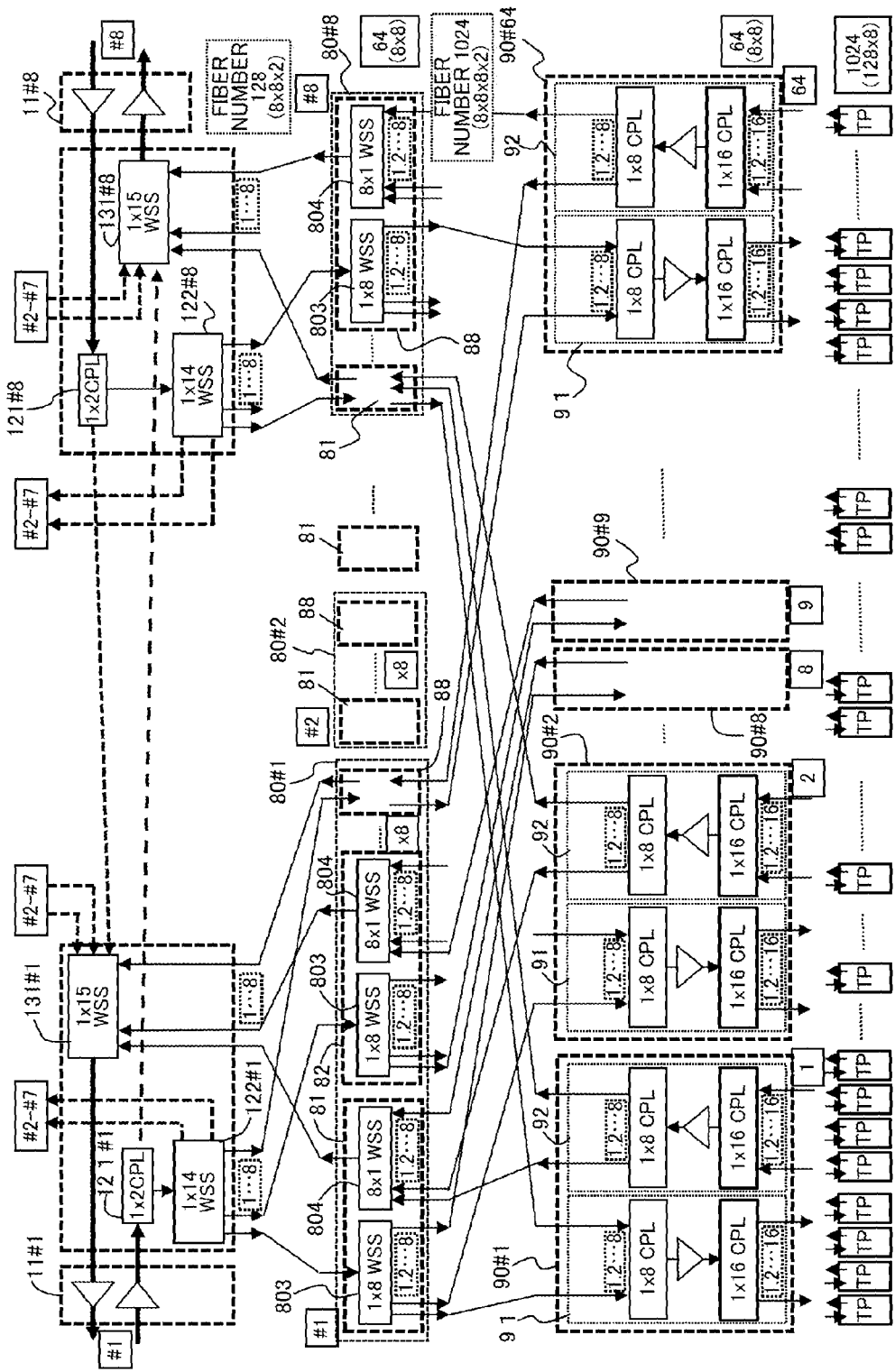
FIG. 28 is a diagram illustrating a modified example of the detailed configuration of the ROADM with an 8-Degree full CD configuration illustrated in FIG. 25.

FIG. 28 is a diagram illustrating a modified example of an example of a detailed configuration of an ROADM with an 8-Degree full CD configuration illustrated in FIG. 25.

The configuration illustrated in FIG. 28 corresponds to a configuration where the functions of the 1×8 SPL 120#j and the 1×8 SPL 72 in the configuration illustrated in FIG. 25 are implemented by a 1×2 optical coupler (CPL) and a 1×14 WSS. In addition, the configuration illustrated in FIG. 28 corresponds to a configuration where the functions of the 8×1 CPL 73 and the 1×8 WSS 130#j in the configuration illustrated in FIG. 25 are implemented by a 1×15 WSS.

In other words, with respect to a core portion connected to an optical amplifier 11#j of each Degree #j, the core portion in the drop side is configured with a 1×2 CPL 121#j and a 1×14 WSS 122#j, and the core portion in the add side is configured with a 1×15 WSS 131#j. This configuration corresponds to a configuration where the function of the wavelength separation unit 14#j illustrated in FIG. 15 is incorporated into the 1×14 WSS 122#j and the function of the wavelength multiplexing unit 23#j illustrated in FIG. 15 is incorporated into the 1×15 WSS 131#j.

Figure 40:
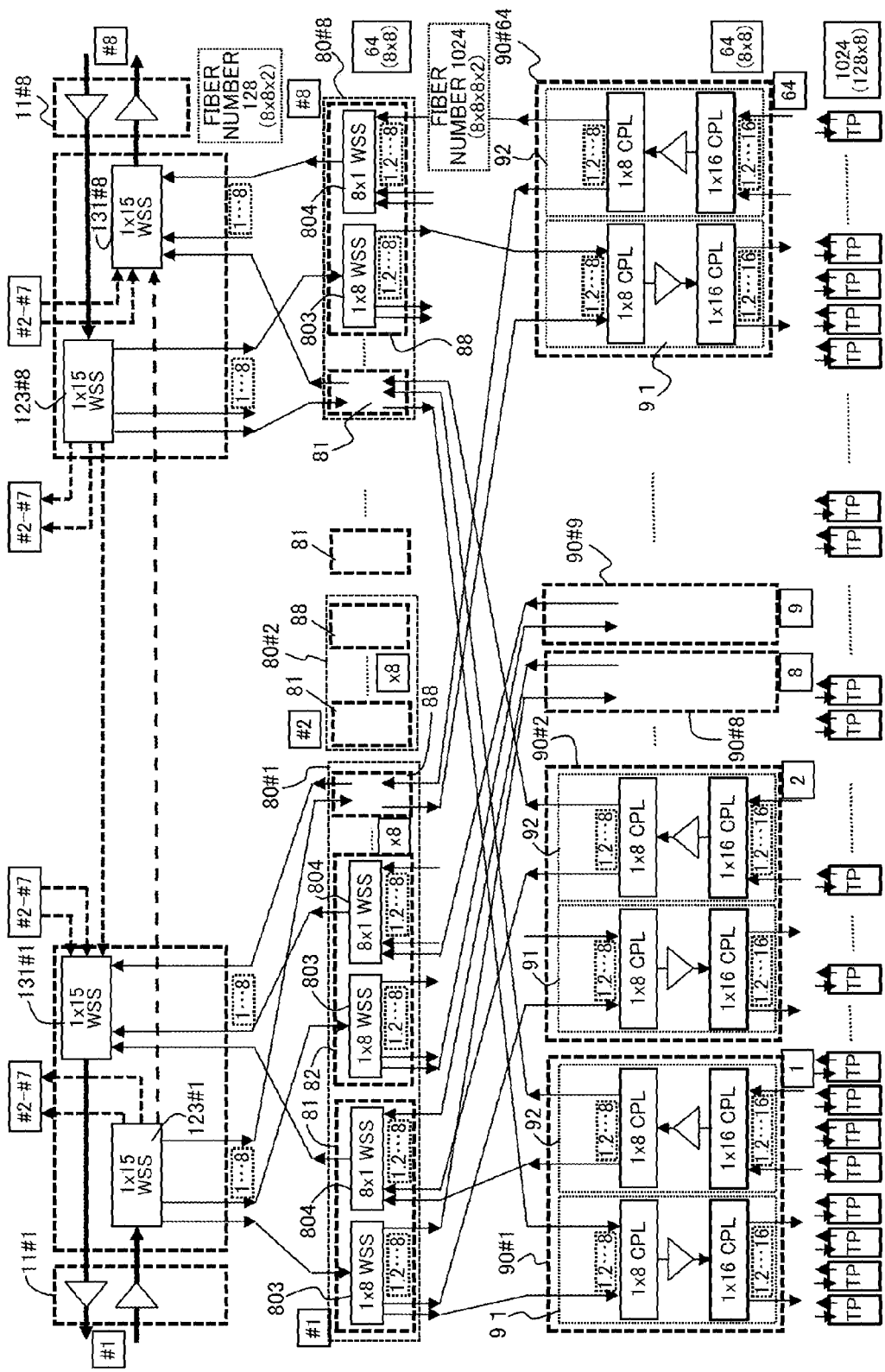
FIG. 40 is a diagram illustrating a modified example of an ROADM with an 8-Degree full CD function illustrated in FIG. 28.

Note that, both of the 1×15 WSS 131#j and the 1×14 WSS 122#j may be configured with a 1×20 WSS, and an idle port may not be in use. In addition, the functions of the 1×2 CPL 121#j and the 1×14 WSS 122#j of the core portion in the drop side may be implemented, for example, by one 1×15 WSS 123#j (or 1×20 WSS) as illustrated in FIG. 40. In this case, in addition to reducing the number of parts, it is possible to reduce insertion loss by the CPL 121#j.

Figure 29:
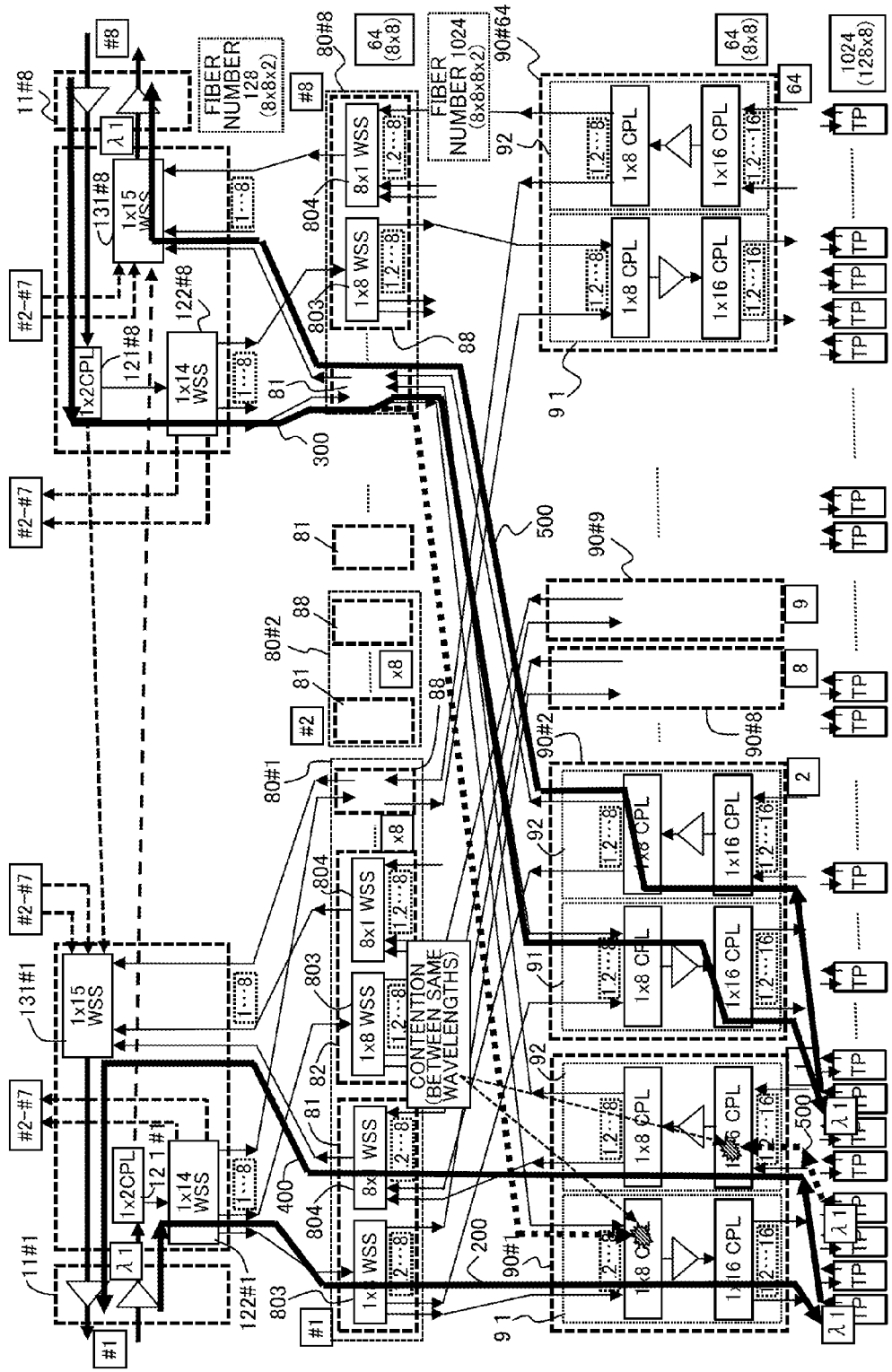
FIG. 29 is a diagram illustrating an example of drop paths and add paths in the configuration illustrated in FIG. 28.

FIG. 29 illustrates an example of the drop paths and the add paths in the configuration illustrated in FIG. 28. In FIG. 29, the drop paths of the wavelength λ1 of the Degree #1 and the Degree #8 are indicated by thick solid arrows 200 and 300, and the add paths of the wavelength λ1 of the Degree #1 and the Degree #8 are indicated by thick solid arrows 400 and 500.

As illustrated in the drop paths 200 and 300, as long as the drop wavelength λ1 is connected to different DMUX/MUX blocks 90#1 and 90#2 as minimum blocks, contention does not occur (contention-less). Note that, the drop path indicated by a thick dotted arrow 301 illustrates the state where contention in the same drop wavelength λ1 occurs in the 1×8 CPL of the CD DMUX unit 91 in the same DMUX/MUX block 90#1.

On the other hand, as illustrated in the add paths 400 and 500, as long as the add wavelength λ1 is connected to different DMUX/MUX blocks 90#1 and 90#2 as minimum blocks, contention does not occur (contention-less). Note that, the add path indicated by a thick dotted arrow 501 illustrates the state where contention of the same add wavelength λ1 occurs in the 1×16 CPL of the CD MUX unit 92 in the same DMUX/MUX block 90#1.

In this manner, although contention in the same wavelength is permitted in the DMUX/MUX blocks 90#m (m=any one of 1 to 64) as minimum blocks, contention in the same wavelength does not occur between different DMUX/MUX blocks 90#m. Therefore, it is possible to implement a CD ROADM where there is small limitation in optical fiber connection destination of a TP (in other words, a degree of freedom is high).

(8-Degree Full CDC)

Figure 30:
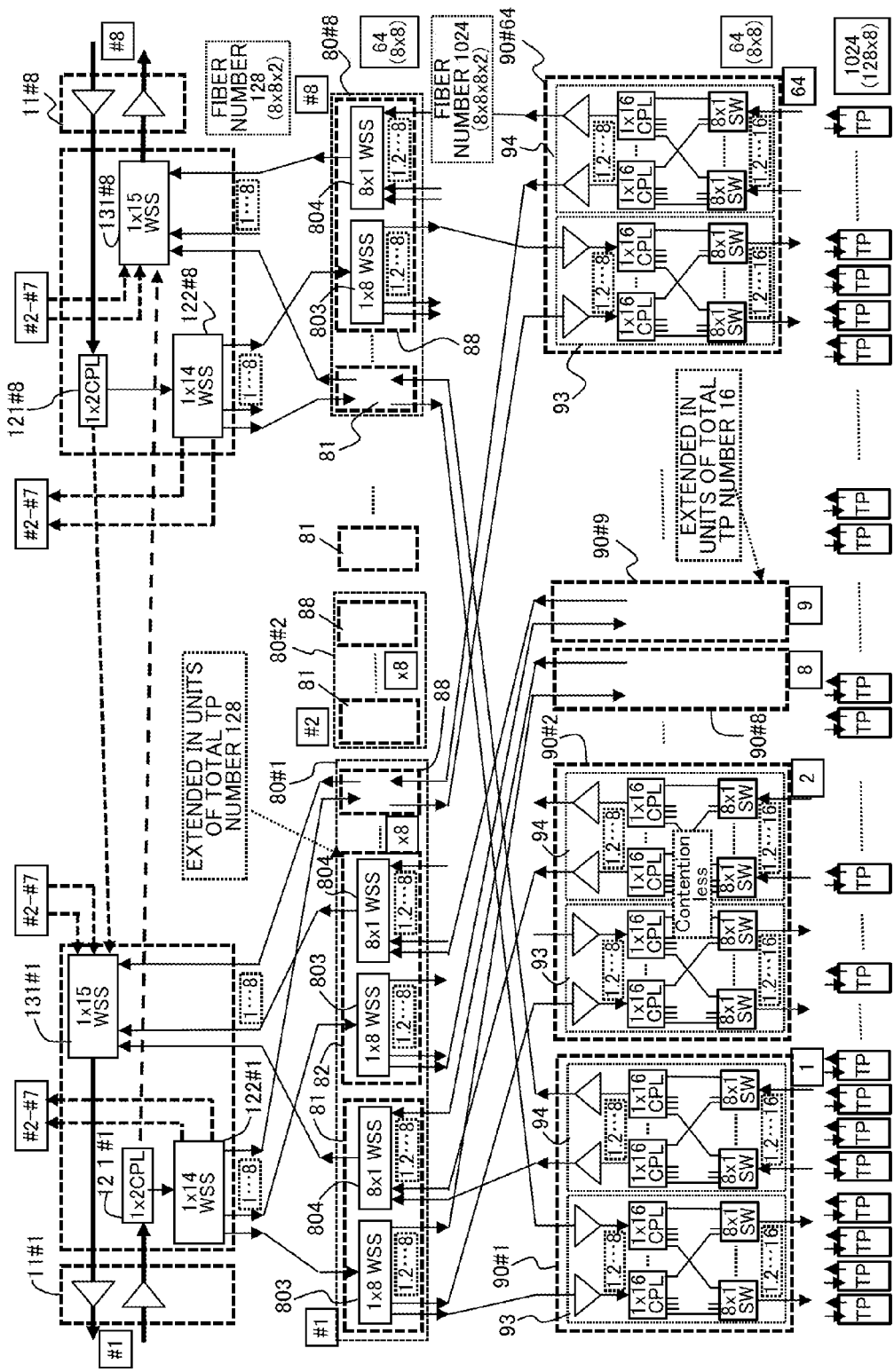
FIG. 30 is a diagram illustrating an example of a configuration where DMUX/MUX blocks are replaced with a block with a CDC function in the configuration illustrated in FIG. 28.

Next, FIG. 30 illustrates an example of a configuration where each of the DMUX/MUX blocks 90#m in the configuration illustrated in FIG. 28 is replaced with a block including a CDC function. Namely, each of the DMUX/MUX blocks 90#m illustrated in FIG. 30 is configured to include the CDC DMUX unit 93 and the CDC MUX unit 94 illustrated in FIG. 26.

In other words, the configuration illustrated in FIG. 30 corresponds to a configuration where, similarly to the configuration illustrated in FIG. 28, with respect to a core portion connected to an optical amplifier 11#j of each Degree #j in the configuration illustrated in FIG. 26, the core portion in the drop side is configured with a 1×2 CPL 121#j and a 1×14 WSS 122#j, and the core portion in the add side is configured with a 1×15 WSS 131#j.

Figure 31:
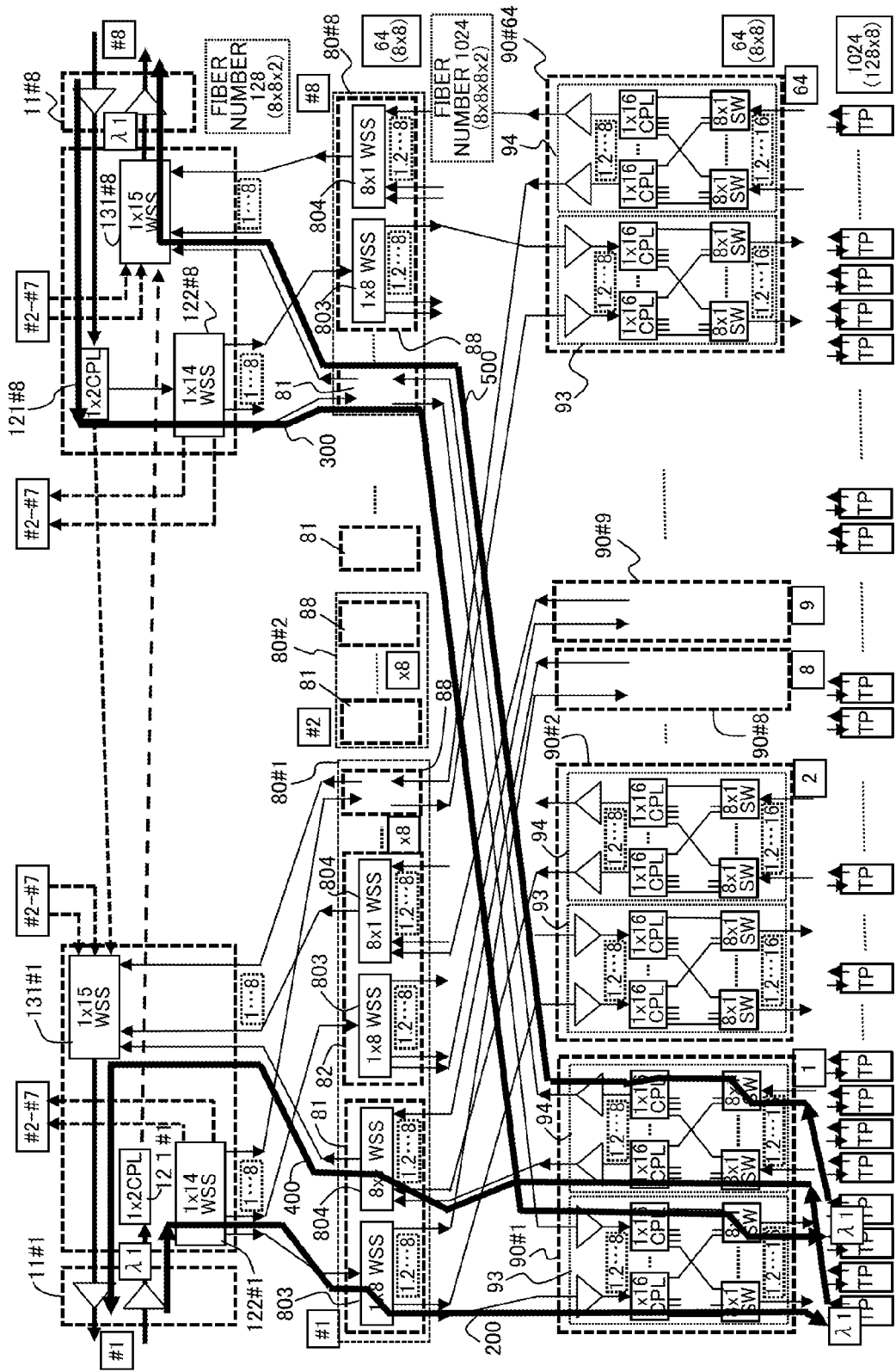
FIG. 31 is a diagram illustrating an example of drop paths and add paths in the configuration illustrated in FIG. 30.

FIG. 31 illustrates an example of the drop paths and the add paths the configuration illustrated in FIG. 30. In FIG. 31, the drop paths of the wavelength λ1 of the Degree #1 and the Degree #8 are indicated by thick solid arrows 200 and 300, and the add paths of the wavelength λ1 of the Degree #1 and the Degree #8 are indicated by thick solid arrows 400 and 500.

As illustrated in the drop paths 200 and 300, although the drop wavelength λ1 of each of the Degrees #1 and #8 is connected to the same DMUX/MUX block 90#1 as a minimum block, contention in the same wavelength does not occur in the CDC DMUX unit 93 (contention-less).

On the other hand, as illustrated in the add paths 400 and 500, although the add wavelength λ1 of each of the Degrees #1 and #8 is also connected to the same DMUX/MUX block 90#1 as a minimum block, contention in the same wavelength does not occur in the CDC MUX unit 94 (contention-less).

In this manner, even inside the same DMUX/MUX block 90#m as well as between the DMUX/MUX blocks 90#m as minimum blocks, the occurrence of contention in the same wavelength can be avoided. Therefore, the same wavelength can be connected to an arbitrary port of any of the DMUX/MUX blocks 90#m, and it is possible to implement a CDC ROADM where there is no limitation in optical fiber connection destination of a TP.

(8-Degree Full CD/CDC Mixed ROADM)

Figure 32:
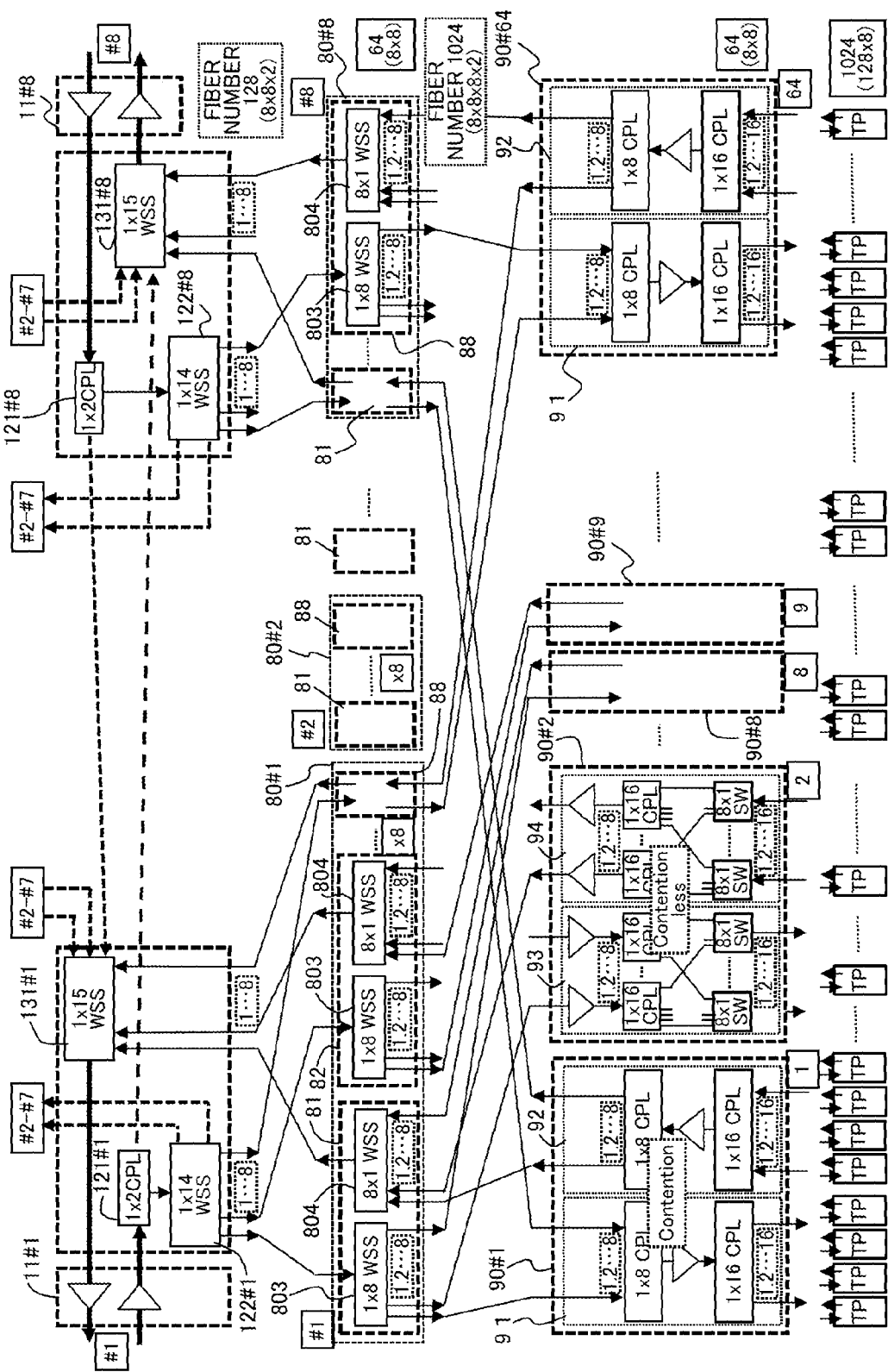
FIG. 32 is a diagram illustrating an example of a configuration where a portion of DMUX/MUX blocks is replaced with a block with a CDC function in the configuration illustrated in FIG. 28.

Next, FIG. 32 illustrates an example of a configuration where at least one of the DMUX/MUX blocks 90#m in the configuration illustrated in FIG. 28 is replaced with a block including a CDC function. For example, FIG. 32 illustrates an example where only the DMUX/MUX block 90#2 among the DMUX/MUX blocks 90#m is replaced with a CDC block including the CDC DMUX unit 93 and the CDC MUX unit 94.

Since the CD block and the CDC block can be mixed, the ROADM are initially operated in an inexpensive CD configuration, and in the process of extending TPs, contentionless functions (CDC blocks) are extended if necessary, so that it is possible to reduce costs of equipment investment.

Further, according to a contention-less function, a maintenance person does not need to determine whether or not a site (block) connecting an optical fiber is in contention. Therefore, according to the contention-less function, the optical fiber can be freely connected to an arbitrary block, maintenance and operating costs can be suppressed.

Furthermore, the CD block and the CDC block can be mixed, so that the ROADM including a CD function and the CDC function can be flexibly implement according to the use.

(8-Degree Full CDC with Bridge/Switch for OUPSR)

Figure 33:
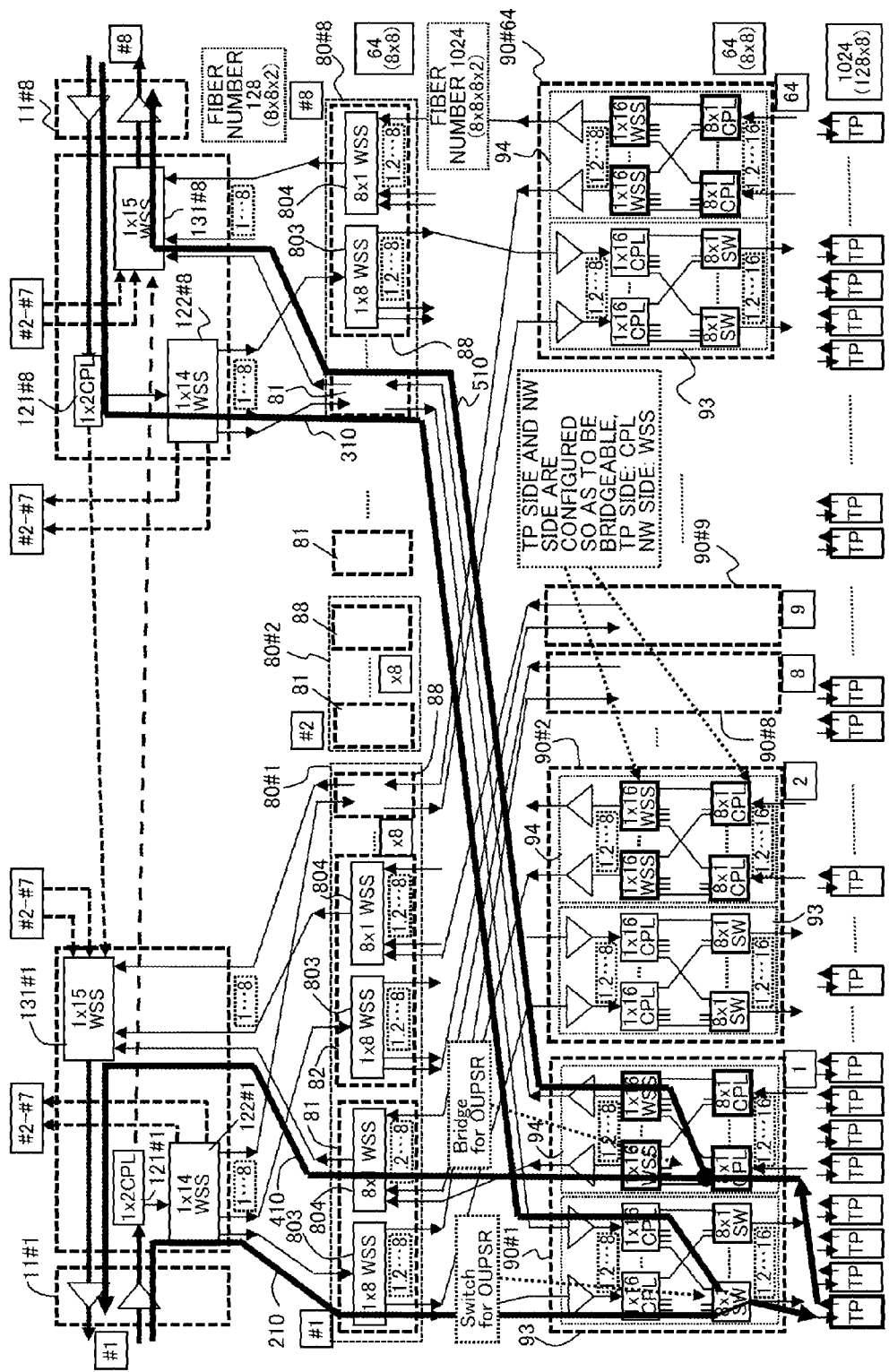
FIG. 33 is a diagram illustrating a modified example of an ROADM with an 8-Degree full CDC function illustrated in FIG. 30.

Next, FIG. 33 illustrates an example where the 8×1 SW in the CDC MUX unit 94 of the add side in the ROADM with the 8-Degree full CDC configuration illustrated in FIG. 30 is replaced with an 8×1 CPL and the 1×16 CPL is replaced with a 1×16 WSS. Note that, the configuration of the CDC DMUX unit 93 is the same as the configuration illustrated in FIG. 30.

The replacement is performed, so that it is possible to implement a bridge/switch function for optical unidirectional path switched ring (OUPSR) switching. Namely, since the 8×1 CPL in the CDC MUX unit 94 can 2-branch the optical signals with the same wavelength, it is possible to redundantly add the optical signals with the same wavelength to different Degrees (for example, Degrees #1 and #8) (refer to thick solid arrows 410 and 510). Therefore, it is possible to implement a bridge function for OUPSR.

On the other hand, in the CDC DMUX unit 93, the 8×1 SW selectively outputs the optical signals (refer to thick solid arrows 210 and 310) which are redundantly dropped from different Degrees (for example, Degrees #1 and #8). Therefore, it is possible to implement a switch function for OPUSR.

(8-Degree Full CD ROADM with Bridge/Switch for OUPSR)

Figure 34:
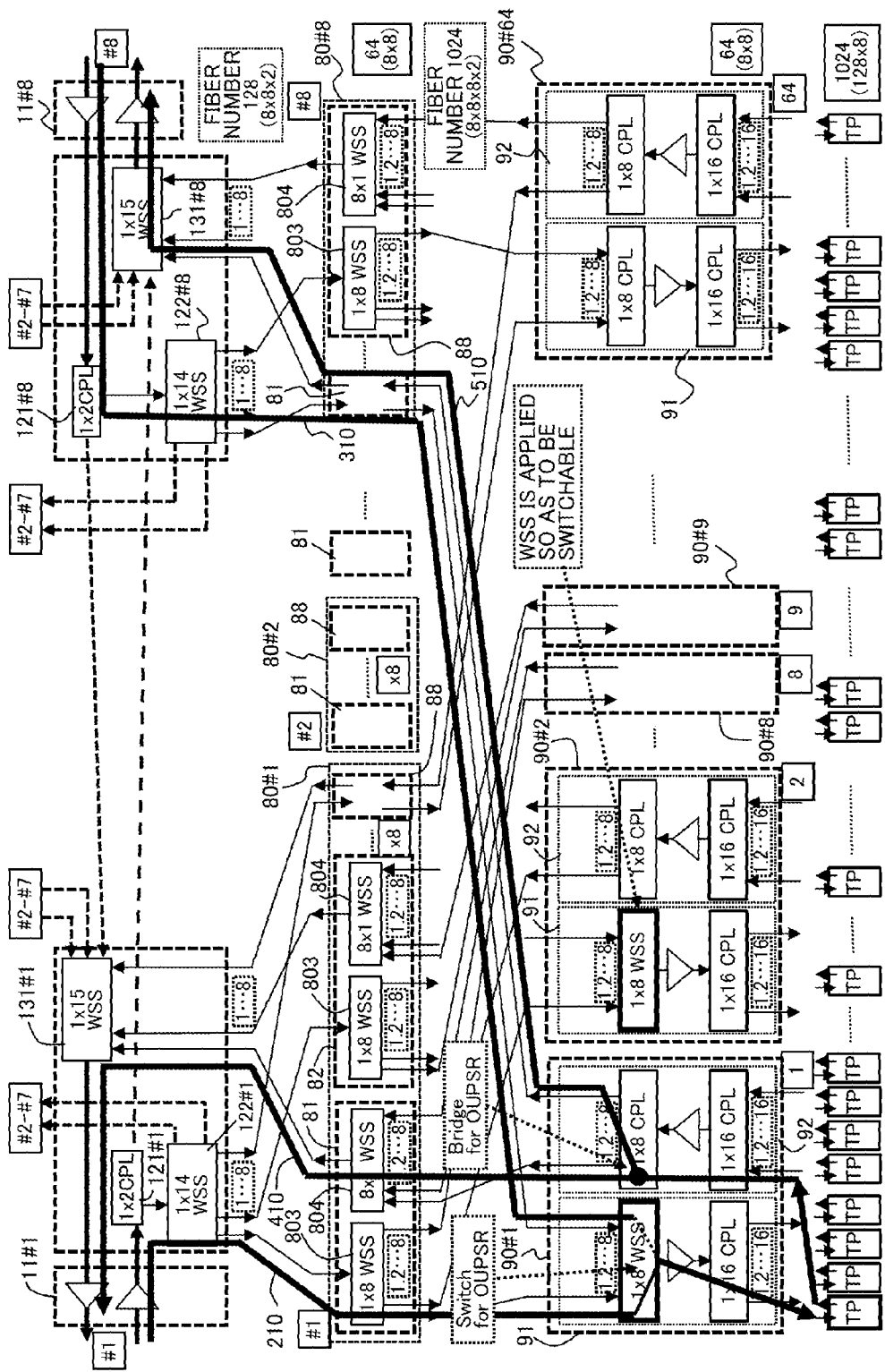
FIG. 34 is a diagram illustrating a modified example of an ROADM with an 8-Degree full CD function illustrated in FIG. 28.

Next, FIG. 34 illustrates an example where the 1×8 CPL in the CD DMUX unit 91 of the drop side in the ROADM with the 8-Degree full CD function illustrated in FIG. 28 is replaced with a 1×8 WSS. Note that, the configuration of the CD MUX unit 92 of the add side is the same as the configuration illustrated in FIG. 28.

The replacement is performed, so that it is possible to implement a bridge/switch function for OUPSR switching. Namely, the 1×8 WSS in the CD DMUX unit 91 selectively outputs the optical signals (refer to thick solid arrows 210 and 310) which are redundantly dropped from different Degrees (for example, Degrees #1 and #8). Therefore, it is possible to implement a switch function for OPUSR.

On the other hand, in the CD MUX unit 92, since the optical signals with the same wavelength can be 2-branched in the 1×8 CPL, it is possible to redundantly add the optical signals with the same wavelength to different Degrees (for example, Degrees #1 and #8) (refer to a thick solid arrows 410 and 510). Therefore, it is possible to implement a bridge function for OUPSR.

(8-Degree Full CD/CDC Mixed ROADM with Bridge/Switch for OUPSR)

Figure 35:
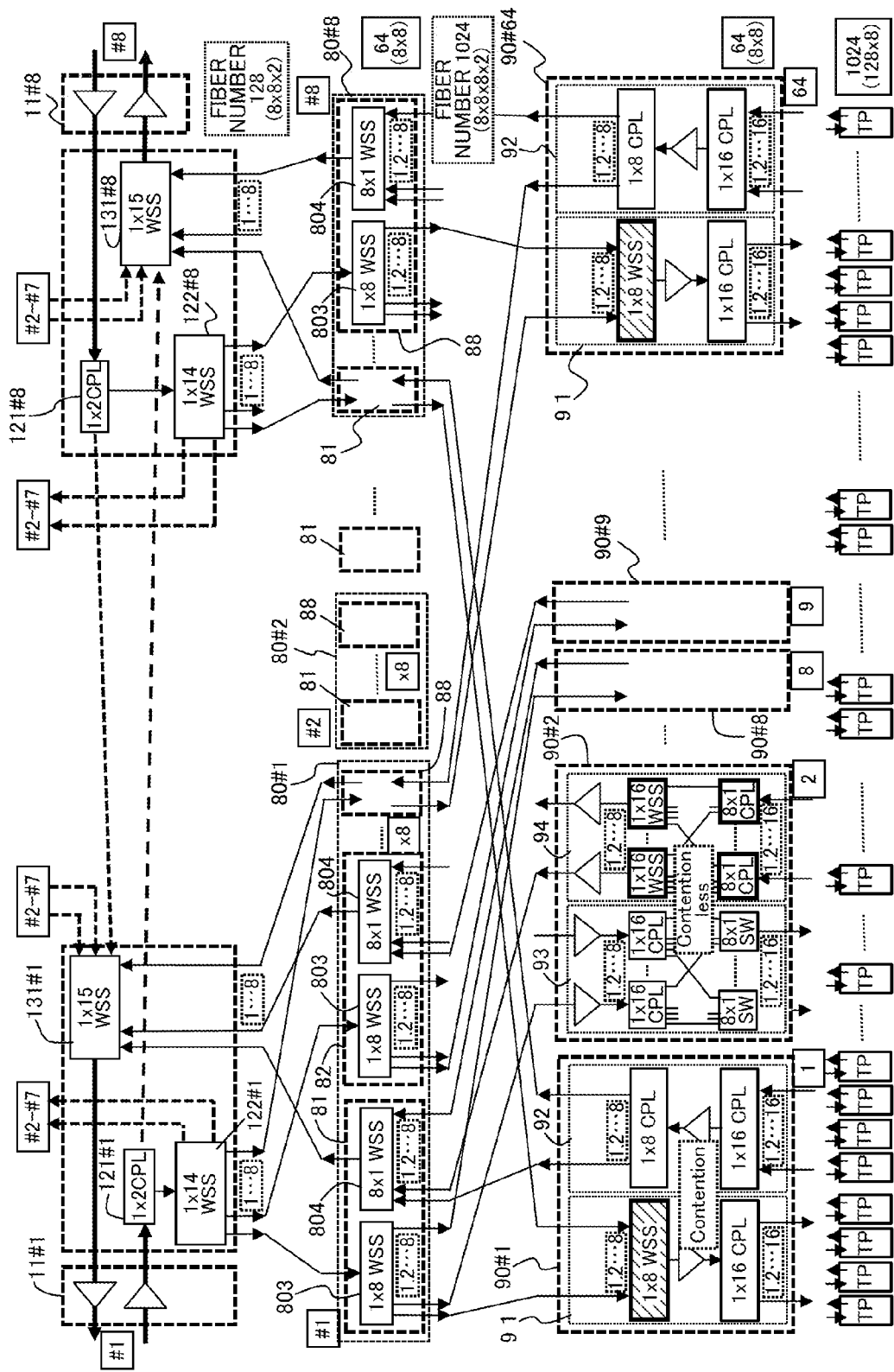
FIG. 35 is a diagram illustrating an example of a configuration of an ROADM including an 8-Degree full CD/CDC mixed configuration with bridge/switch for OUPSR.

Note that, the configurations illustrated in FIGS. 33 and 34 may be combined so as to obtain the configuration illustrated in, for example, FIG. 35. In other words, in the configuration illustrated in FIG. 32, the 1×8 CPL in the CD DMUX unit 91 of the drop side is replaced with a 1×8 WSS, the 8×1 SW in the CDC MUX unit 94 of the add side is replaced with an 8×1 CPL, and the 1×16 CPL is replaced with a 1×16 WSS.

Accordingly, it is possible to incorporate a bridge/switch function for OUPSR switching into an ROADM where a CD block and a CDC block can be mixed.

(8-Degree Full CD/CDC Mixed ROADM)

Figure 36:
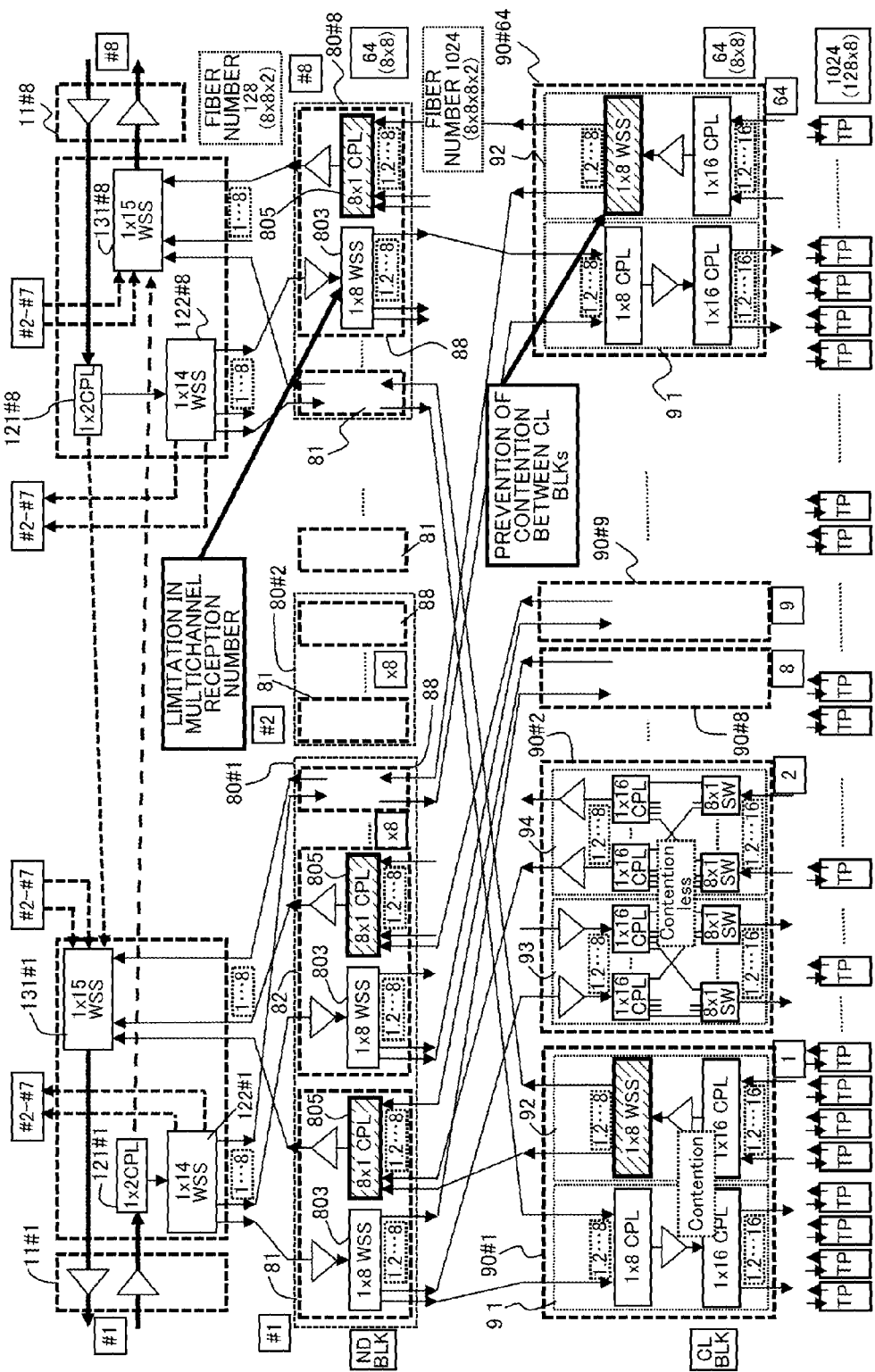
FIG. 36 is a diagram illustrating a modified example of an ROADM with an 8-Degree full CD/CDC mixed configuration illustrated in FIG. 32.

FIG. 36 is a diagram illustrating a modified example of an ROADM including an 8-Degree full CD/CDC mixed configuration illustrated in FIG. 32. The configuration illustrated in FIG. 36 corresponds to a configuration where the 1×8 CPL of the CD MUX unit 92 of the add side in the configuration illustrated in FIG. 32 is replaced with a 1×8 WSS, and the 8×1 WSS 804 of the add side of the add/drop blocks 81 to 88 is replaced with an 8×1 CPL 805.

The 1×8 CPL of the CD MUX unit 92 is replaced with a 1×8 WSS, so that the occurrence of contention between the DMUX/MUX blocks 90 can be avoided. In other words, in the configuration illustrated in FIG. 36, it is also possible to implement an ROADM including an 8-Degree CD/CDC mixed configuration illustrated in FIG. 32.

Figure 37:
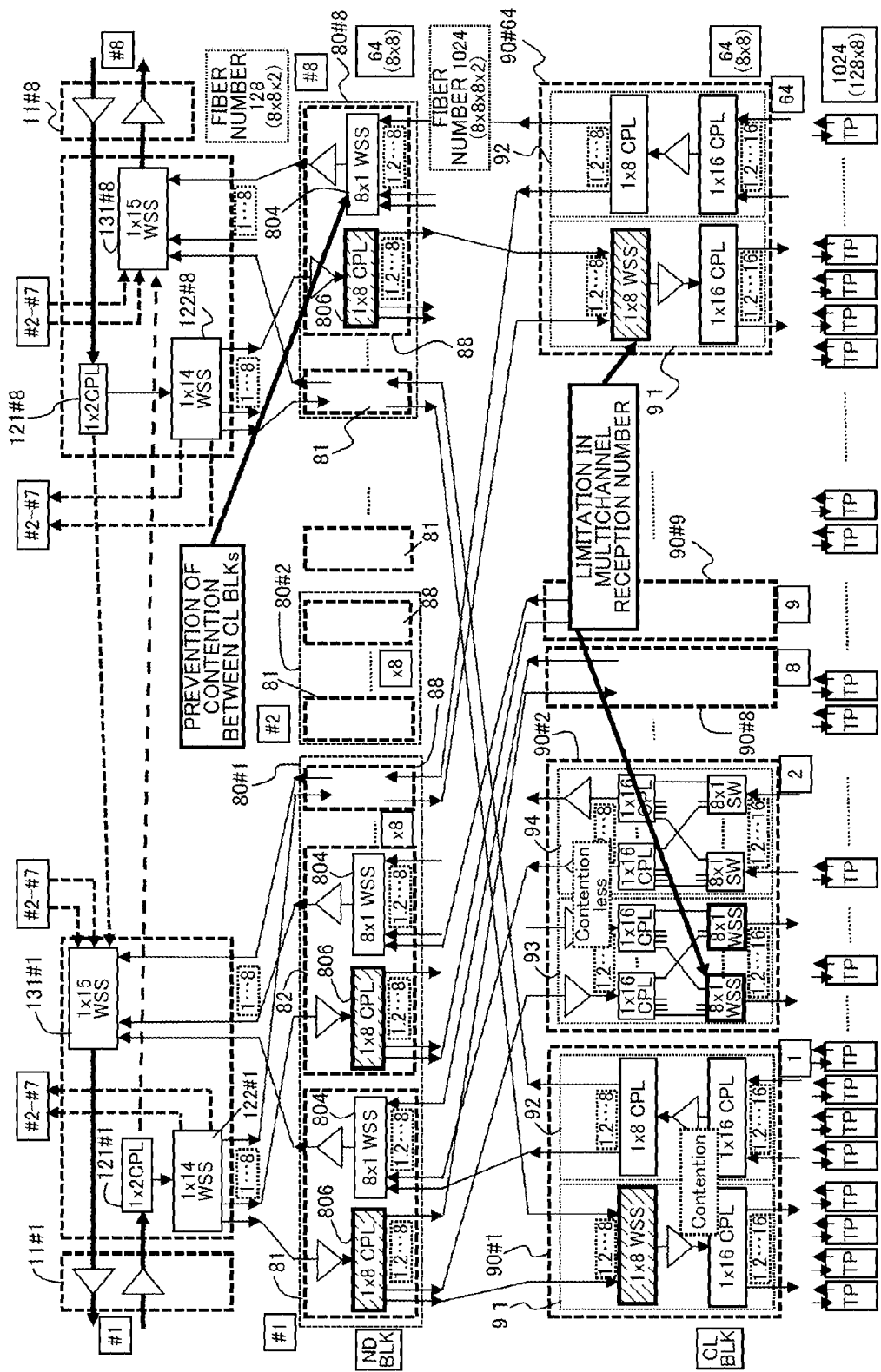
FIG. 37 is a diagram illustrating a modified example of an ROADM with an 8-Degree full CD/CDC mixed configuration illustrated in FIG. 32.

FIG. 37 is a diagram illustrating a modified example of an ROADM with an 8-Degree full CD/CDC mixed configuration illustrated in FIG. 32. In the configuration illustrated in FIG. 37, the 1×8 CPL of the CD DMUX unit 91 of the drop side in the configuration illustrated in FIG. 32 is replaced with a 1×8 WSS, and the 8×1 SW of the CDC DMUX unit 93 of the drop side is replaced with an 8×1 WSS. In addition, the 1×8 WSS 803 of the drop side of the add/drop blocks 81 to 88 is replaced with a 1×8 CPL 806.

The 1×8 CPL of the CD DMUX unit 91 is replaced with a 1×8 WSS, and in the 1×8 WSS, the maximum number of wavelengths included in one WDM optical signal dropped from one Degree can be reduced to the maximum number of multi-channel reception.

Similarly, the 8×1 SW of the CDC DMUX unit 93 of the drop side is replaced with an 8×1 WSS, and in the 8×1 WSS, the maximum number of wavelengths included in one WDM optical signal dropped from one Degree can be reduced to the maximum number of multi-channel reception.

In other words, in the configuration illustrated in FIG. 37, it is also possible to implement an ROADM with an 8-Degree CD/CDC mixed configuration illustrated in FIG. 32.

Figure 38:
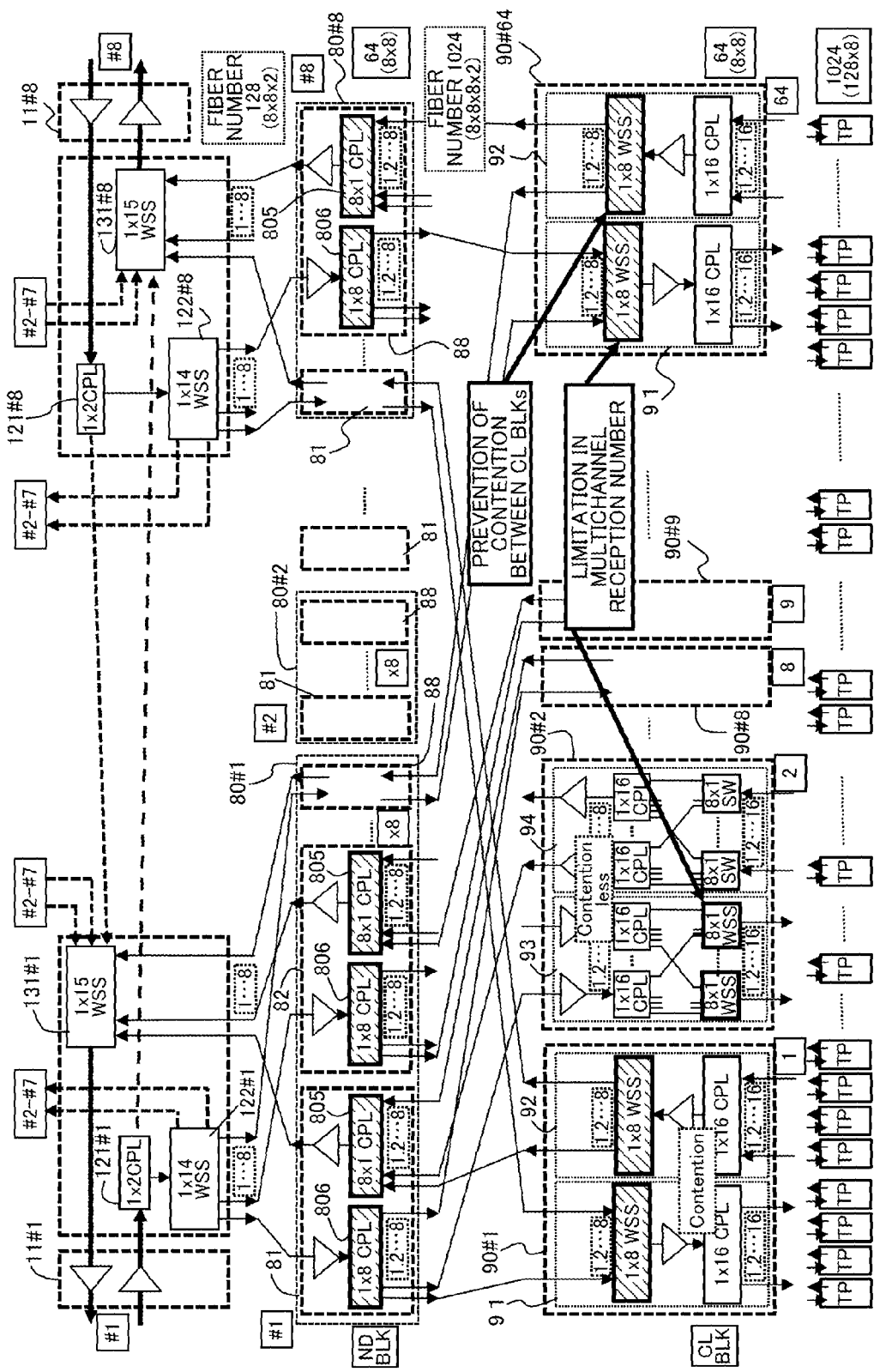
FIG. 38 is a diagram illustrating a modified example of an ROADM with an 8-Degree full CD/CDC mixed configuration illustrated in FIG. 32.

FIG. 38 is a diagram illustrating a modified example of an ROADM with an 8-Degree full CD/CDC mixed configuration illustrated in FIG. 32. The configuration illustrated in FIG. 38 corresponds to a combination of the configuration illustrated in FIG. 36 and the configuration illustrated in FIG. 37.

Namely, in the configuration illustrated in FIG. 38, the 1×8 CPL of the CD MUX unit 92 of the add side in the configuration illustrated in FIG. 32 is replaced with a 1×8 WSS, and the 8×1 WSS 804 of the add side of the add/drop blocks 81 to 88 is replaced with an 8×1 CPL 805. Further, the 1×8 CPL of CD DMUX unit 91 of the drop side is replaced with a 1×8 WSS, and the 8×1 SW of the CDC DMUX unit 93 of the drop side is replaced with an 8×1 WSS. Furthermore, the 1×8 WSS 803 of the drop side of the add/drop blocks 81 to 88 is replaced with a 1×8 CPL 806.

According to this configuration, it is also possible to implement an ROADM with an 8-Degree CD/CDC mixed configuration illustrated in FIG. 32.

Figure 39:
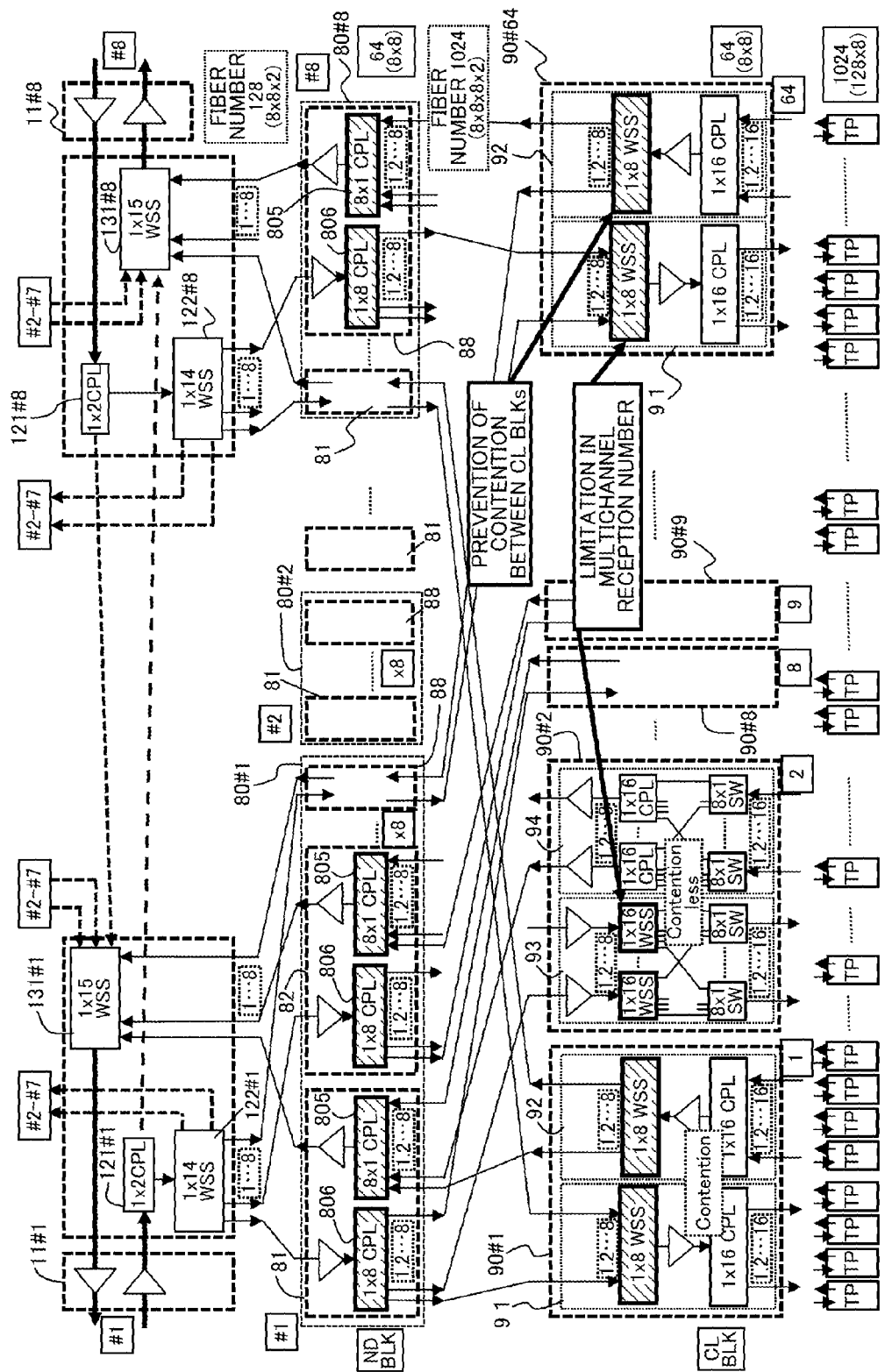
FIG. 39 is a diagram illustrating a modified example of an ROADM with an 8-Degree full CD/CDC mixed configuration illustrated in FIG. 32.

FIG. 39 is a diagram illustrating a modified example of an ROADM with an 8-Degree full CD/CDC mixed configuration illustrated in FIG. 32. The configuration illustrated in FIG. 39 corresponds to a configuration where the 8×1 WSS of the CDC DMUX unit 93 of the drop side in the configuration illustrated in FIG. 38 is replaced with an 8×1 SW, and the 1×16 CPL of the CDC DMUX unit 93 is replaced with a 1×16 WSS.

The 1×16 CPL of the CDC DMUX unit 93 is replaced with a 1×16 WSS, and in the 1×16 WSS, the maximum number of wavelengths included in one WDM optical signal dropped from one Degree can be reduced to the maximum number of multi-channel reception.

According to this configuration, it is also possible to implement an ROADM with an 8-Degree CD/CDC mixed configuration illustrated in FIG. 32.

(12 Degree Full CD/CDC Mixed ROADM)

Figure 41:
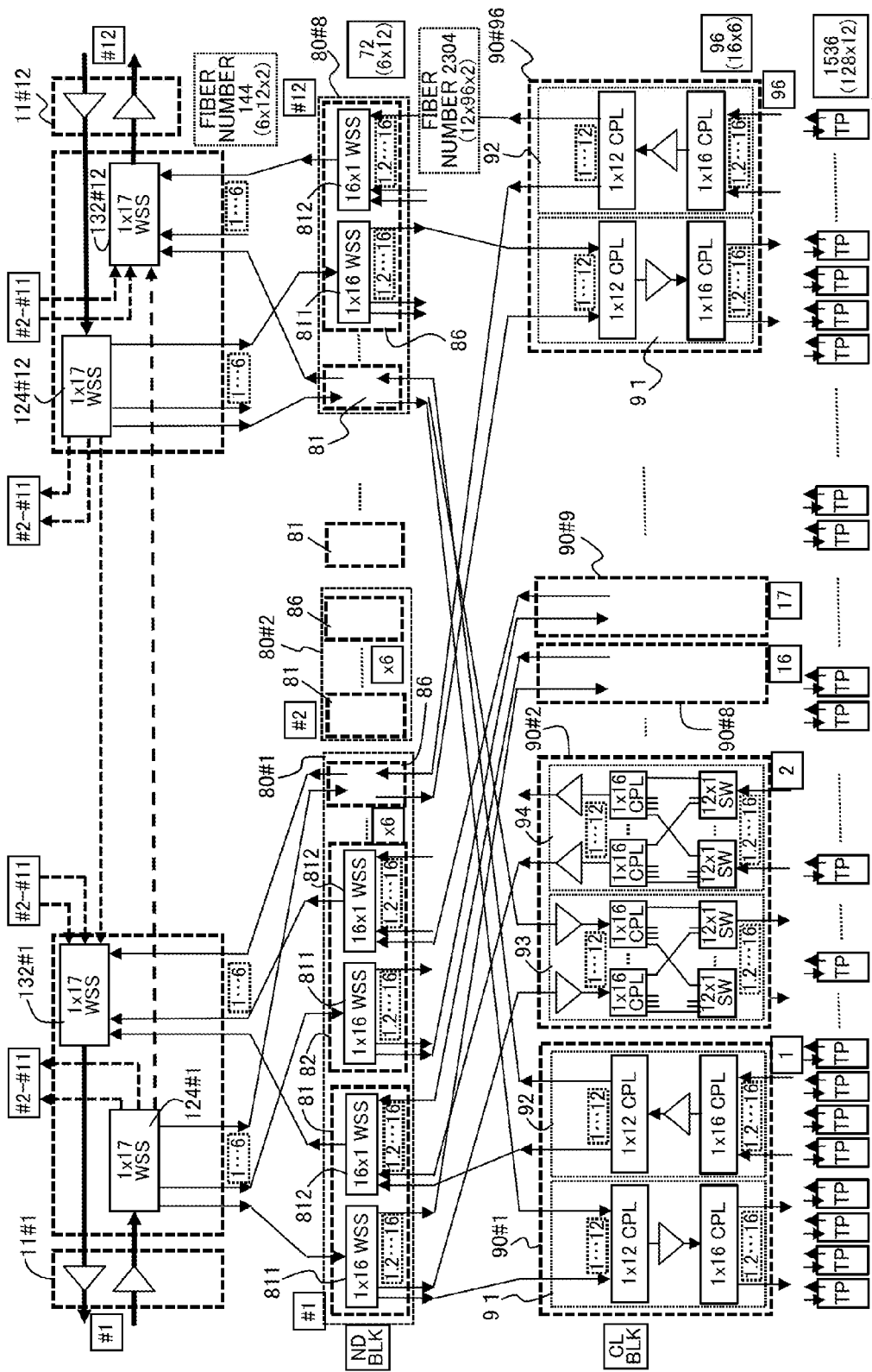
FIG. 41 is a diagram illustrating a modified example (12 Degrees) of an ROADM with a CD/CDC mixed configuration illustrated in FIG. 32.

Next, FIG. 41 is a diagram illustrating a modified example (12 Degrees) of an ROADM with a CD/CDC mixed configuration illustrated in FIG. 32. FIG. 41 illustrates the configuration of the case where the number of Degrees Nd is set to Nd=12.

According to an increase in the number of Degrees Nd, with respect to a core portion connected to an optical amplifier 11#j (j=any one of 1 to Nd), the 1×2 CPL 121#j and the 1×14 WSS 122#j of the drop side illustrated in FIG. 32 (or 1×15 WSS 123#j illustrated in FIG. 40) are replaced with a 1×17 WSS 124#j. In the add side, the 1×15 WSS 131#j is replaced with a 1×17 WSS 132#j.

The 1×17 WSS 124#j of the drop side is configured to have six drop outputs and through-outputs to eleven different Degrees. The 1×17 WSS 132#j of the add side is configured to have six add inputs and through-inputs from the other eleven Degrees.

Six drop outputs of the 1×17 WSS 124#j corresponding to the Degree #j are input to the different eight add/drop blocks 81 to 86 constituting the add/drop block 80#j corresponding to the Degree #j.

Each of the add/drop blocks 81 to 86 is configured to include a 1×16 WSS 811 as an example of the wavelength separation unit of the drop side and a 16×1 WSS 812 as an example of the wavelength multiplexing unit of the add side. Each of six drop outputs of the 1×17 WSS 124#j is input to the different six 1×16 WSSs 811.

The 1×16 WSS 811 limits the input optical signals from the 1×17 WSS 124#1 to the number of wavelengths N (for example, 16) which can be simultaneously received by the TP (coherent receiver) (for example, 16-division).

The 16-divided optical signals are output to the different 16 DMUX/MUX blocks among the DMUX/MUX blocks 90#1 to 90#96. A total number of 96 DMUX/MUX blocks 90 are installed by providing 16 blocks to each of 6 add/drop blocks 81 to 86 per Degree #j.

The 16×1 WSS 812 of the add side selectively outputs the optical signals guided from the different 16 DMUX/MUX blocks among the DMUX/MUX blocks 90#1 to 90#96 in units of wavelength.

In FIG. 41, among the DMUX/MUX blocks 90#1 to 90#96, the DMUX/MUX block 90#2 is configured to include a CDC DMUX unit 93 and a CDC MUX unit 94. Each of the remaining DMUX/MUX blocks 90 is configured to include the CD DMUX unit 91 and the CD MUX unit 92.

According to an increase in the number of Degrees (Nd=12), the CD DMUX unit 91 is different from the configuration illustrated in FIG. 32 in that the 1×8 CPL is replaced with the 1×12 CPL. The 1×12 CPL multiplexes the drop wavelengths from the 12 different Degrees #j. According to an increase in the number of Degrees, the CD MUX unit 92 also has the same configuration as that of the CD DMUX unit 91.

According to an increase in the number of Degrees, the CDC DMUX unit 93 is different from the configuration illustrated in FIG. 32 in that the 8 1×16 CPLs is replaced with 12 1×16 CPLs and each of the 16 8×1 SWs is replaced with a 12×1 SW. In the configuration, the 12 drop outputs are 16-branched, and the drop wavelengths are selected by the 16 12×1 SWs. According to an increase in the number of Degrees, the CDC MUX unit 93 also has the same configuration as that of the CDC DMUX unit 93.

Therefore, it is possible to implement an ROADM with a 12-Degree full CD/CDC mixed configuration.

(14 Degree Full CD/CDC Mixed ROADM)

Figure 42:
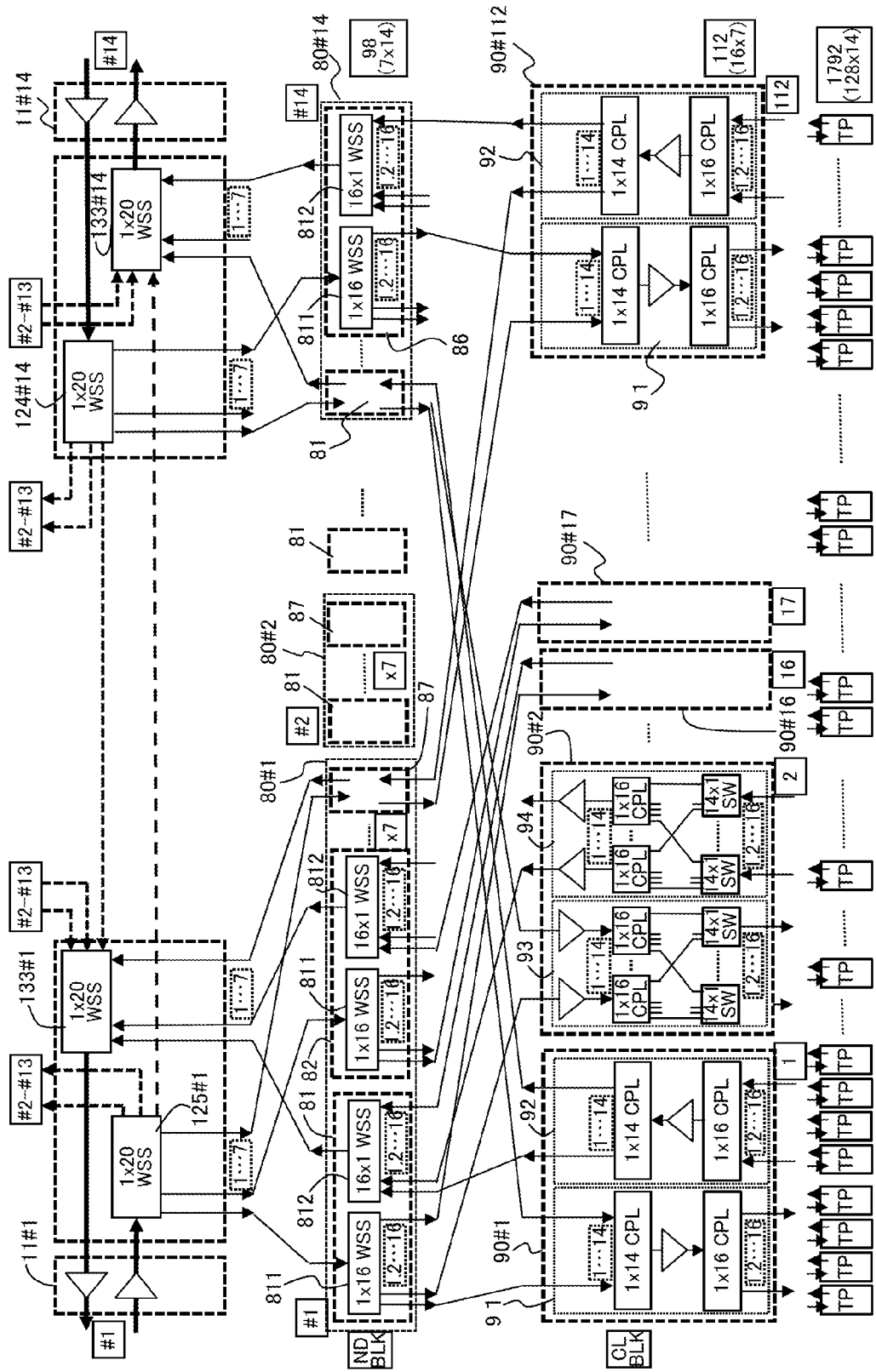
FIG. 42 is a diagram illustrating a modified example (14 Degrees) of an ROADM with a CD/CDC mixed configuration illustrated in FIG. 32.

FIG. 42 is a diagram illustrating a modified example (14 Degrees) of an ROADM with a CD/CDC mixed configuration illustrated in FIG. 32. FIG. 42 illustrates the configuration of the case where the number of Degrees Nd is set to Nd=14.

According to an increase in the number of Degrees Nd, with respect to a core portion connected to an optical amplifier 11#j (j=any one of 1 to Nd), the 1×2 CPL 121#j and the 1×14 WSS 122#j of the drop side illustrated in FIG. 32 (or 1×15 WSS 123#j illustrated in FIG. 40) are replaced with a 1×20 WSS 125#j. In the add side, the 1×15 WSS 131#j is replaced with a 1×20 WSS 133#j.

The 1×20 WSS 125#j of the drop side is configured to have seven drop outputs and through-outputs to thirteen different Degrees. The 1×20 WSS 133#j of the add side is configured to have seven add inputs and through-inputs from the other thirteen Degrees.

The seven drop outputs of the 1×20 WSS 125#j corresponding to the Degree #j are input to the different seven add/drop blocks 81 to 87 constituting the add/drop block 80#j corresponding to the Degree #j.

Each of the add/drop blocks 81 to 87 is configured to include a 1×16 WSS 811 as an example of the wavelength separation unit of the drop side and a 16×1 WSS 812 as an example of the wavelength multiplexing unit of the add side. Each of the six drop outputs of the 1×20 WSS 124#j is input to the different seven 1×16 WSSs 811.

The 1×16 WSS 811 limits the input optical signals from the 1×20 WSS 125#1 to the number of wavelengths N (for example, 16) which can be simultaneously received by the TP (coherent receiver) (for example, 16-division).

The 16-divided optical signals are input to the different 16 DMUX/MUX blocks among the DMUX/MUX blocks 90#1 to 90#112. A total number of 112 DMUX/MUX blocks 90 are installed by providing 16 blocks to each of the 7 add/drop blocks 81 to 86 per Degree #j.

The 16×1 WSS 812 of the add side selectively outputs the optical signals guided from different 16 DMUX/MUX blocks among the DMUX/MUX blocks 90#1 to 90#112 in units of wavelength.

In FIG. 42, among the DMUX/MUX blocks 90#1 to 90#112, the DMUX/MUX block 90#2 is configured to include the CDC DMUX unit 93 and the CDC MUX unit 94. Each of the remaining DMUX/MUX blocks 90 is configured to include the CD DMUX unit 91 and the CD MUX unit 92.

According to an increase in the number of Degrees (Nd=14), the CD DMUX unit 91 is different from the configuration illustrated in FIG. 32 in that the 1×8 CPL is replaced with the 1×14 CPL. The 1×14 CPL multiplexes the dropped wavelengths from the 14 different Degrees #j. According to an increase in the number of Degrees, the CD MUX unit 92 also has the same configuration as that of the CD DMUX unit 91.

According to an increase in the number of Degrees, the CDC DMUX unit 93 is different from the configuration illustrated in FIG. 32 in that the 8 1×16 CPLs are replaced with 14 1×16 CPLs and each of the 16 8×1 SWs is replaced with a 14×1 SW. With the configuration, the 14 drop outputs are 16-branched, and the drop wavelengths are selected by the 16 14×1 SWs. According to an increase in the number of Degrees, the CDC MUX unit 93 also has the same configuration as that of the CDC DMUX unit 93.

Therefore, it is possible to implement an ROADM with a 14-Degree full CD/CDC mixed configuration.

According to the above-described embodiments, it is possible to flexibly adapt to extension in wavelength or extension in route in units of wavelength separation block and/or wavelength multiplexing block.

All examples and conditional language recited herein are intended for the pedagogical purposes of aiding the reader in understanding the invention and the concepts contributed by the inventor to further the art, and are not to be construed limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. An optical drop apparatus comprising R routes (R is an integer of 2 or more) and coherent transponders available to simultaneously receive optical signals, the optical drop apparatus comprising:
    R wavelength separation units corresponding to the respective routes, each of which divides a wavelength multiplexed optical signal of one route into M wavelength groups, each of which includes N wavelengths, each of the coherent transponders being available to simultaneously receive optical signals with N wavelengths (N is an integer of 2 or more and M is an integer satisfying N×M=the number of multiplexed wavelengths of the wavelength multiplexed optical signal); and
    M wavelength separation blocks, each of which is input with a plurality of the wavelength groups divided by the different wavelength separation units and outputs optical signals having any one or a plurality of wavelengths included in the input wavelength groups to N coherent transponders, each of M wavelength separation blocks reducing the maximum number R×N of wavelengths dropped from the R routes to the maximum number N of wavelengths simultaneously received by one of the coherent transponders,
        wherein N is equal to the number of the coherent transponders per wavelength separation block and is equal to the number of the wavelengths available to be simultaneously received by each coherent transponder.

2. The optical drop apparatus according to claim 1, wherein the wavelength separation block is a CD (colorless and direction-less) block which multiplexes the plurality of the wavelength groups and N-branches the multiplexed optical signal into N coherent transponders.

3. The optical drop apparatus according to claim 1, wherein the wavelength separation block is a CDC (colorless, direction-less, and contention-less) block which selects any one of the plurality of the wavelength groups and outputs the selected wavelength group to the coherent transponders.

4. The optical drop apparatus according to claim 1,
    wherein at least one of the wavelength separation blocks is CD (colorless and direction-less) block, each of which multiplexes the plurality of the wavelength groups and N-branches the multiplexed optical signal into N coherent transponders, and wherein the rest of the wavelength separation blocks are CDC (colorless, direction-less, and contention-less) blocks, each of which selects any one of the plurality of the wavelength groups and outputs the wavelength group to the coherent transponders.

5. The optical drop apparatus according to claim 1, further comprising a wavelength selection switch which selectively through-inputs an optical signal having any one wavelength among the wavelength multiplexed optical signal to a different route and selectively inputs an optical signal of any other wavelength among the wavelength multiplexed optical signal to the wavelength separation unit.

6. The optical drop apparatus according to claim 1, wherein the wavelength separation block comprises a switch function of an OUPSR (Optical Unidirectional Path Switched Ring), which selectively outputs an optical signal redundantly input from different routes.

7. An optical drop apparatus comprising R routes (R is an integer of 2 or more) and coherent transponders available to simultaneously receive optical signals, the optical drop apparatus comprising:

R wavelength separation units corresponding to the respective routes, each of which M-branches a wavelength multiplexed optical signal of one route, the coherent transponders being available to simultaneously receive optical signals with N wave lengths (N is an integer of 2 or more and M is an integer satisfying N×M=the number of multiplexed wavelengths of the wavelength multiplexed optical signal); and M wavelength separation blocks, each of which is input with optical signals branched by the different wavelength separation units and selectively outputs the input optical signals to N coherent transponders in units of M wavelength groups, each of which includes N wavelengths, each of M wavelength separation blocks reducing the maximum number R×N of wavelengths dropped from the R routes to the maximum number N of wavelengths simultaneously received by one of the coherent transponders, wherein N is equal to the number of the coherent transponders per wavelength separation block and is equal to the number of the wavelengths available to be simultaneously received by each coherent transponder.

8. An optical add apparatus having a plurality of routes, comprising:

M wavelength multiplexing blocks (M is an integer satisfying N×M=the number of multiplexed wavelengths of wavelength multiplexed optical signals of one route), each of which wavelength-multiplexes optical signals transmitted from N coherent transponders (N is an integer of 2 or more); and wavelength selection switches, each of which is installed corresponding to each route to selectively output wavelength multiplexed optical signals transmitted from different wavelength multiplexing blocks to the corresponding route in units of wavelength, each of wavelength multiplexing blocks switching and transmitting the wavelength multiplexed optical signals selectively to the wavelength selection switches corresponding to the different routes.

9. The optical add apparatus according to claim 8, wherein the wavelength multiplexing block is a CD (colorless and direction-less) block which multiplexes optical signals from the N coherent transponders and branches the multiplexed optical signals into different wavelength selection switches.

10. The optical add apparatus according to claim 8, wherein the wavelength multiplexing block is a CDC (colorless, direction-less, and contention-less) block which selects a plurality (maximum N) of optical signals from the N coherent transponders to multiplex the optical signals and selectively switches to a wavelength selection switch of a different route to output the optical signals to the wavelength selection switch.

11. The optical add apparatus according to claim 8, wherein at least one of the wavelength multiplexing blocks is CD (colorless and direction-less) block, each of which multiplexes optical signals from the N coherent transponders and branches the multiplexed optical signals into different wavelength selection switches, and wherein the rest of the wavelength multiplexing blocks are CDC (colorless, direction-less, and contention-less) blocks, each of which selects a plurality (maximum N) of optical signals from the N coherent transponders to multiplex the optical signals and selectively switches to a wavelength selection switch of a different route to output the optical signals to the wavelength selection switch.

12. The optical add apparatus according to claim 8, further comprising a second wavelength selection switch which selectively outputs: an optical signal which is to be output to a specific route, the second wavelength selection switch being different from any of the wave selection switches, the optical signal being input from a wavelength selection switch selected from among the wavelength selection switches other than the second wavelength selection switch, the selected wavelength selection switch being connected to the second wavelength selection switch; and an optical signal which is through-input from another different route to the specific route.

13. The optical add apparatus according to claim 8, wherein the wavelength multiplexing block comprises a bridge function of an OUPSR (Optical Unidirectional Path Switched Ring), which branches optical signals which are to be redundantly output to different routes.

14. An optical add apparatus having a plurality of routes, comprising:

wavelength multiplexing units, each of which is installed corresponding to each route to multiplex input optical signals and to output the multiplexed optical signal to the corresponding route; and M wavelength multiplexing blocks, each of which selectively outputs optical signals transmitted from N coherent transponders (N is an integer of 2 or more) to the wavelength multiplexing units corresponding to the different routes in units of M wavelength groups, each of which includes N wavelengths, (M is an integer satisfying N×M=the number of multiplexed wavelengths of a wavelength multiplexed optical signal of one route).

15. An optical add/drop apparatus comprising R route (R is an integer of 2 or more) and comprising coherent transponders capable of simultaneously receiving optical signal, comprising:

R wavelength separation units corresponding to the respective routes, each of which divides a wavelength multiplexed optical signal of one route into M wavelength groups, each of which includes N wavelengths, the coherent transponders being capable of simultaneously receiving optical signals with N wave lengths (N is an integer of 2 or more and M is an integer satisfying N×M=the number of multiplexed wavelengths of the wavelength multiplexed optical signal);

M wavelength separation blocks, each of which is input with a plurality of the wavelength groups divided by the different wavelength separation units and outputs optical signals having any one or a plurality of wavelengths included in the input wavelength groups to N coherent transponders, each of M wavelength separation blocks reducing the maximum number R×N of wavelength dropped from the R routes to the maximum number N of wavelengths simultaneously received by one of the coherent transponders;

M wavelength multiplexing blocks, each of which wavelength-multiplexes optical signals transmitted from different N coherent transponders; and R wavelength selection switches, each of which is installed corresponding to each route to selectively output wavelength multiplexed optical signals transmitted form different wavelength multiplexing blocks to the corresponding route in units of wavelength, each of wavelength multiplexing blocks switching and transmitting the wavelength multiplexed optical signals selectively to the wavelength selection switches corresponding to the different routes.

* * * * *